United States Patent
Finn

(10) Patent No.: US 11,341,385 B2
(45) Date of Patent: May 24, 2022

(54) RFID ENABLED METAL TRANSACTION CARD WITH SHAPED OPENING AND SHAPED SLIT

(71) Applicant: Federal Card Services, LLC, Cincinnati, OH (US)

(72) Inventor: David Finn, Füssen Weissensee (DE)

(73) Assignee: Federal Card Services, LLC, Cincinnati, OH (US)

( * ) Notice: Subject to any disclaimer, the term of this patent is extended or adjusted under 35 U.S.C. 154(b) by 0 days.

(21) Appl. No.: 17/097,541

(22) Filed: Nov. 13, 2020

(65) Prior Publication Data

US 2021/0150294 A1 May 20, 2021

Related U.S. Application Data

(63) Continuation-in-part of application No. 17/079,606, filed on Oct. 26, 2020, now abandoned, and a
(Continued)

(51) Int. Cl.
*G06K 19/04* (2006.01)
*G06K 19/077* (2006.01)

(52) U.S. Cl.
CPC ......... *G06K 19/044* (2013.01); *G06K 19/045* (2013.01); *G06K 19/07754* (2013.01); *G06K 19/07777* (2013.01)

(58) Field of Classification Search
CPC .......... G06K 19/044; G06K 19/07754; G06K 19/07777; G06K 19/045; G06K 19/07769; G06K 19/02; B26F 3/004; B26F 1/00
See application file for complete search history.

(56) References Cited

U.S. PATENT DOCUMENTS

| | | | |
|---|---|---|---|
| 5,413,814 A | 5/1995 | Bowen et al. | |
| 6,019,268 A | 2/2000 | Melzer et al. | |

(Continued)

FOREIGN PATENT DOCUMENTS

| | | | |
|---|---|---|---|
| CN | 205158409 U | 4/2016 | |
| EP | 2372840 A2 | 10/2011 | |

(Continued)

OTHER PUBLICATIONS

Chen, S.-L., et al., "A Metallic RFID Tag Design for Steel-Bar and Wire-Rod Management Application in the Steel Industry" Progress in Electromagnetics Research, PIER, 2009, 91:195-212, 18 pgs.
(Continued)

*Primary Examiner* — Matthew Mikels
(74) *Attorney, Agent, or Firm* — Frost Brown Todd LLC

(57) ABSTRACT

A transaction card for dual interface communication of a transaction includes a card body, a chip opening, a discontinuity, and a transponder chip. The card body includes a first metal layer having an outer peripheral edge, a first metal face, and a second metal face. The chip opening includes a first chip hole transversely extending from the first metal face toward the second metal face thereby defining a first metal edge surrounding a predetermined hole shape. The discontinuity extends from the outer peripheral edge to the first metal edge. The transponder chip module has a module antenna and is configured to be received within the chip opening. The module antenna defines an outer antenna edge surrounding a predetermined antenna shape such that the predetermined antenna shape is the same as the predetermined hole shape for improved inductive coupling via the discontinuity during use.

20 Claims, 42 Drawing Sheets

Related U.S. Application Data continuation-in-part of application No. 16/991,142, filed on Aug. 12, 2020, and a continuation-in-part of application No. 16/991,136, filed on Aug. 12, 2020.

(60) Provisional application No. 63/079,131, filed on Sep. 16, 2020, provisional application No. 63/030,998, filed on May 28, 2020, provisional application No. 63/018,902, filed on May 1, 2020, provisional application No. 62/936,453, filed on Nov. 16, 2019.

(56) References Cited

U.S. PATENT DOCUMENTS

| | | |
|---|---|---|
| 6,139,664 A | 10/2000 | Melzer et al. |
| D436,620 S | 1/2001 | Webb et al. |
| D438,562 S | 3/2001 | Webb et al. |
| D438,563 S | 3/2001 | Webb et al. |
| 6,214,155 B1 | 4/2001 | Leighton |
| D442,222 S | 5/2001 | Webb et al. |
| D442,627 S | 5/2001 | Webb et al. |
| D442,628 S | 5/2001 | Webb et al. |
| D442,629 S | 5/2001 | Webb et al. |
| D443,298 S | 6/2001 | Webb et al. |
| D447,515 S | 9/2001 | Faenza, Jr. et al. |
| D449,336 S | 10/2001 | Webb et al. |
| 6,378,774 B1 | 4/2002 | Emori et al. |
| 6,452,563 B1 | 9/2002 | Porte |
| 6,491,229 B1 | 12/2002 | Berney |
| 6,581,839 B1 | 6/2003 | Lasch et al. |
| 6,656,541 B1 | 12/2003 | Archer et al. |
| 6,669,813 B1 | 12/2003 | Melzer et al. |
| 6,749,123 B2 | 6/2004 | Lasch et al. |
| 6,764,014 B2 | 7/2004 | Lasch et al. |
| 6,843,422 B2 | 1/2005 | Jones et al. |
| D507,298 S | 7/2005 | Allard et al. |
| D507,598 S | 7/2005 | Allard et al. |
| D508,261 S | 8/2005 | Allard et al. |
| D510,103 S | 9/2005 | Allard et al. |
| D512,095 S | 11/2005 | Allard et al. |
| D523,471 S | 6/2006 | Allard et al. |
| D525,298 S | 7/2006 | Allard et al. |
| D525,653 S | 7/2006 | Allard et al. |
| D525,654 S | 7/2006 | Allard et al. |
| D526,013 S | 8/2006 | Allard et al. |
| D526,014 S | 8/2006 | Allard et al. |
| D526,015 S | 8/2006 | Allard et al. |
| D526,016 S | 8/2006 | Allard et al. |
| D527,421 S | 8/2006 | Allard et al. |
| D529,955 S | 10/2006 | Allard et al. |
| 7,207,494 B2 | 4/2007 | Theodossiou et al. |
| 7,278,580 B2 | 10/2007 | Jones et al. |
| 7,287,704 B2 | 10/2007 | Herslow |
| 7,306,158 B2 | 12/2007 | Berardi et al. |
| 7,306,163 B2 | 12/2007 | Scholz et al. |
| D569,423 S | 5/2008 | Lasch et al. |
| 7,377,443 B2 | 5/2008 | Lasch et al. |
| 7,381,355 B2 | 6/2008 | Rawlins et al. |
| D572,305 S | 7/2008 | Lasch et al. |
| D578,569 S | 10/2008 | Lasch et al. |
| D579,044 S | 10/2008 | Lasch et al. |
| 7,494,057 B2 | 2/2009 | Lasch et al. |
| 7,530,491 B2 | 5/2009 | Lasch et al. |
| D593,600 S | 6/2009 | Lasch et al. |
| 7,544,266 B2 | 6/2009 | Herring et al. |
| 7,607,583 B2 | 10/2009 | Berardi et al. |
| 7,819,310 B2 | 10/2010 | Lasch et al. |
| 7,823,777 B2 | 11/2010 | Varga et al. |
| 7,837,116 B2 | 11/2010 | Morrill Webb et al. |
| 7,971,786 B2 | 7/2011 | Lasch et al. |
| 8,033,457 B2 | 10/2011 | Varga et al. |
| 8,066,190 B2 | 11/2011 | Faenza, Jr. |
| 8,079,514 B2 | 12/2011 | Lasch et al. |
| 8,100,337 B2 | 1/2012 | Artigue et al. |
| 8,186,582 B2 | 5/2012 | Varga et al. |
| 8,186,598 B2 | 5/2012 | Faenza, Jr. |
| 8,393,547 B2 | 3/2013 | Kiekhaefer et al. |
| 8,448,872 B2 | 5/2013 | Droz |
| 8,490,872 B2 | 7/2013 | Kim |
| 8,523,062 B2 | 9/2013 | Varga et al. |
| 8,608,082 B2 | 12/2013 | La Garrec et al. |
| 8,672,232 B2 | 3/2014 | Herslow |
| 8,702,328 B2 | 4/2014 | Cronin et al. |
| 8,737,915 B2 | 5/2014 | Beenken |
| 8,777,116 B2 | 7/2014 | Lin |
| 8,931,691 B2 | 1/2015 | Manessis et al. |
| 8,976,075 B2 | 3/2015 | Kato et al. |
| 9,024,763 B2 | 5/2015 | Hamedani |
| 9,033,250 B2 | 5/2015 | Finn et al. |
| 9,203,157 B2 | 12/2015 | Kato et al. |
| 9,269,032 B2 | 2/2016 | Zlotnik et al. |
| 9,272,370 B2 | 3/2016 | Finn et al. |
| 9,299,020 B2 | 3/2016 | Zimmerman et al. |
| D756,317 S | 5/2016 | Finn et al. |
| 9,390,360 B1 | 7/2016 | Yang et al. |
| 9,390,363 B1 | 7/2016 | Herslow et al. |
| 9,390,364 B2 | 7/2016 | Finn et al. |
| 9,390,366 B1 | 7/2016 | Herslow et al. |
| 9,475,086 B2 | 10/2016 | Finn et al. |
| 9,489,613 B2 | 11/2016 | Finn et al. |
| 9,542,635 B2 | 1/2017 | Herslow |
| 9,546,678 B2 | 1/2017 | Wu et al. |
| 9,622,359 B2 | 4/2017 | Finn et al. |
| 9,634,391 B2 | 4/2017 | Finn et al. |
| 9,697,459 B2 | 7/2017 | Finn et al. |
| 9,721,200 B2 | 8/2017 | Herslow et al. |
| 9,727,759 B1 | 8/2017 | Essebag et al. |
| 9,760,816 B1 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,836,687 B1 | 12/2017 | Williams et al. |
| 9,892,405 B2 | 2/2018 | Olson et al. |
| 9,898,699 B2 | 2/2018 | Herslow et al. |
| 9,960,476 B2 | 5/2018 | Finn et al. |
| 10,032,169 B2 | 7/2018 | Essebag et al. |
| 10,089,570 B2 | 10/2018 | Herslow et al. |
| 10,140,569 B2 | 11/2018 | Kim et al. |
| 10,160,247 B2 | 12/2018 | Beech |
| 10,193,211 B2 | 1/2019 | Finn et al. |
| 10,248,902 B1 | 4/2019 | Finn et al. |
| 10,262,258 B2 | 4/2019 | Beech et al. |
| 10,275,703 B2 | 4/2019 | Herslow et al. |
| 10,289,944 B2 | 5/2019 | Herslow et al. |
| 10,311,346 B2 | 6/2019 | Herslow |
| 10,318,859 B2 | 6/2019 | Lowe et al. |
| 10,325,135 B2 | 6/2019 | Andersen et al. |
| 10,332,846 B2 | 6/2019 | Herslow |
| 10,373,920 B2 | 8/2019 | Herslow |
| 10,395,153 B2 | 8/2019 | Herslow |
| 10,395,164 B2 | 8/2019 | Lundberg et al. |
| 10,406,734 B2 | 9/2019 | Lowe |
| 10,445,636 B2 | 10/2019 | Virostek et al. |
| 10,507,677 B2 | 12/2019 | Wooldridge et al. |
| 10,518,518 B2 | 12/2019 | Finn et al. |
| 10,534,990 B2 | 1/2020 | Herslow et al. |
| 10,552,722 B2 | 2/2020 | Finn et al. |
| 10,583,594 B2 | 3/2020 | Lowe |
| 10,583,683 B1 | 3/2020 | Ridenour et al. |
| 10,599,972 B2 | 3/2020 | Finn et al. |
| 10,762,412 B2 | 9/2020 | Lowe et al. |
| 2005/0003297 A1 | 1/2005 | Labrec |
| 2005/0040243 A1 | 2/2005 | Bi |
| 2005/0095408 A1 | 5/2005 | Labrec et al. |
| 2011/0181486 A1 | 7/2011 | Kato |
| 2012/0112971 A1 | 5/2012 | Takeyama et al. |
| 2013/0126622 A1 | 5/2013 | Finn |
| 2014/0091149 A1 | 4/2014 | Finn et al. |
| 2014/0231503 A1 | 8/2014 | Arimura |
| 2014/0279555 A1 | 9/2014 | Guillaud |
| 2014/0284386 A1 | 9/2014 | Finn et al. |
| 2015/0021403 A1 | 1/2015 | Finn et al. |
| 2015/0129665 A1 | 5/2015 | Finn et al. |
| 2015/0206047 A1 | 7/2015 | Herslow et al. |
| 2015/0269477 A1 | 9/2015 | Finn et al. |

(56) References Cited

U.S. PATENT DOCUMENTS

| | | |
|---|---|---|
| 2016/0110639 A1 | 4/2016 | Finn et al. |
| 2016/0148194 A1 | 5/2016 | Guillaud et al. |
| 2016/0257019 A1 | 9/2016 | Baist |
| 2018/0005064 A1 | 1/2018 | Vogel et al. |
| 2018/0339503 A1 | 11/2018 | Finn et al. |
| 2018/0341846 A1 | 11/2018 | Finn et al. |
| 2018/0341847 A1 | 11/2018 | Finn et al. |
| 2018/0349751 A1 | 12/2018 | Herslow et al. |
| 2019/0050706 A1 | 2/2019 | Lowe |
| 2019/0073578 A1 | 3/2019 | Lowe et al. |
| 2019/0102662 A1 | 4/2019 | Snell et al. |
| 2019/0114526 A1 | 4/2019 | Finn et al. |
| 2019/0156994 A1 | 5/2019 | Cox |
| 2019/0160717 A1 | 5/2019 | Lowe |
| 2019/0171923 A1 | 6/2019 | Finn |
| 2019/0197386 A1 | 6/2019 | Finn et al. |
| 2019/0236434 A1* | 8/2019 | Lowe ............... G06K 19/07792 |
| 2019/0251322 A1 | 8/2019 | Slogedal et al. |
| 2019/0251411 A1 | 8/2019 | Gire et al. |
| 2019/0286961 A1 | 9/2019 | Lowe |
| 2019/0291316 A1 | 9/2019 | Lowe |
| 2019/0311235 A1 | 10/2019 | Sexl et al. |
| 2019/0311236 A1 | 10/2019 | Sexl et al. |
| 2019/0332907 A1 | 10/2019 | Herslow |
| 2019/0384261 A1 | 12/2019 | Nam et al. |
| 2019/0392283 A1 | 12/2019 | Finn et al. |
| 2020/0005114 A1 | 1/2020 | Finn et al. |
| 2020/0034578 A1 | 1/2020 | Finn et al. |
| 2020/0050914 A1 | 2/2020 | Finn et al. |
| 2020/0151534 A1 | 5/2020 | Lotya et al. |
| 2020/0164675 A1 | 5/2020 | Ridenour et al. |
| 2021/0192311 A1 | 6/2021 | Lotya |

FOREIGN PATENT DOCUMENTS

| | | |
|---|---|---|
| KR | 10-1754985 B1 | 10/2011 |
| WO | WO 2017/090891 A1 | 6/2017 |
| WO | WO 2017/198842 A1 | 11/2017 |
| WO | WO 2019/173455 A1 | 9/2019 |

OTHER PUBLICATIONS

Ellipse, EVC ellipse verification code, Dynamic card security code, downloaded Mar. 23, 2021 from https://www.ellipse.la, 4 pgs.

GTS Flexible Materials—Datasheet DEVT-008-20 Epoxy Adhesive Pen Tapes, dated Jan. 9, 2020, 2 pgs.

GTS Flexible Materials—Datasheet T900306 Cast Modified Epoxy Adhesive, dated Feb. 13, 2019, 2 pgs.

NagraID Security (Oberthur Technologies), display cards with Dynamic card verification value (DCVV), Nov. 23, 2016, downloaded from NAGRA ID Security (Oberthur Technologies)—Card & Tickets Manufacturing (mulann.com), 2 pgs.

US Non-Provisional Patent ApplicationU.S. Appl. No. 16/991,136, filed Aug. 11, 2020, entitled "Dual Interface Metal Cards and Methods of Manufacturing."

U.S. Appl. No. 16/991,142, filed Aug. 11, 2020, entitled "Dual Interface Metal Cards and Methods of Manufacturing."

U.S. Appl. No. 17/079,606, filed Oct. 25, 2020, entitled "RFID-Enabled Transaction Cards of Metal and Plastic."

* cited by examiner

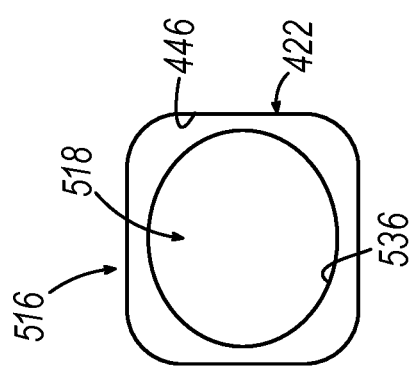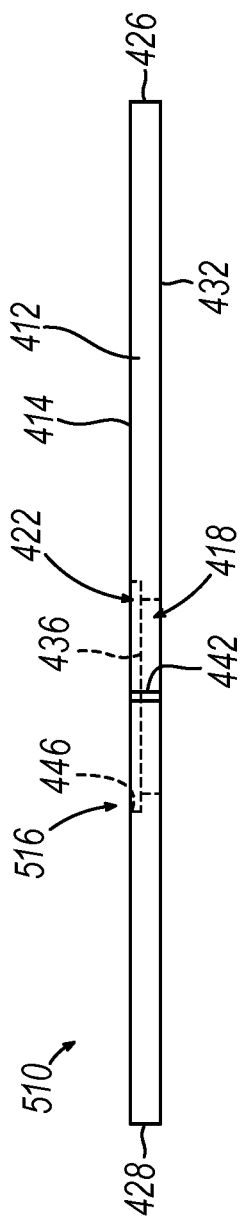

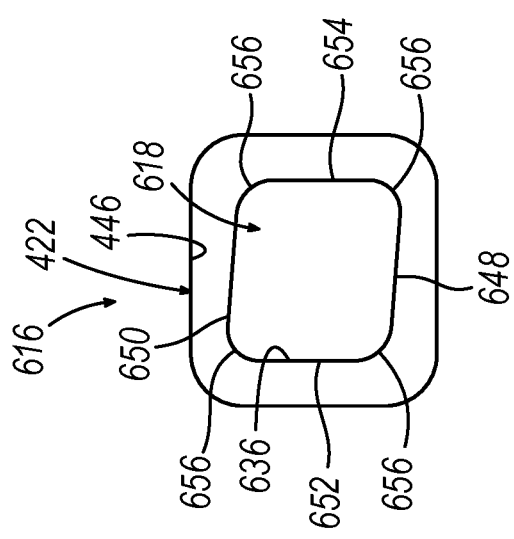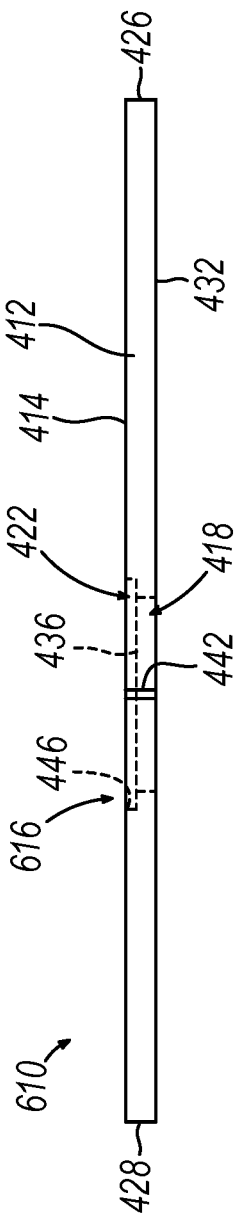

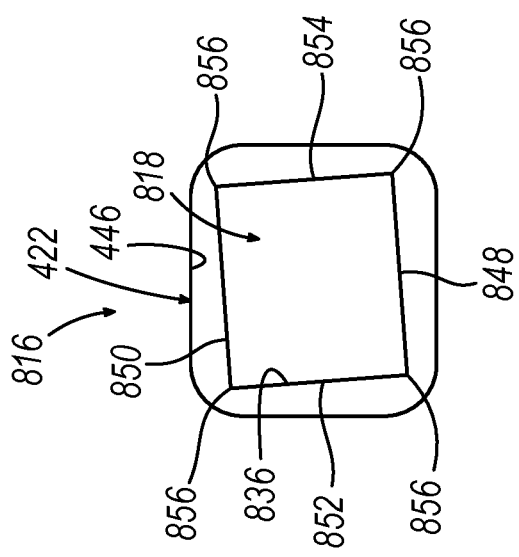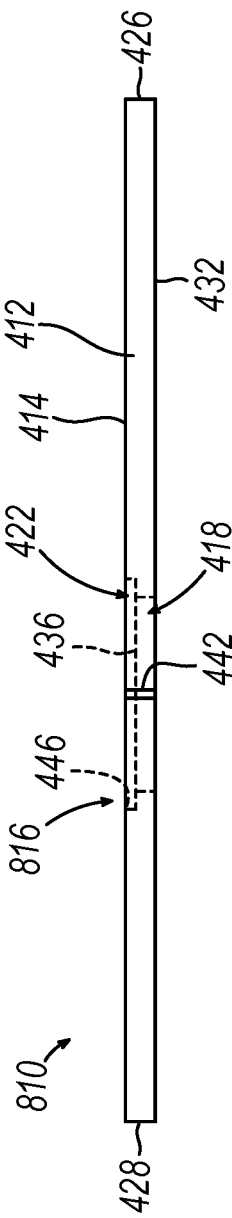

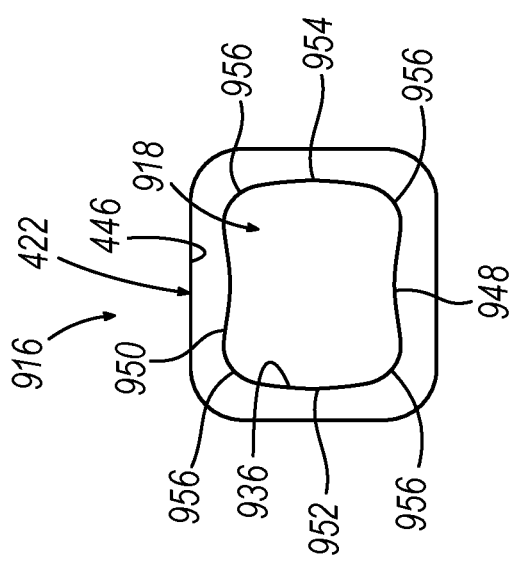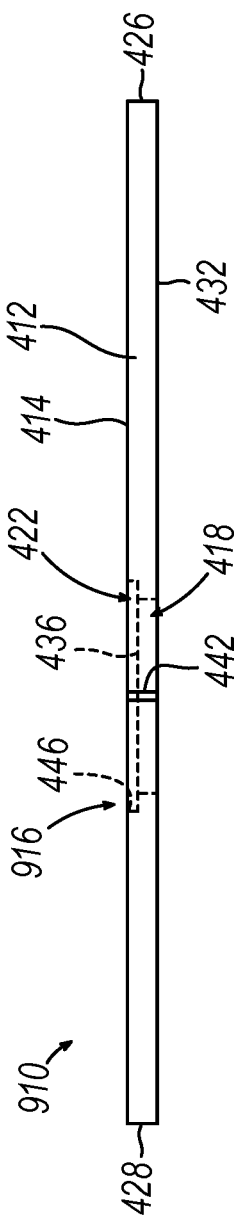

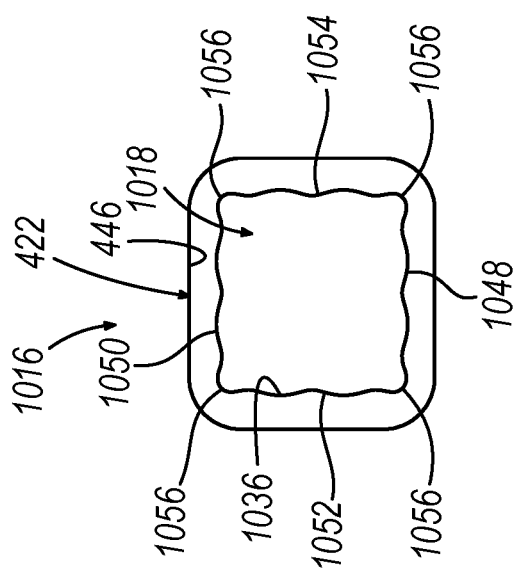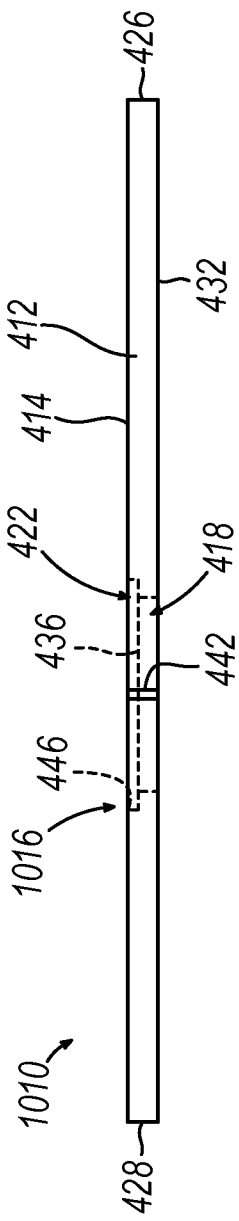

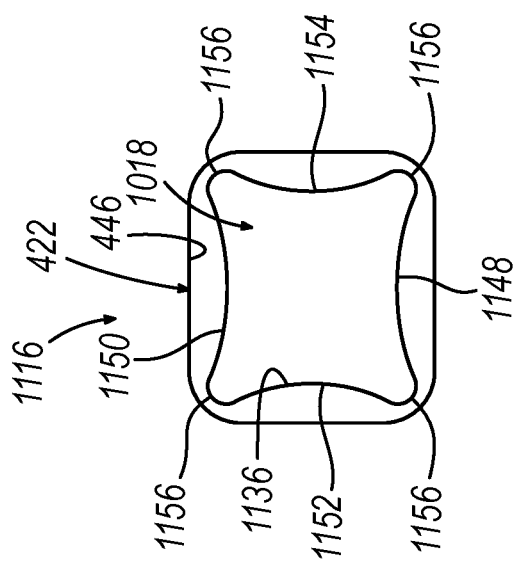
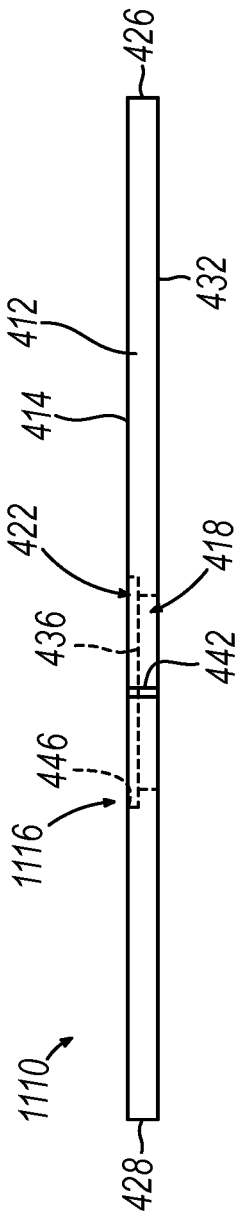

RFID ENABLED METAL TRANSACTION CARD WITH SHAPED OPENING AND SHAPED SLIT

CROSS-REFERENCE TO RELATED APPLICATION

This application claims priority to each of application Ser. No. 62/936,453, filed on Nov. 16, 2019, entitled "RFID Enabled Combination Card of Metal and Plastic," application Ser. No. 63/018,902, filed on May 1, 2020, entitled "RFID Enabled Metal Transaction Card with a Shaped Opening and Shaped Slit," application Ser. No. 63/079,131, filed on Sep. 16, 2020, entitled "RFID Enabled Metal Transaction Card with a Shaped Opening and Shaped Slit," application Ser. No. 16/991,142, filed on Aug. 12, 2020, entitled "Dual Interface Metal Cards and Methods of Manufacturing," application Ser. No. 16/991,136, filed on Aug. 12, 2020, entitled "Dual Interface Metal Cards and Methods of Manufacturing," application Ser. No. 63/030,998, filed on May 28, 2020, entitled "Asymmetrical Location of Contact Pads on Dual Interface Transponder Chip Modules," and application Ser. No. 17/079,606, filed on Oct. 26, 2020, entitled "RFID-Enabled Transaction Cards of Metal and Plastic," the disclosures of which are hereby expressly incorporated by reference herein, in their entireties.

TECHNICAL FIELD

The present invention relates generally to a transaction card, and more particularly, to a transaction card having a metal layer.

BACKGROUND

Transaction cards, such as payment cards, including credit cards and debit cards, which may also be referred to as smartcards, are well known in the financial industry and to associated customers. In order to increase the perceived prestige of such cards as well as improve wear resistance and functionality, many transaction cards include one or more metal layers, referred to herein as "metal transaction cards." While beneficial in some aspects, the incorporation of one or more metal layers introduces other challenges into the design, development, and manufacture of metal transaction cards, particularly with respect to various security features also incorporated into the metal transaction card as desired, or even expected, by the financial industry. For example, some embedded payment chip modules, referred to as "dual interface chip modules," have dual functionality for contact and contactless transmission of information during a transaction, such as a point of sale (POS) transaction. In a first instance of contact transmission, the dual interface chip module of the metal transaction card has a plurality of contact pads configured to communicate in direct contact with a card reader. In a second instance of contactless transmission, also referred to as "Tap-to-Pay," the dual interface chip module of the metal transaction card has a radio frequency identification (RFID) antenna for contactless communication with the card reader. However, metal transaction cards may be functionally difficult to equip with radio frequency transmission capability due to the Faraday cage effect caused by these metal layers. In addition, metal layers tend to be more costly to produce than the ubiquitous "plastic" smartcard due to increased material costs and manufacturing complexities. The following will address these functionality and manufacturing drawbacks in turn.

First, in order to address the drawbacks of the Faraday cage effect, one or more metal layers of the metal transaction card may itself be an antenna, such as a coupling frame, with the inclusion of a discontinuity. This discontinuity may also be referred to as a "slit" in the metal layer and examples of such slits are shown and described in greater detail in U.S. Pat. No. 9,475,086, entitled "Smartcard with Coupling Frame and Method of Increasing Activation Distance of a Transponder Chip Module," filed on Aug. 21, 2014; U.S. Pat. No. 9,798,968, entitled "Smartcard with Coupling Frame and Method of Increasing Activation Distance of a Transponder Chip Module," filed on Sep. 22, 2014; and U.S. Pat. No. 10,552,722, entitled "Smartcard with Coupling Frame Antenna," filed on Mar. 29, 2018, the disclosures of each are hereby incorporated by reference herein.

To this end, the payment chip module may also be referred to as a "transponder chip module" or an "inductive coupling chip module" and comprise an RFID chip and a module antenna. The coupling frame with the discontinuity, such as the slit, thus provides inductive coupling with the module antenna during use in order to reduce drawbacks otherwise associated the Faraday cage effect. Still, the addition of the slit may create additional drawbacks, particularly with respect to the structural integrity of a card body of the metal transaction card. In one example, a single slit extends from a midpoint of one edge of a module, opening, which may also be referred to as a "pocket," to a periphery of the metal transaction card in a straight, horizontal line defining a shortest path from the pocket to the periphery, which is an outer edge of the card body. In turn, the card body provides little resistance to flexure of at the position of the discontinuity in the metal transaction card. Such little resistance may result in structural deficiencies within surrounding layers that may be undesirable to the touch as well as create visual imperfections from wear, including whitening or ghosting of proximate plastic layers in some examples. Additional examples of coupling frames and associated features are also described in U.S. Pat. No. 9,697,459, entitled "Passive Smart Cards, Metal Cards, Payment Objects, and Smart Jewelry," filed on Sep. 22, 2015; U.S. Pat. No. 9,836,684, entitled "Smart Cards, Payment Objects and Methods," filed on Mar. 27, 2016; U.S. Pat. No. 9,960,476, entitled "Smart Card Constructions," filed on Nov. 22, 2016; and U.S. Pat. No. 10,193,211, entitled "Smart Cards, RFID Devices, Wearables and Methods," filed on Jul. 28, 2017.

Second, in order to address the drawbacks of manufacturability, one or more metal layers may be combined with one or more plastic layers to simplify assembly of a magnetic stripe and other secure elements, including a signature panel and a hologram, to the card body of the metal transaction card. During manufacturing, these metal and plastic layers are laminated, adhesively attached, and/or hot stamped together to define the card body. In addition, the one or more plastic layers attached to the one or more metal layers provide additional structural integrity to the card body, particularly at a discontinuity, but may whiten or ghost during use as discussed above. Furthermore, additional layers increase the likelihood of warpage and/or delamination during manufacturing and/or use.

While many metal transaction cards have been made and used, it is believed that no one prior to the inventors has made or used the invention described in the appended claims.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

FIG. 11 depicts a magnified front elevational view of the sixth shaped opening of FIG. 9;

FIG. 12 depicts a side elevational view of the metal transaction card of FIG. 9;

FIG. 15 depicts a magnified front elevational view of the seventh shaped opening of the metal transaction card of FIG. 13;

FIG. 16 depicts a side elevational view of the metal transaction card of FIG. 13;

FIG. 23 depicts a magnified front elevational view of the ninth shaped opening of FIG. 21;

FIG. 24 depicts a side elevational view of the metal transaction card of FIG. 21;

FIG. 27 depicts a magnified front elevational view of the tenth shaped opening of FIG. 25;

FIG. 28 depicts a side elevational view of the metal transaction card of FIG. 25;

FIG. 31 depicts a magnified front elevational view of the eleventh shaped opening of FIG. 29;

FIG. 32 depicts a side elevational view of the metal transaction card of FIG. 29;

FIG. 35 depicts a magnified front elevational view of the twelfth shaped opening of FIG. 33;

FIG. 36 depicts a side elevational view of the metal transaction card of FIG. 33;

Figure 1:
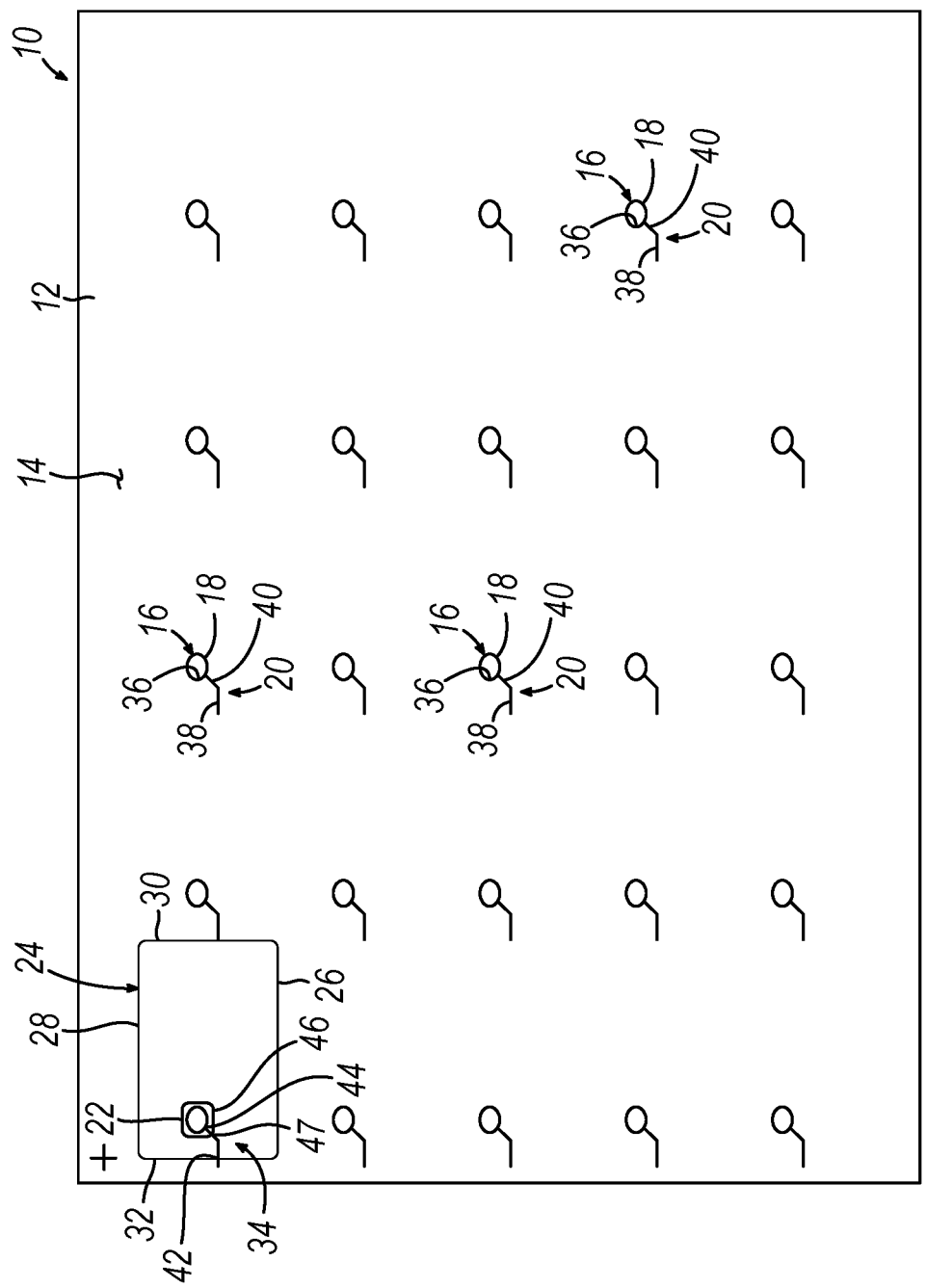
FIG. 1 depicts a front elevational view of an exemplary materials sheet for forming at least one metal transaction card body having a first exemplary arrangement of a first exemplary shaped opening and a first exemplary shaped slit.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

For clarity and convenience of the following disclosures, it will be appreciated that, spatial terms, such as "front," "rear," "upper," "lower," "top," "bottom," "horizontal," "vertical," "transverse," "longitudinal," "underside," "inner," "outer, "interior," and "exterior" are used herein for reference to relative positions and directions. Such terms are used below with reference to views as illustrated for clarity and are not intended to limit the invention described herein.

The following glossary of various terms and explanations of certain physical phenomena may relate to general knowledge of one of ordinary skill as applied to one or more features discussed below. Notably, the following terms and explanations are included for illustrative purposes merely to provide additional clarity and not intended to be unnecessarily limited as described herein.

Antenna Cell: An antenna structure such as sense coil, patch antenna or pick-up coil on a flexible circuit driving an electronic component such as a fingerprint sensor or a dynamic display. A plurality of antenna cells at different locations in a metal transaction card may be used to power several electronic components.

Antenna Probe: A pick-up antenna in the form of a micro-metal strip acting as a first electrode placed in the middle of a discontinuity to probe eddy current signals from the magnetic flux interaction with the metal layer acting as the coupling frame. The metal layer may also act as the second electrode in the circuit. The metal strip may be replaced by a sense coil with a very fine antenna structure to pick-up the surface currents from within the discontinuity.

Compensating Loop: Used to stabilize the resonance frequency of a booster antenna. A metal compensating loop with a gap may be assembled underneath the booster antenna. A ferrite layer or layers may also be laminated together, in combination with the compensating loop on the reverse side of the booster antenna. Additional details regarding the compensating loop are described in U.S. Pat. Pub. No. 2013/0126622, entitled "Offsetting Shielding and Enhancing Coupling in Metallized Smart Cards," published May 23, 2013, hereby incorporated by reference herein.

Coupling Frame Antenna: A card size planar antenna having a single turn and representing a metal layer or metal card body with a discontinuity, with the width of the antenna track significantly greater than the skin depth at the frequency of interest.

Coupling Loop Antenna: An antenna structure which couples to a module antenna in a transponder chip module. The windings or traces of the coupling loop antenna may intertwine those windings of the module antenna, or the windings or traces of the coupling loop antenna may couple closely with the windings of the module antenna similar in function to a primary and secondary coil of a transformer. The termination ends of a coupling loop antenna may be connected to termination points across a discontinuity in a metal layer or metal card body acting as a coupling frame.

Coupling Loop Structure: A flexible circuit with a sense Coil, patch antenna or pick-up coil for inductive coupling with a discontinuity in a metal layer (e.g., a coupling frame) to pick-up surface currents and to direct such currents via traces or tracks to an antenna having a frame or spiral shape on the flexible circuit which further inductively couples in close proximity with the module antenna of a transponder chip module.

Digital Reverse UV Printing: As compared to conventional lithographic printing on a six color press which defines the minimum thickness of a print film in the stack-up construction of a transaction card body as approximately 125 μm (5 mils), reverse digital printing on overlay material (e.g., transparent or translucent) with a thickness of 50 μm (2 mils) significantly reduces the material thickness of the print layer, while also allowing for a thicker metal layer in a metal core or metal face transaction card, thereby resulting in a heavier card.

Discontinuity in a Metal Layer or Metal Card Body acting a Coupling Frame: A discontinuity in a metal layer comprises a slit or gap in the metal layer extending from the front surface to the back surface, the discontinuity defining a path from an origin at the card periphery and terminating at a terminus in an opening to accept a transponder chip module. The metal layer may or may not be defined as reaching the periphery of the transaction card, and the slit geometries may be defined in terms of the card body, and not the coupling frame. A slit may be angled enough that it intersects the periphery of the card body above or below the Y-coordinates of the module opening to accept a transponder chip module.

Discontinuous Metal Frame: An "open loop" metal frame disposed around a peripheral area of a card body with a booster antenna disposed inside the internal area of the metal frame. The "open loop" metal frame may comprise a slit or gap which may extend from an inner edge to an outer edge of the metal frame, and the booster antenna disposed inside the internal area of the metal frame. The gap may provide a means for tuning the resonant frequency of the booster antenna. Insulating layers may be disposed on at least one side of the metal frame, covering the slit, and may comprise a dielectric medium such as an oxide layer. Additional details regarding the discontinuous metal frame are described in U.S. Pat. Pub. No. 2015/0269477, entitled "Dual-Interface Hybrid Metal Smartcard With a Booster Antenna or Coupling Frame," published Sep. 24, 2015, hereby incorporated by reference herein.

Eddy Currents: Induced electrical currents that flow in a circular path. In other words, eddy currents are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon may be referred to as the skin effect. The depth that eddy currents penetrate into a metal object is affected by the frequency of the excitation current and the electrical conductivity and magnetic permeability of the metal.

Eddy Currents' Relationship with a Slit in a Metal Layer or Metal card Body: A discontinuity interrupts or alters the amplitude and pattern of the eddy currents which result from the induced electromagnetic field generated by a contactless point of sale terminal. The eddy current density is highest near the surface of the metal layer and decreases exponentially with depth.

Hard Coat Layer for Smartcards/Clear Diamond Coat Film: Applied to a release-carrier layer and commercially supplied by Crown Roll Leaf, Inc., for example. A clear film can be hot stamped or laminated to a card body assembly to provide a card surface finish with a high abrasion resistance and high chemical resistance. This film is designed for use on transaction cards, identification cards, transit passes and other similar cards where the film is applied on the card surface. Its high durability characteristics ensure the card information remains intact through the lifetime of the card. The release-carrier layer may comprise a matte polyester film having a thickness of 23 µm.

Metal Edge & Metal Ledge Overlap: For optimum RF performance, the dimensional width of the windings (or width across multiple windings) of a sense coil, patch antenna or a pick-up coil may overlap a metal edge by 50% to capture the surface currents. The same may apply to the module antenna of a transponder chip module implanted in a metal containing transaction card. The dimensional width of the windings of the module antenna may overlap a metal ledge of a stepped cavity forming the module pocket in a card body by 50%. In the case of an antenna probe, surface currents are collected between very close metal edges. As the shape and form of the antennas may change, the dimensional width of the windings may be replaced by the surface area or volume.

Metal Grain Direction's Relationship with Bending: Bending metal against the grain or perpendicular to the grain direction is a common way to prevent material failure or cracking. Bending with the grain or parallel to the grain direction can be a contributor to material failure, as bending along the grain allows for separation of the grain boundaries.

Module Antenna: An antenna structure located on the face-down-side of a transponder chip module or dual interface chip module for inductive coupling with an in-card booster antenna or coupling frame. The antenna structure may be rectangular in shape with dimensions confined to the size of the module package having 6 or 8 contact pads on the face-up-side. The termination ends of the antenna structure with multiple windings (e.g., 13 to 15 turns) based on a frequency of interest (e.g., 13.56 MHz) may be bonded to the connection pads on the RFID chip. In the case of a coupling frame smartcard such as a dual interface metal core transaction card, the module antenna may overlap the coupling frame and/or metal layer(s) within the card body at the area of the module opening to accept the transponder chip module.

Non-metal Support Layers Associated with Slit Geometries: May include one or more of a decorative layer comprising one of wood or leather, a ceramic layer, a plastic layer, a self-supporting layer which may comprise polyimide, and flexible glass layer, or a fiberglass reinforced layer comprising an epoxy, a ceramic insert disposed in a pocket having a periphery smaller than the periphery of the metal layer. The discontinuity may be optically visible from one or both surfaces of the card.

Print Film and Overlay Material: Print films can be opaque or clear having various thicknesses depending on the position in the card body construction, as an overlay film on the rear of the card body to capture the magnetic stripe and the security elements, or form part of the core, with the films having different surface roughness, tension and VICAT temperature depending on the application. The base color of the print films can be different shades of white, colored, translucent or transparent. PVC films with an adhesive coating may be referred to as PVC WA. Transparent films may also be laser engravable.

RFID Slit Technology: Modifying a metal layer or a metal card body into a so-called "antenna circuit" by providing a discontinuity in the form of a slit, slot or gap in the metal layer or metal card body which extends from a peripheral edge to an inner area or opening of the layer or card body. The concentration of surface current at the inner area or opening can be picked up by another antenna (e.g., a module antenna) or antenna circuit by means of inductive coupling which can drive an electronic circuit such as an RFID chip attached directly or indirectly thereto. The slit may be ultra-fine (e.g., less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Screen Printing, Mist Coating, Spraying, or Curtain Coating an Acrylic or a Lacquer: Alternatives to applying a film to a card body assembly or subassembly, such as by screen printing, mist coating, spraying or curtain coating an acrylic or lacquer to the surface requiring a protective layer. Such a liquid medium can be transformed into a hard coat by the application of heat, typically in an oven.

Security Ink: Noting that ink does not require color, and while dyes and pigments are what give ink its color in most applications, the same dyes and pigments can be formulated to be invisible to the naked eye for security applications. Because invisible ink does not have color by design, most applications of invisible security ink involve a taggant that reacts with a specially designed camera, light, or scanner. When implementing security ink, the taggant is developed to react only with proper equipment using a UV, infrared, or near-infrared light at a specific wavelength. Therefore, security inks may have the following properties: invisible fluorescence; visible fluorescence; ultraviolet invisibility; IR invisibility; UV longwave and shortwave; and lightfast and non-lightfast. Photosensitive ink is visible to the naked eye but changes color or disappears when placed under a UV light.

Sense Coil, Patch Antenna and Pick-up Coil: Types of coils or antennas used to capture surface current by means of inductive coupling at the edge of a metal layer or metal card body or around a discontinuity in a metal layer or metal card body when such conductive surfaces are exposed to an electromagnetic field. The coils or antennas may be wire wound, chemically etched or laser etched, and positioned at very close proximity to a discontinuity in a metal layer, at the interface between a conductive and non-conductive surface, or at the edge of a metal layer.

Skin Depth: Level in a conductor to which electric current flows. Skin effect is the tendency of an alternating electric current to become distributed within a conductor such that the current density is largest near the surface of the conductor, and decreases with greater depths in the conductor. The electric current flows mainly at the "skin" of the conductor, between the outer surface and the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Slit Geometries: May have a variety of forms, including stair-step, sawtooth, curved, and/or sinusoidal. A portion of the path of the discontinuity may define a stair-step geometry comprising more than two changes in direction of 90 degrees. The stair-step geometry may have a rise and run, with the rise greater than the run. A portion of the path of the discontinuity may define a sawtooth geometry comprising more than two changes in direction of more than 90 degrees. The path of the discontinuity may comprise a micro stair-step geometry and a macro sawtooth geometry, comprising at least a first plurality of more than two changes in direction of 90 degrees leading to a first change in direction of more than 90 degrees and a second plurality of more than two changes in direction of 90 degrees leading to a second change in direction of more than 90 degrees. The path of the discontinuity may have at least one section of curved geometry. A portion of the path of the discontinuity may define a stair-step geometry comprising more than two changes in direction of 90 degrees, wherein the curved geometry comprises a radius at each change of direction. The discontinuity may have a sinusoidal shape comprising at least two changes in direction of more than 90 degrees. The discontinuity may extend from the first short side of the periphery to the second edge of the opening.

Varnish: A clear transparent hard protective finish or film. Varnish has little or no color and has no added pigment. Varnish finishes are usually glossy but may be designed to produce satin or semi-gloss sheens by the addition of "flatting" agents. The term "varnish" typically refers to the finished appearance of the product, and does not refer to any single or specific chemical composition or formula. There are many different compositions that achieve a varnish effect when applied. A distinction between spirit-drying (and generally removable) "lacquers" and chemical-cure "varnishes" (generally thermosets containing "drying" oils) is common, but varnish is a broad term historically and the distinction is not strict. Varnish is essentially ink without pigment and is available in many finishes including gloss, satin and dull. When applied in-line using a regular ink unit in the press, varnish can achieve exact dot-for-dot registration. Varnish manipulates how light reflects or is adsorbed into a sheet. Gloss varnish deepens colors while satin and dull finishes reduce contrast between colors. In the context of smartcards, protective varnish may have a viscosity $\eta$ under 1000 Pascal-second (Pass) and may be applied with a roller coater, while protective ink may be applied by silk screen printing.

Laser Personalization: An RFID-enabled smartcard may comprise a metal layer having a scratch protection coating over a print layer on an front face, wherein the scratch protection coating may include at least one of a layer of ink, varnish or a polymer and, optionally, a layer of hard coat lamination film. The scratch protection coating is suitable for a variety of treatments. One such treatment includes the scratch protection coating capable of being laser marked for inscribing personalization data into or onto the coating. Another such treatment includes the scratch protection coating capable of being laser engraved to partially remove the coating to create a logo or a deboss feature. Yet another such treatment includes the scratch protection coating capable of being laser treated without removal of material to create thin film effects.

I. Overview

An RFID enabled transaction card having a single metal layer or several metal layers as separated by a dielectric, a shaped opening in the metal layer or layers to accept the contour and form of a transponder chip module, such as a dual interface chip module, and at least one discontinuity, which may be referred to as slit or gap, having a certain, predetermined orientation and/or design in the metal layer or layers extending from an outer periphery perimeter edge of the card body to a termination end in the opening. The transaction card has a greater flex- or bend-resistance than a card having a straight discontinuity in the absence of mechanically reinforcing the discontinuity in the metal layer or layers. In multiple stacks of metal layers in a card body, a path of the discontinuity in each metal layer may differ in direction and shape from any point around the circumference of the chip opening in the metal. Various exemplary slit designs, including configurations and/or geometries thereof, and openings, including configuration and/or geometries thereof are described and illustrated. The slit may be filled. The slit may be reinforced. The opening may not have parallel sides. The opening may be partially filled. The shape of an opening in a first metal layer may differ from the shape of an opening in an underlying metal layer, receiving the contour and form of the transponder chip module. In a transaction card having a metal core sandwiched by upper and lower plastic layers, an upper chip hole of a chip opening in a plastic layer accepts the contour and form of the transponder chip module and may differ from a lower chip hole of the chip opening in the metal layer.

In general, as described in U.S. Pat. No. 10,762,412, entitled "DI Capacitive Embedded Metal Card," filed on Mar. 22, 2018, and incorporated by reference herein, an opening in the metal layer has a first edge parallel and relatively closest to a first short side of a card periphery and aligned with a first portion of the card periphery. A second edge of the opening is parallel and relatively closest to a first long side of the periphery. A third edge of the opening is parallel and relatively closest to a second long side of the periphery. The first edge of the opening is relatively closer to the short side of the periphery than the second edge is to the long side of the periphery. The second edge of the opening is relatively closer to the first long side of the periphery than the third edge is to the second long side of the card periphery. The edges of the opening define corners. The opening may be a stepped opening having a first open area defined in the first surface of the card and a second open area defined in the second surface of the card, wherein the first open area is greater than the second open area.

The reference describes a rectangular opening with parallel sides relative to the card body with a slit in the metal layer emanating from a peripheral edge to the opening. However, the mechanical stability of the card body is also determined by the shape of the opening in combination with the shape of the slit. The reference is silent on the shape of the opening.

In some examples, the path of the discontinuity comprises at least two changes in direction of 45 degrees or more relative to the x-axis or the y-axis. At least a portion of the path of the discontinuity may define a stairstep geometry comprising more than two changes in direction or a portion of the path of the discontinuity may define a sawtooth geometry comprising more than two changes in direction, or a combination thereof.

In another examples, the slit may extend along any direction from the shaped opening to the periphery of the metal card body. The slit may extend from a position anywhere or any position on the inner edge or ledge of the shaped opening to another position anywhere on the outer edge or peripheral of the card body. The slit may be disposed an angle other than perpendicular to the outer peripheral edge, and the slit may be disposed diagonally with respect to the outer peripheral edge and the slit may be disposed at a 45° angle with respect to the outer peripheral edge.

In a further example, the shaped opening in the metal layer or layers may have any one of the following forms: oval, round, diamond, elliptical, polygon, parallelogram, trapezoidal, rotational or irregular, or a combination thereof.

The loops of electrical current, referred to as eddy currents, induced within a metal layer by the changing electromagnetic field generated by a contactless point of sale terminal react back on the source and thus attenuate the field. In a further example, this flow of eddy currents can be manipulated by introducing a slit, such as including a channel in an edge to edge metal layer forming a metal card body which commences at a non-rectangular shaped chip opening and leads to an opening in the center of the card body having metal artwork as a distinguishing feature, with the slit extending to an outer periphery, including a peripheral edge, or a boundary region of the metal card body. The metal edge or ledge of the center opening in the metal layer closely couples with an underlying antenna circuit to pick up surface currents which inductively drives the transponder chip module, which is also known as an inductive coupling chip module, or directly powers an RFID chip module without a module antenna residing in the non-rectangular shaped chip opening of the metal card body. The antenna circuit may not be visible from the front face of the card body, but rather hidden under a layer of synthetic material with a printed design which aesthetically blends in with the opening in a front face metal layer. Such a card construction may be particularly mechanically robust given that the slit does not commence at a peripheral edge on the left, ATM insertion side of the card body, but rather commences at the non-rectangular shaped chip opening and extends to the right side of the card body. A further feature of this card construction is the propagation of the magnetic flux lines during interrogation from a contactless point of sale terminal, coming from the center of the card body and not from the transponder chip module, which is general practice with metal cards using RFID slit technology for contactless communication. In the passage of the slit from an endpoint a terminus in the non-rectangular module opening, which is at ISO position in the card body, to the right, top or bottom side of the card body at an origin located at a periphery edge of the metal card body, the slit may form part of the graphics or alphanumeric script, such as the name of an issuing bank or payment scheme logo.

In another example, an RFID metal face transaction card may comprise of a front face metal layer, which is relatively thin, with a micro-slit, such as ~50 µm, and may be color printed or color coated, such as with a primer and/or an ink, and protected by a laser-reactive diamond coat. The laser-reactive diamond coat may be a protective coating, such as ink, varnish or a polymer coating, having several layers and/or a hard top-coat lamination film. The color and diamond coat may camouflage the presence of the micro-slit. The front face metal layer may be further strengthened by a supporting metal layer, which is relatively thick, with a narrow slit, such as ~100 µm. The two metal layers may be separated by a PEN dielectric with a thermosetting epoxy on both sides which has been cured to an irreversible state, which may be referred to as a C-stage, after the lamination process. A lower chip hole of a chip opening in the supporting metal layer may have geometry, including a shape, which matches a geometry, including a shape, of a module antenna. An upper chip hole of chip opening in the front face metal layer may have an alignment feature for correct alignment. The shape of the upper and lower chip holes of chip opening may be polygonal in shape. The insertion of the transponder chip into the chip opening after milling the upper and lower chip holes of chip opening and using a heat and pressure to activate adhesive tape layer for attachment, may result because of dimensional tolerances in the transponder chip module residing on the dielectric layer, on the c-stage adhesive layer or on the supporting metal layer, with little, including no, degradation in the bond strength of the attachment. The surface of the metal layers with a slit and associated edges may be provided with an insulating medium such as an oxide layer or a non-conductive diamond-like-carbon coating, to ensure that the problem associated with an ESD event and/or a slit short circuit condition is reduced, such as being minimized.

According to one example, an RFID-enabled metal face transaction card may comprise: a first metal layer with a first, upper chip hole of a shaped chip opening; a second metal layer with a second, lower chip hole of the shaped chip opening; wherein: the second lower chip hole of the shaped chip opening has a shape and geometry which matches the shape and geometry of a module antenna of a transponder chip module which will be inserted into the card. The first, upper chip hole of a shaped chip opening may have an alignment feature for ensuring correct alignment of a transponder chip module inserted into the chip opening. At least one of the first and second chip holes may have a polygonal shape which matches the shape of the module antenna, with a size that allows for the module antenna to at least partially overlap the metal layer outside of the module opening.

By way of further example, the second metal layer may be at least twice as thick as the first metal layer. The first metal layer has a first slit; and a second metal layer has a second slit which may be wider than the first slit. The first and second slits may be aligned offset, nearly one over the other, so as to be as close as possible without overlapping each other, so that the metal of one metal layer supports the slit of the other metal layer.

In one example, a polymeric carrier layer which may be a PET or PEN dielectric layer, with thermosetting epoxy on both sides may be disposed between the first and second metal layers. According to one example, the thermosetting epoxy is cured to an irreversible state, which may be referred to as a C-stage, when laminated with the first and second metal layers.

The above overview of one or more examples of a metal transaction card includes a variety of features which may be incorporated in whole or in part into a metal transaction card for EMV payment transactions. One or more aspects of these features will be discussed below in the context of examples of metal transaction cards (410, 510, 610, 710, 810, 910, 1010, 1110, 1210, 1310, 1410, 1510, 1610, 1710, 1810, 1910, 2010, 2110, 2214, 2314, 2414, 2514, 2600, 2700, 2800, 2900, 3000, 3100, 3200, 3310, 3410, 3510, 3610, 3710, 3810) with one or more combinations of shaped slits (20, 120, 220, 320, 420, 1320, 1420, 1520, 1620, 1720, 1820, 1920, 2020, 2120, 2524, 2734, 2834, 2934, 2935, 3034, 3035, 3134, 3135, 3234, 3235, 3312, 3412, 3512, 3612, 3712, 3812, 3952), shaped chip openings (16, 116, 216, 316, 416, 516, 616, 716, 816, 916, 1016, 1116, 1216, 2738, 2838, 2938, 3038, 3138, 3238, 3314, 3414, 3514, 3614, 3714, 3814, 3920), and/or transponder chip modules (1258, 2334, 2336, 2780, 2880, 2939, 3070, 3170, 3270, 3318, 3418, 3518, 3618, 3718, 3818, 3910). It will be appreciated that these features may be incorporated into a metal transaction card in various combinations and/or in accordance with the above overview such that the invention is not intended to be unnecessarily limited to any particular example shown and described herein.

II. Rfid Enabled Metal Transaction Cards with Various Arrangements of a Shaped Opening and a Shaped Slit In some instances, an RFID enabled metal transaction cards may include a metal transaction card body, a shaped slit, one or more metal layers having the shaped slits respectively therein, and a shaped chip opening. The following will address one or more features associated with an RFID enabled metal transaction card for improved structural integrity and performance, such as for EMV payment transactions.

A. First Exemplary Arrangement of a Shaped Opening and a Shaped Slit

FIG. 1 shows a materials sheet (10) including a 25-up metal layer (12) having a front face (14) and an opposing rear face (not shown). The present example of materials sheet (10) includes only metal layer (12), but other examples of materials sheet may alternatively include additional layers, including plastic or metal layers. A first example of a plurality of chip openings (16) including a lower shaped chip hole (18) as well as a respective first example of a plurality of shaped slits (20) are shown formed into metal layer (12) in anticipation of an upper shaped chip hole (22) being formed around lower shaped chip hole (18) and singulation of a plurality of metal transaction card bodies (24). To this end, a first exemplary metal transaction card body (24) has a long bottom body edge (26), a long top body edge (28), a short right lateral body edge (30), and a short left lateral body edge (32) as viewed from front face (14) and shown in FIG. 1. Bottom and top body edges (26, 28) are generally parallel to each other and may be referred to herein as relatively horizontal. Right and left lateral body edges (30, 32) are generally parallel to each other and may be referred to herein as relatively vertical. Bottom and top body edges (26, 28) are thus perpendicular to right and left lateral body edges (30, 32). Bottom and top body edges (26, 28) in conjunction with right and left lateral body edges (30, 32) define an outer periphery (34) of metal transaction card body (24).

In the present example, lower shaped chip hole (18) has a generally elliptical shape defined by a lower edge (36), and shaped slit (20) has a pair of linear channels (38, 40) that intersect each other and extend from lower shaped chip hole (18) to outer periphery (34). More particularly, linear channel (38) has an origin (42) of shaped slit (20) in outer periphery (34) at left lateral body edge (32) and extends horizontally from origin (42) to intersect linear channel (40). Linear channel (40) extends at a predetermined angle toward lower shaped chip hole (18) and opens into lower edge (36) at an endpoint (44) of shaped slit (20).

Linear channel (40) thus extends through upper shaped chip hole (22) to endpoint (44) in lower edge (36). In the present example, upper shaped chip hole (22) is generally rectangular with arcuate, rounded corners defined by upper edge (46) such that linear channel (40) extends through a bottom left rounded corner of upper edge (46) toward endpoint (44). Shaped slit (20) thus also includes a terminus (47) at upper edge (46) as at least a portion of shaped slit (20) opens into upper shaped chip hole (22) of chip opening (16). In the present example, chip opening (16) is configured to receive a transponder chip module (not shown) such that chip opening (16) is the same shape as an module antenna (not shown) for improved performance relative to dissimilar shapes between chip opening (16) and module antenna (not shown). While chip opening (16) with the particular lower and upper shaped chip holes (18, 22) in conjunction with the particular shaped slit (20) is shown in the present example of FIG. 1, alternative arrangements and shapes for receiving transponder chip module (not shown) relative to a slit for inductive coupling may be similarly integrated into an alternative metal transaction card such that the invention is not intended to be unnecessarily limited to the particular chip opening (16) and shaped slit (20) shown and described herein.

B. Second Exemplary Arrangement of a Shaped Opening and a Shaped Slit

Figure 2:
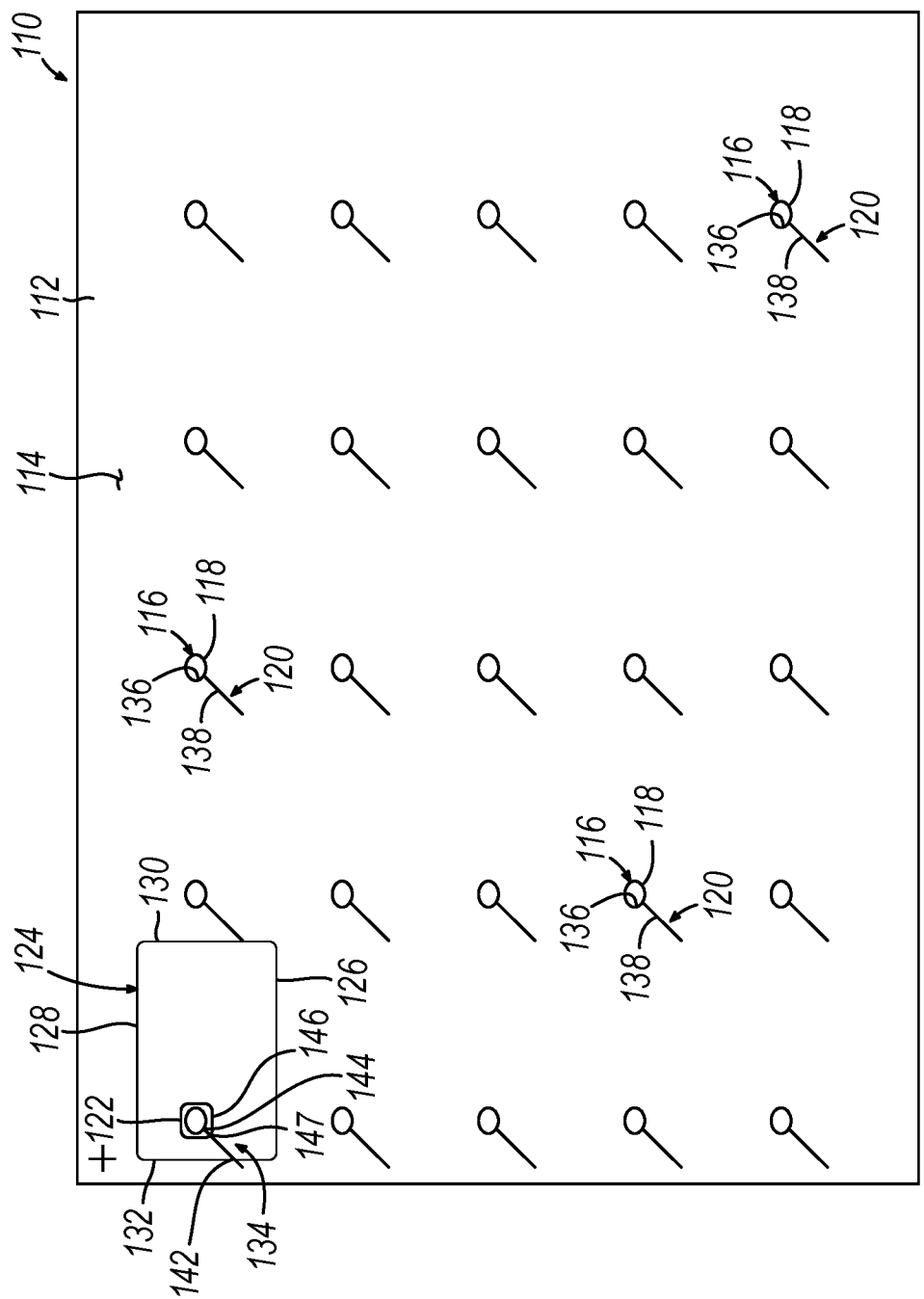
FIG. 2 depicts a front elevational view of another exemplary materials sheet for forming at least one metal transaction card body having a second exemplary arrangement of a second exemplary shaped opening and a second exemplary shaped slit.

FIG. 2 shows a materials sheet (110) including a 25-up metal layer (112) having a front face (114) and an opposing rear face (not shown). The present example of materials sheet (110) includes only metal layer (112), but other examples of materials sheet may alternatively include additional layers, including plastic or metal layers. A second example of a plurality of chip openings (116) including a lower shaped chip hole (118) as well as a respective second example of a plurality of shaped slits (120) are shown formed into metal layer (112) in anticipation of an upper shaped chip hole (122) being formed around lower shaped chip hole (118) and singulation of a plurality of metal transaction card bodies (124). To this end, a second exemplary metal transaction card body (124) has a long bottom body edge (126), a long top body edge (128), a short right lateral body edge (130), and a short left lateral body edge (132) as viewed from front face (114) and shown in FIG. 2. Bottom and top body edges (126, 128) are generally parallel to each other and may be referred to herein as relatively horizontal. Right and left lateral body edges (130, 132) are generally parallel to each other and may be referred to herein as relatively vertical. Bottom and top body edges (126, 128) are thus perpendicular to right and left lateral body edges (130, 132). Bottom and top body edges (126, 128) in conjunction with right and left lateral body edges (130, 132) define an outer periphery (134) of metal transaction card body (124).

In the present example, lower shaped chip hole (118) has a generally elliptical shape defined by a lower edge (136), and shaped slit (120) has a linear channel (138) that extends from lower shaped chip hole (118) to outer periphery (134). More particularly, linear channel (138) has an origin (142) of shaped slit (120) in outer periphery (134) at left lateral body edge (132) and extends at a predetermined angle from origin (142) toward lower shaped chip hole (118) and opens into lower edge (136) at a endpoint (144) of shaped slit (120).

Linear channel (138) thus extends through upper shaped chip hole (122) to endpoint (144) in lower edge (136). In the present example, upper shaped chip hole (122) is generally rectangular with arcuate, rounded corners defined by upper edge (146) such that linear channel (138) extends through a bottom left rounded corner of upper edge (146) toward endpoint (144). Shaped slit (120) thus also includes a terminus (147) at upper edge (146) as at least a portion of shaped slit (120) opens into upper shaped chip hole (122) of chip opening (116). In the present example, chip opening (116) is configured to receive a transponder chip module (not shown) such that chip opening (116) is the same shape as an module antenna (not shown) for improved performance relative to dissimilar shapes between chip opening (116) and module antenna (not shown). While chip opening (116) with the particular lower and upper shaped chip holes (118, 122) in conjunction with the particular shaped slit (120) is shown in the present example of FIG. 2, alternative arrangements and shapes for receiving transponder chip module (not shown) relative to a slit for inductive coupling may be similarly integrated into an alternative metal transaction card such that the invention is not intended to be unnecessarily limited to the particular chip opening (116) and shaped slit (120) shown and described herein.

C. Third Exemplary Arrangement of a Shaped Opening and a Shaped Slit

Figure 3:
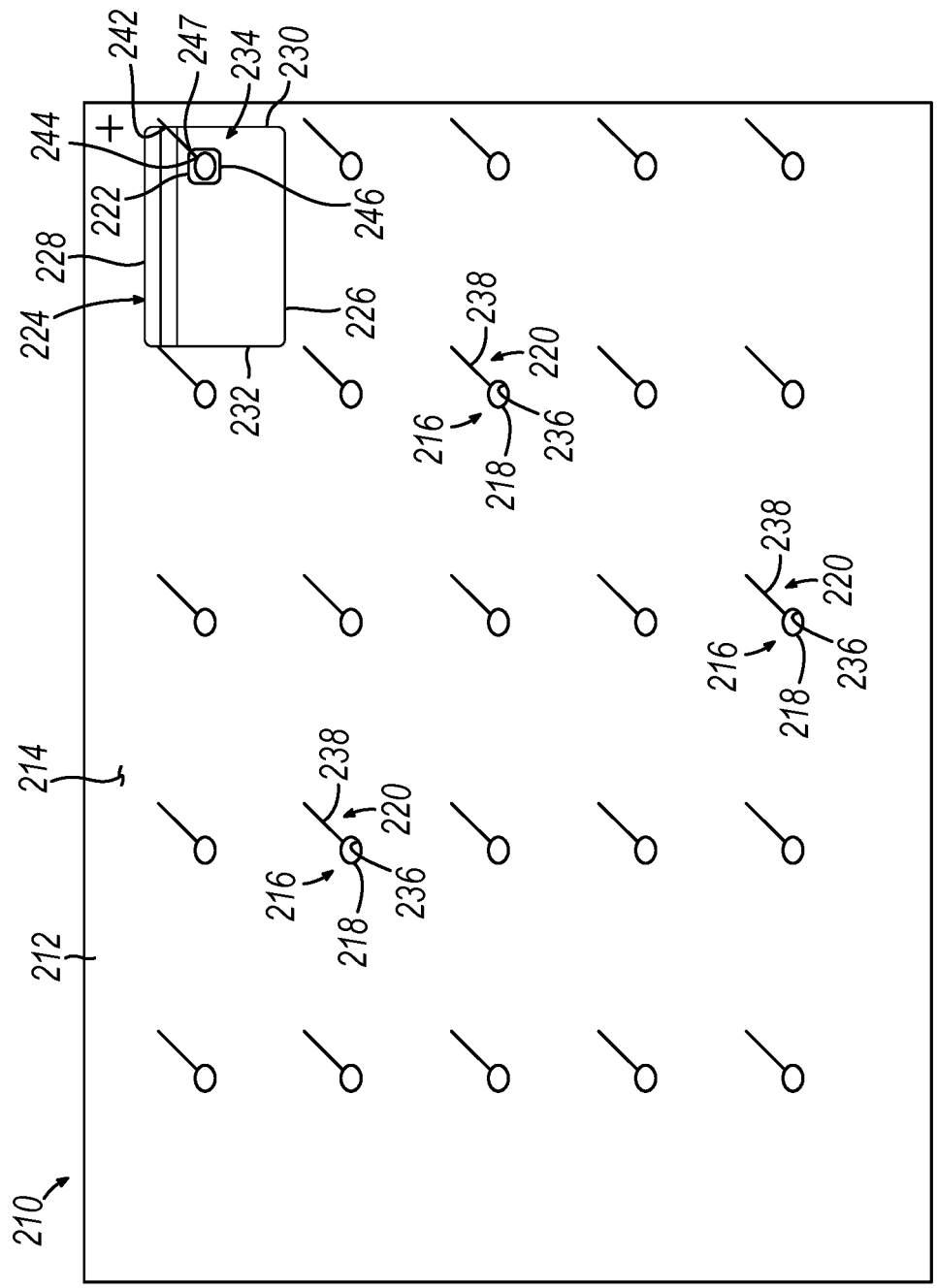
FIG. 3 depicts a front elevational view of another exemplary materials sheet for forming at least one metal transaction card body having a third exemplary arrangement of a third exemplary shaped opening and a third exemplary shaped slit.

FIG. 3 shows a materials sheet (210) including a 25-up metal layer (212) having a front face (not shown) and an opposing rear face (215). The present example of materials sheet (210) includes only metal layer (212), but other examples of materials sheet may alternatively include additional layers, including plastic or metal layers. A third example of a plurality of chip openings (216) including a lower shaped chip hole (218) as well as a respective third example of a plurality of shaped slits (220) are shown formed into metal layer (212) in anticipation of an upper shaped chip hole (222) being formed around lower shaped chip hole (218) and singulation of a plurality of metal transaction card bodies (224). To this end, a third exemplary metal transaction card body (224) has a long bottom body edge (226), a long top body edge (228), a short right lateral body edge (230), and a short left lateral body edge (232) as viewed from rear face (215) and shown in FIG. 3. Bottom and top body edges (226, 228) are generally parallel to each other and may be referred to herein as relatively horizontal. Right and left lateral body edges (230, 232) are generally parallel to each other and may be referred to herein as relatively vertical. Bottom and top body edges (226, 228) are thus perpendicular to right and left lateral body edges (230, 232). Bottom and top body edges (226, 228) in conjunction with right and left lateral body edges (230, 232) define an outer periphery (234) of metal transaction card body (224).

In the present example, lower shaped chip hole (218) has a generally elliptical shape defined by a lower edge (236), and shaped slit (220) has a linear channel (238) that extends from lower shaped chip hole (218) to outer periphery (234). More particularly, linear channel (238) has an origin (242) of shaped slit (220) in outer periphery (234) at right lateral body edge (230) and extends at a predetermined angle from origin (242) toward lower shaped chip hole (218) and opens into lower edge (236) at an endpoint (244) of shaped slit (220).

Linear channel (238) thus extends through upper shaped chip hole (222) to endpoint (244) in lower edge (236). In the present example, upper shaped chip hole (222) is generally rectangular with arcuate, rounded corners defined by upper edge (246) such that linear channel (238) extends through a top right rounded corner of upper edge (246) toward endpoint (244). Shaped slit (220) thus also includes a terminus (247) at upper edge (246) as at least a portion of shaped slit (220) opens into upper shaped chip hole (222) of chip opening (216). In the present example, chip opening (216) is configured to receive a transponder chip module (not shown) such that chip opening (216) is the same shape as an module antenna (not shown) for improved performance relative to dissimilar shapes between chip opening (216) and module antenna (not shown). While chip opening (216) with the particular lower and upper shaped chip holes (218, 222) in conjunction with the particular shaped slit (220) is shown in the present example of FIG. 3, alternative arrangements and shapes for receiving transponder chip module (not shown) relative to a slit for inductive coupling may be similarly integrated into an alternative metal transaction card such that the invention is not intended to be unnecessarily limited to the particular chip opening (216) and shaped slit (220) shown and described herein.

D. Fourth Exemplary Arrangement of a Shaped Opening and a Shaped Slit

Figure 4:
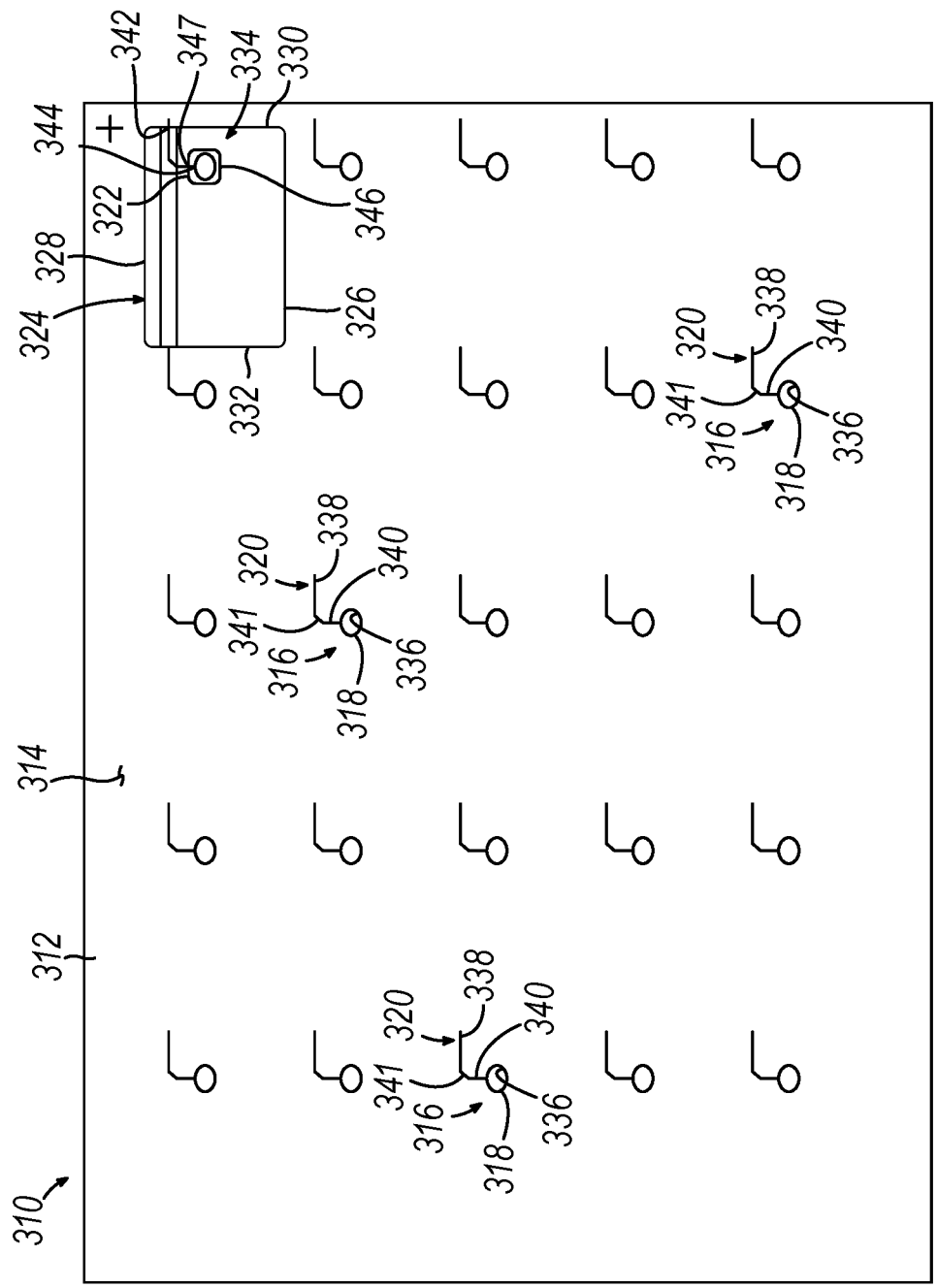
FIG. 4 depicts a front elevational view of another exemplary materials sheet for forming at least one metal transaction card body having a fourth exemplary arrangement of a fourth exemplary shaped opening and a fourth exemplary shaped slit.
Figure 5:
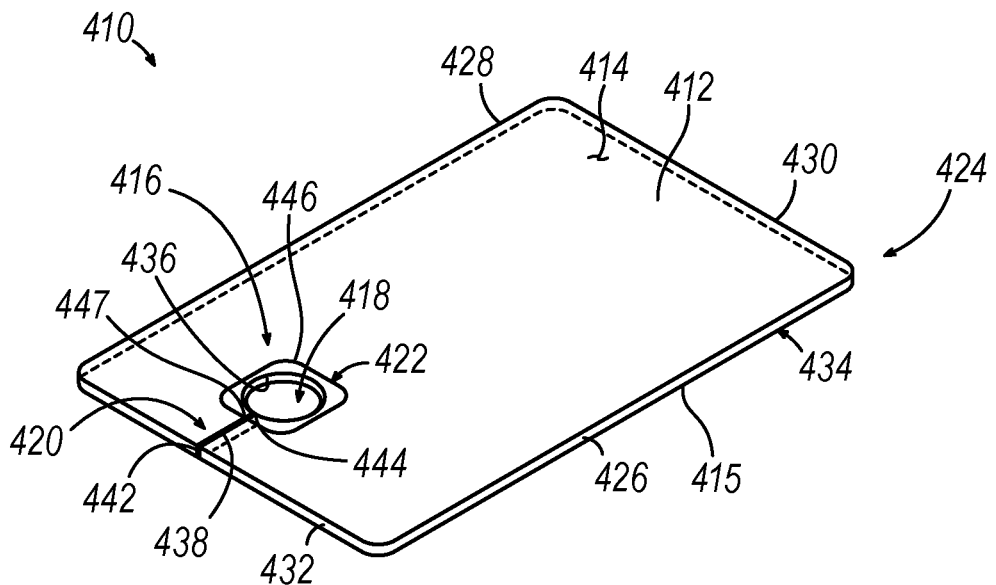
FIG. 5 depicts a front perspective view of an exemplary metal transaction card having a fifth exemplary arrangement of a fifth exemplary shaped opening and a fifth exemplary shaped slit.
Figure 6:
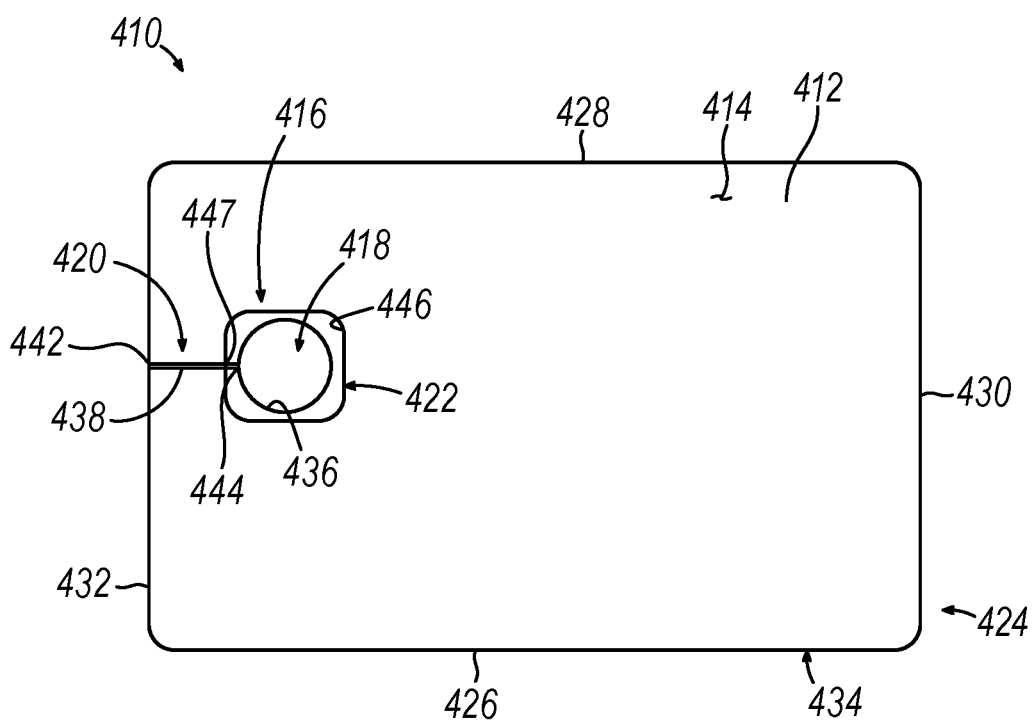
FIG. 6 depicts a front elevational view of the metal transaction card of FIG. 5.
Figure 7:
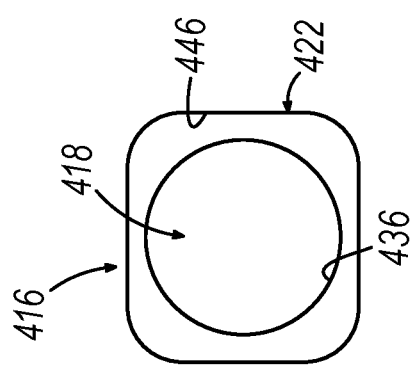
FIG. 7 depicts a magnified front elevational view of the fifth shaped opening of FIG. 5.
Figure 8:
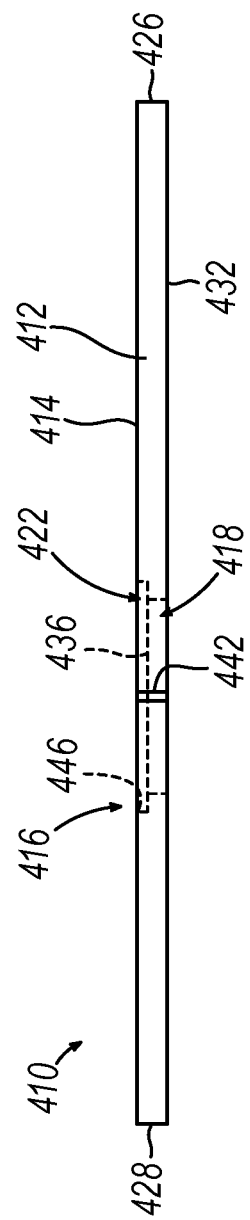
FIG. 8 depicts a side elevational view of the metal transaction card of FIG. 5.
Figure 9:
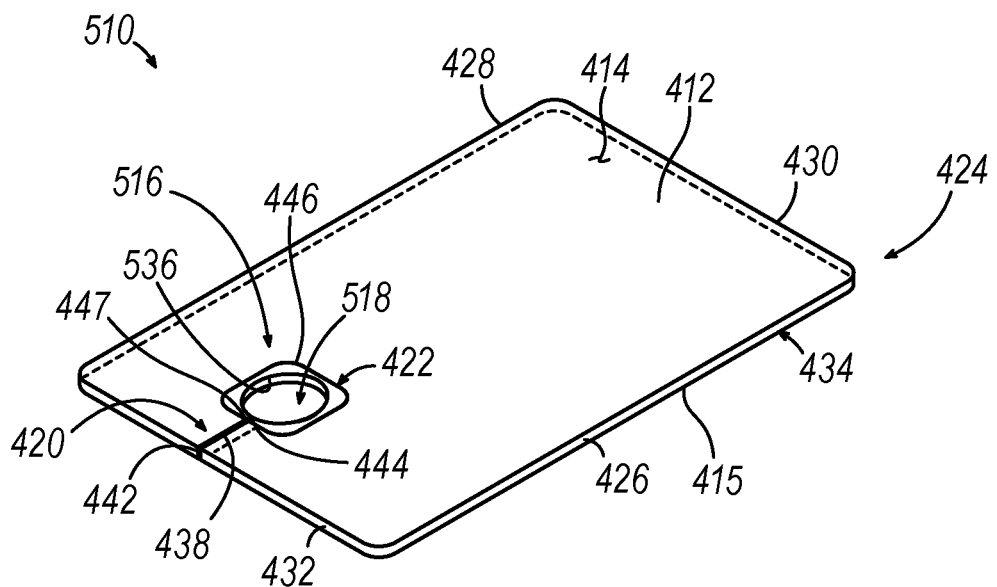
FIG. 9 depicts a front perspective view of another exemplary metal transaction card having a sixth exemplary arrangement of a sixth exemplary shaped opening and the fifth shaped slit.
Figure 10:
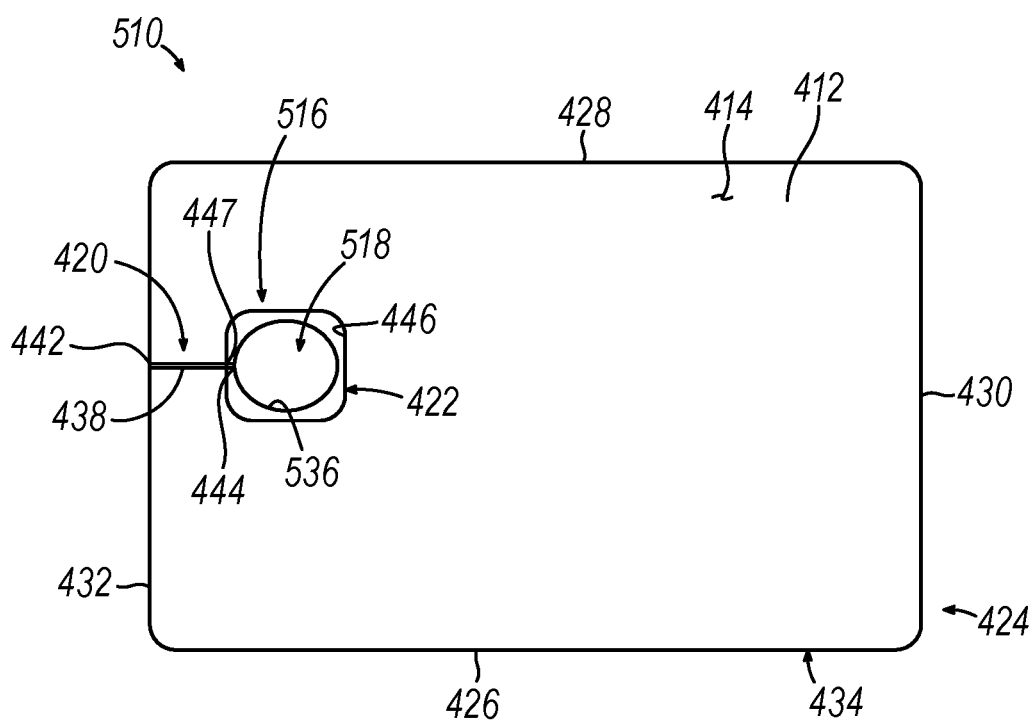
FIG. 10 depicts a front elevational view of the metal transaction card of FIG. 9.
Figure 13:
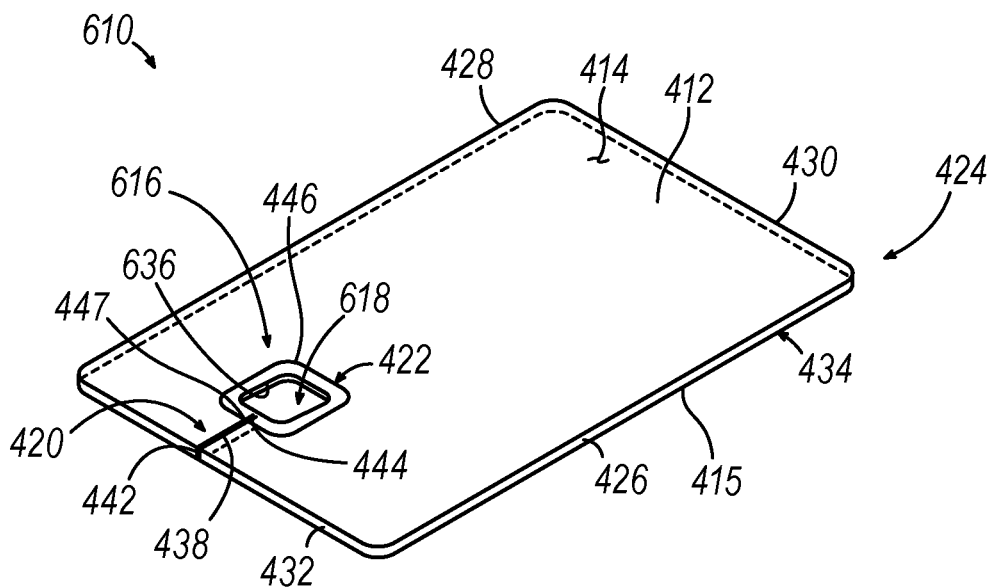
FIG. 13 depicts a front perspective view of another exemplary metal transaction card having a seventh exemplary arrangement of a seventh exemplary shaped opening and the fifth shaped slit.
Figure 14:
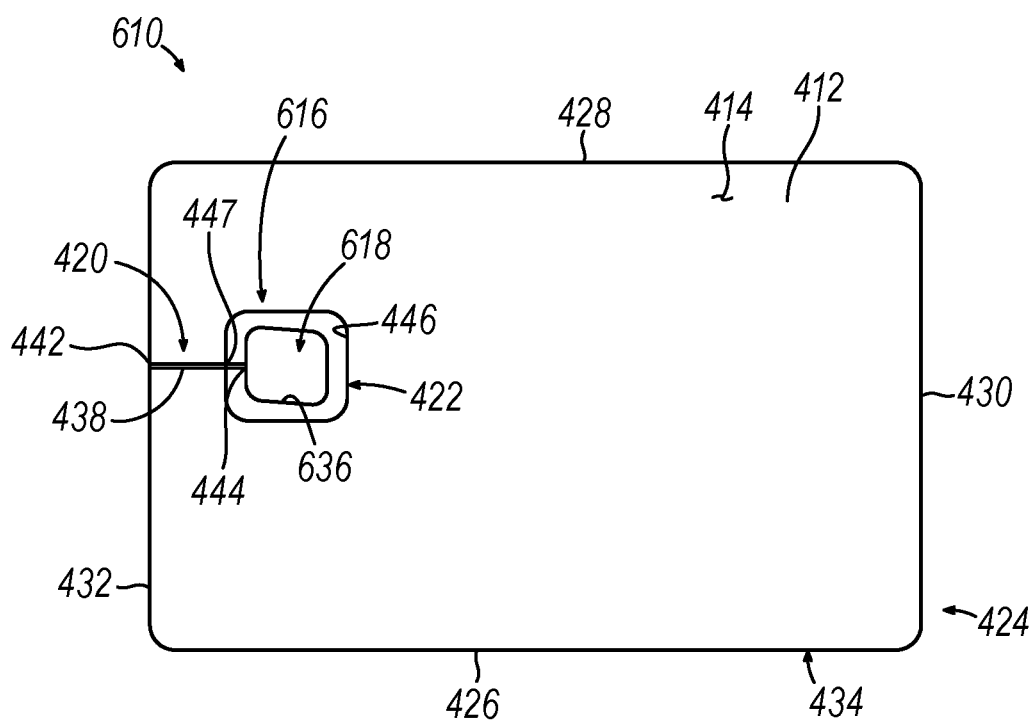
FIG. 14 depicts a front elevational view of the metal transaction card of FIG. 13.
Figure 17:
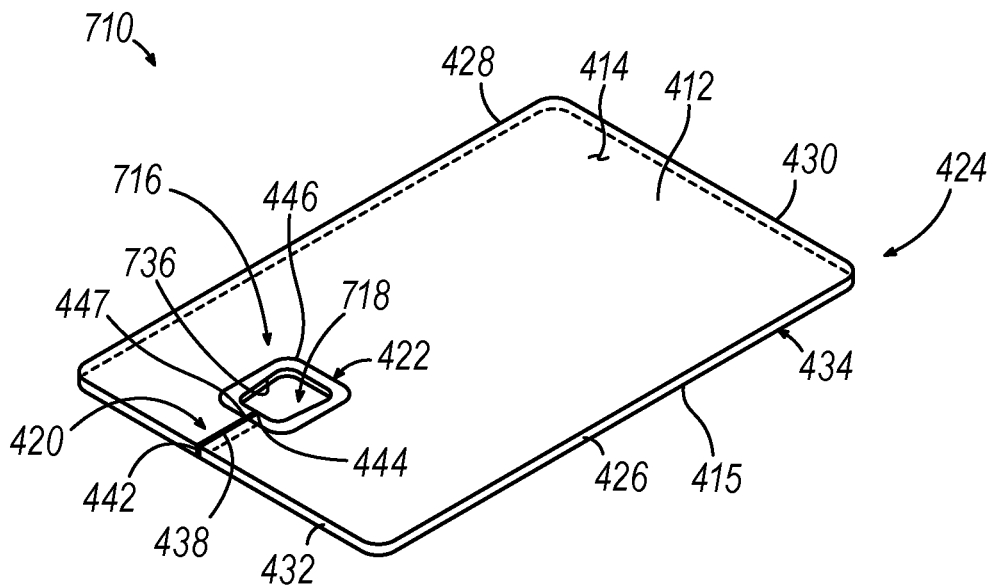
FIG. 17 depicts a front perspective view of another exemplary metal transaction card having an eighth exemplary arrangement of an eighth exemplary shaped opening and the fifth shaped slit.
Figure 18:
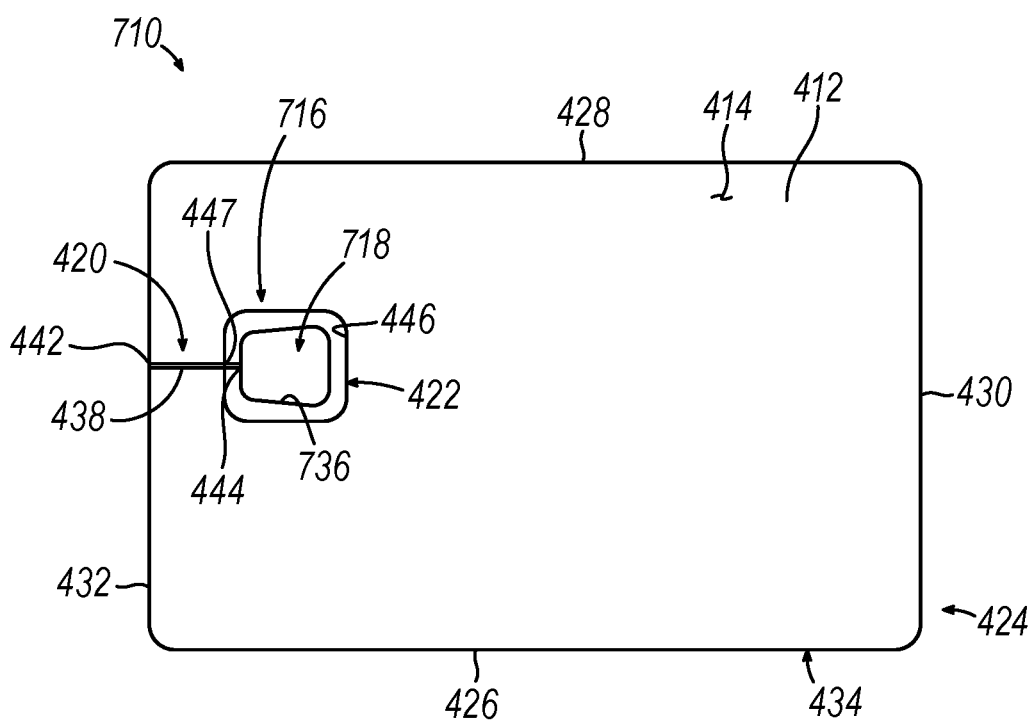
FIG. 18 depicts a front elevational view of the metal transaction card of FIG. 17.
Figure 19:
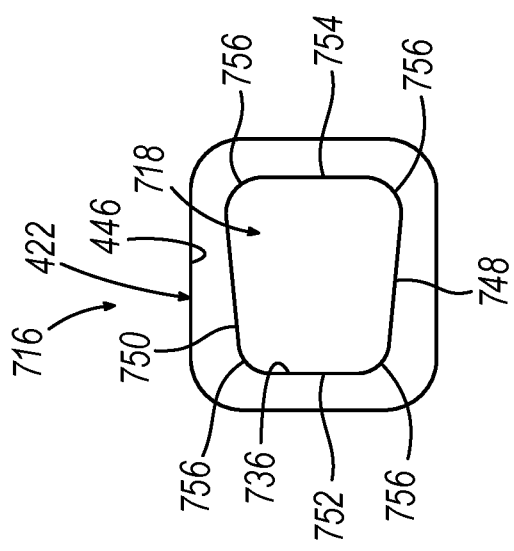
FIG. 19 depicts a magnified front elevational view of the eighth shaped opening of FIG. 17.
Figure 20:
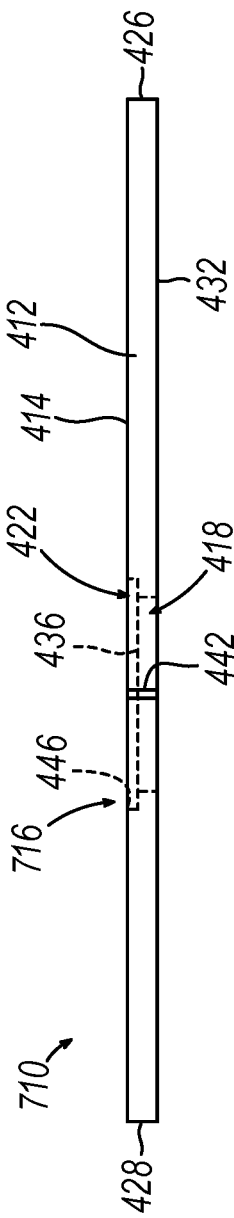
FIG. 20 depicts a side elevational view of the metal transaction card of FIG. 17.
Figure 21:
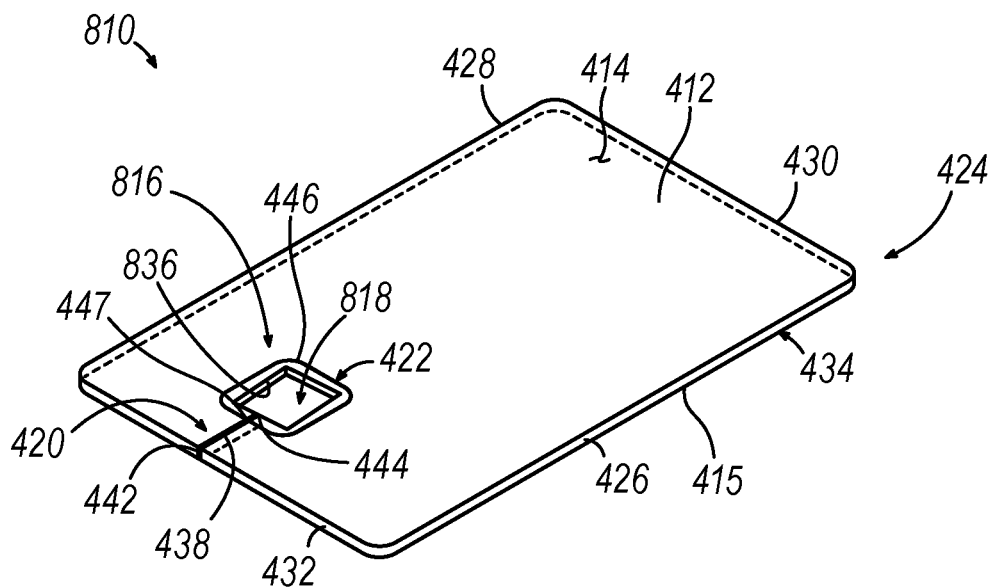
FIG. 21 depicts a front perspective view of another exemplary metal transaction card having a ninth exemplary arrangement of a ninth exemplary shaped opening and the fifth shaped slit.
Figure 22:
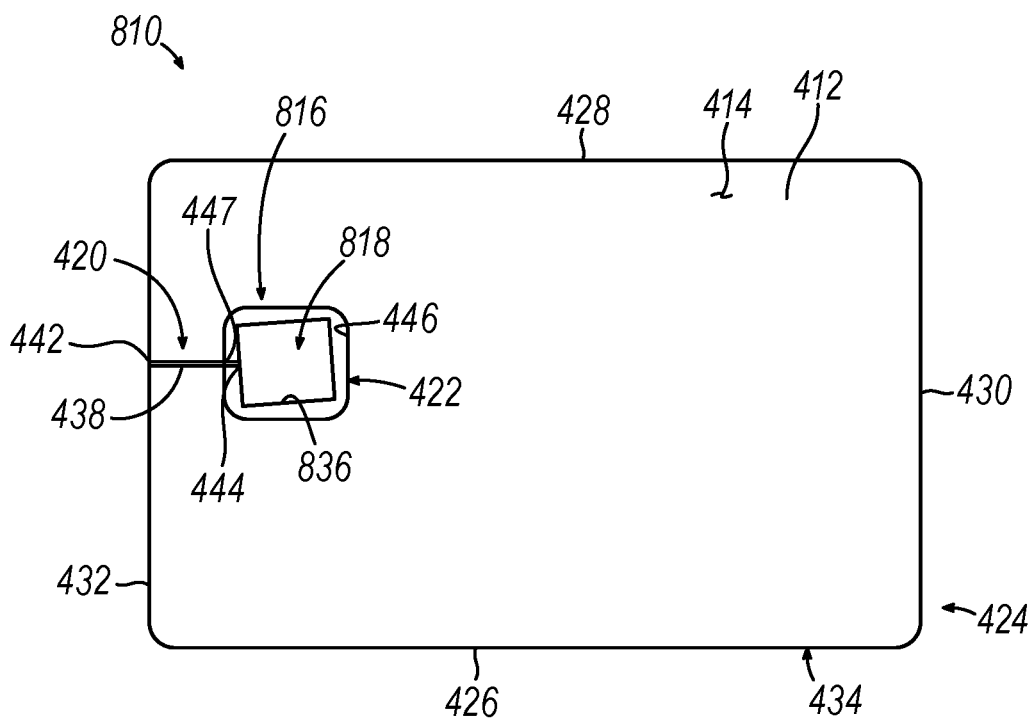
FIG. 22 depicts a front elevational view of the metal transaction card of FIG. 21.
Figure 25:
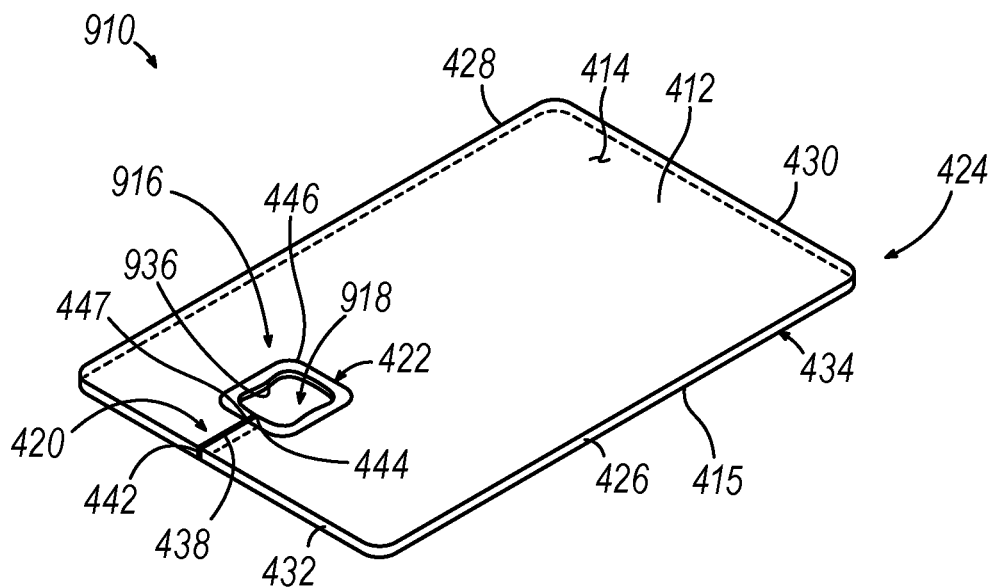
FIG. 25 depicts a front perspective view of another exemplary metal transaction card having a tenth exemplary arrangement of a tenth exemplary shaped opening and the fifth shaped slit.
Figure 26:
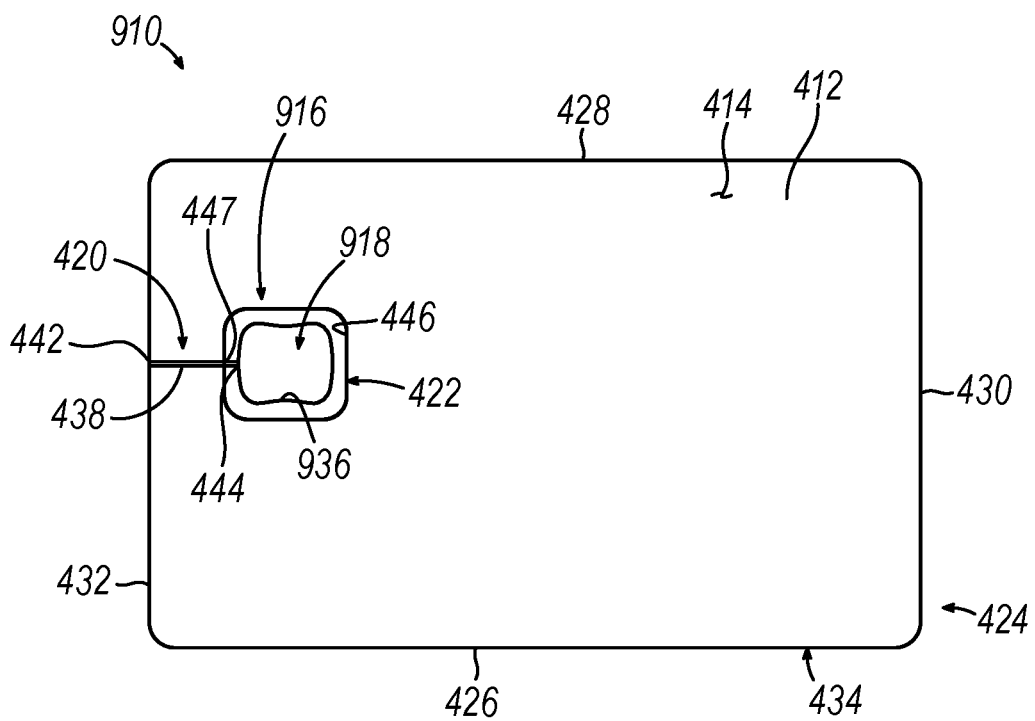
FIG. 26 depicts a front elevational view of the metal transaction card of FIG. 25.
Figure 29:
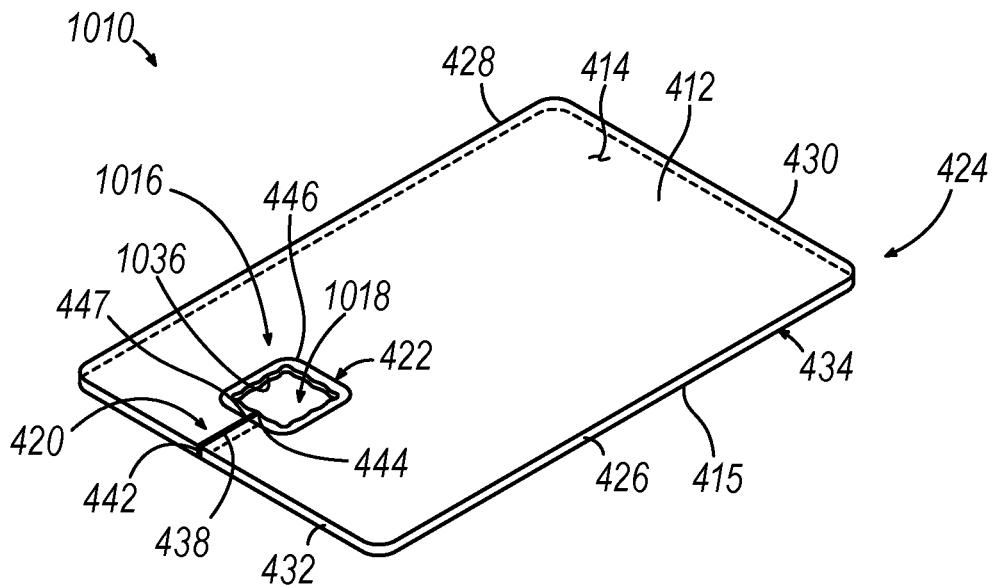
FIG. 29 depicts a front perspective view of another exemplary metal transaction card having an eleventh exemplary arrangement of an eleventh exemplary shaped opening and the fifth shaped slit.
Figure 30:
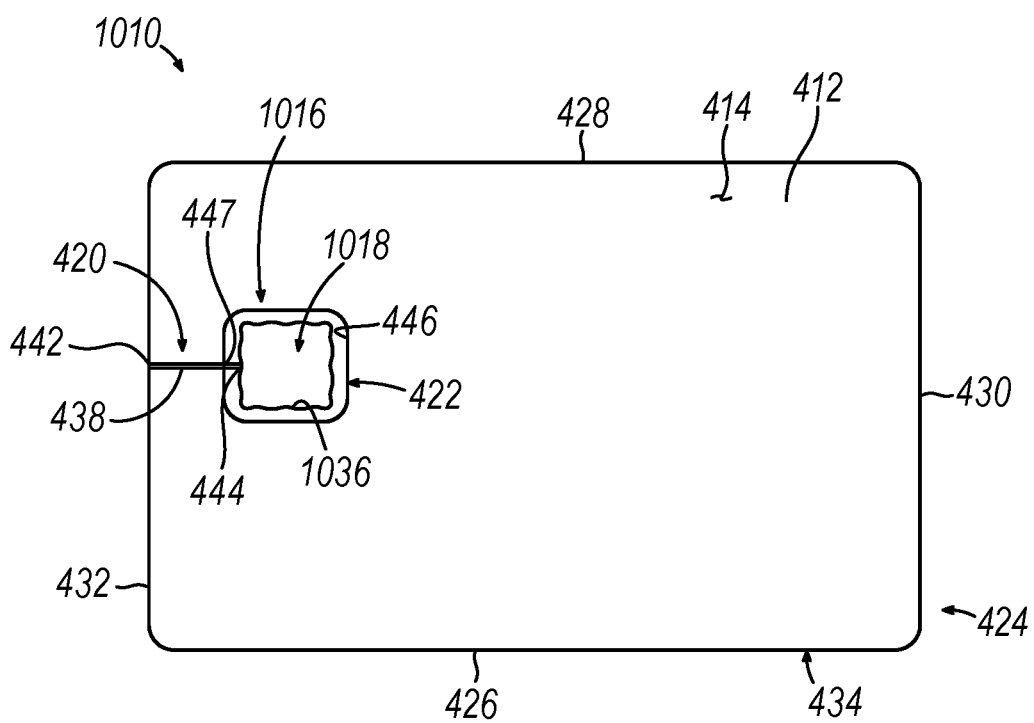
FIG. 30 depicts a front elevational view of the metal transaction card of FIG. 29.
Figure 33:
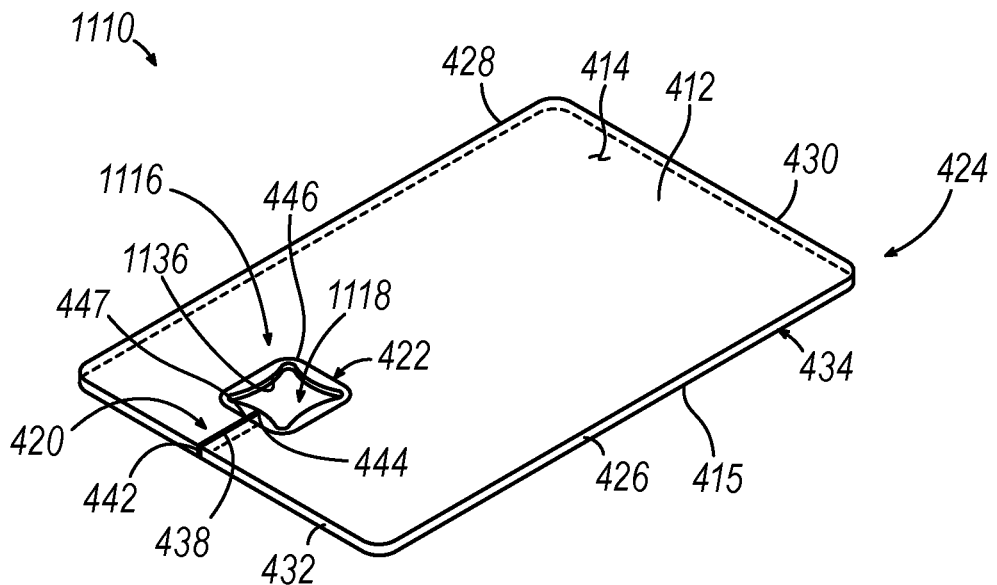
FIG. 33 depicts a front perspective view of another exemplary metal transaction card having a twelfth exemplary arrangement of a twelfth exemplary shaped opening and the fifth shaped slit.
Figure 34:
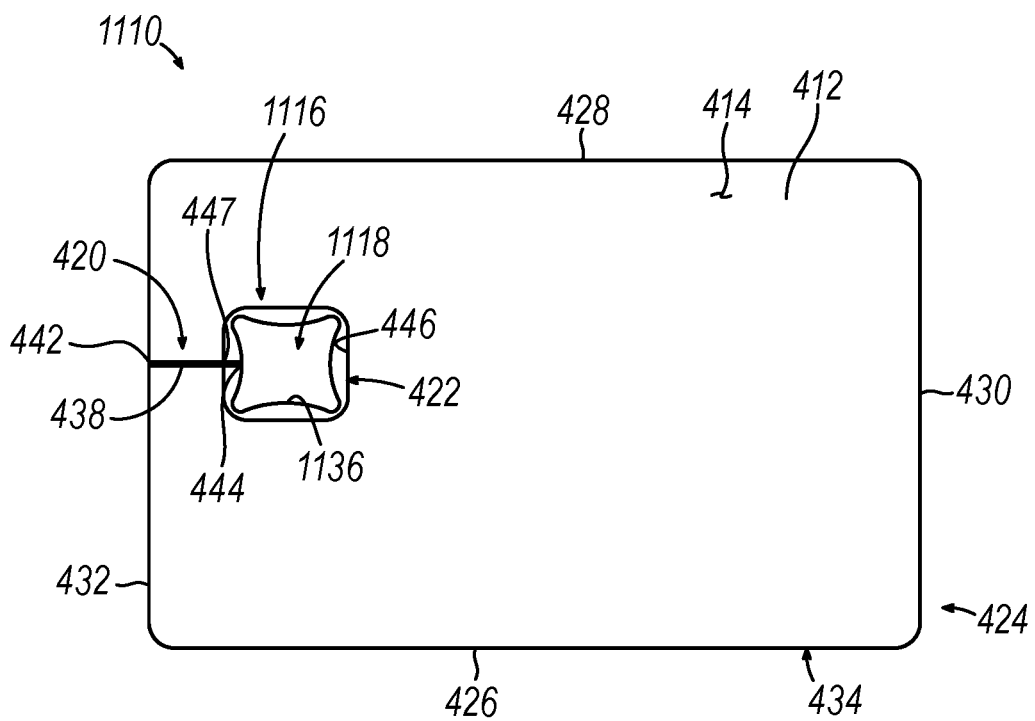
FIG. 34 depicts a front elevational view of the metal transaction card of FIG. 33.
Figure 37:
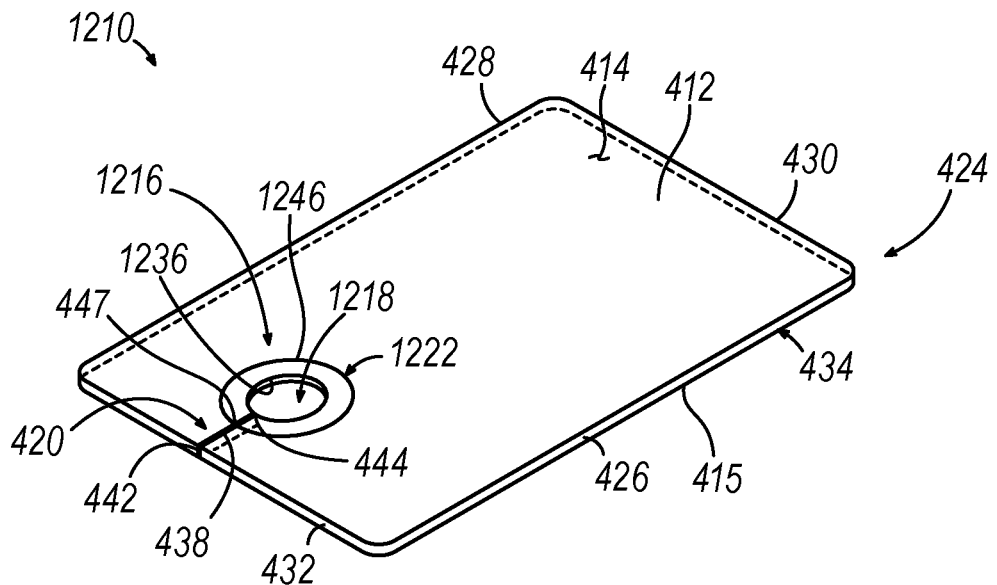
FIG. 37 depicts a front perspective view of another exemplary metal transaction card having a thirteenth exemplary arrangement of a thirteenth exemplary shaped opening and the fifth shaped slit.
Figure 38:
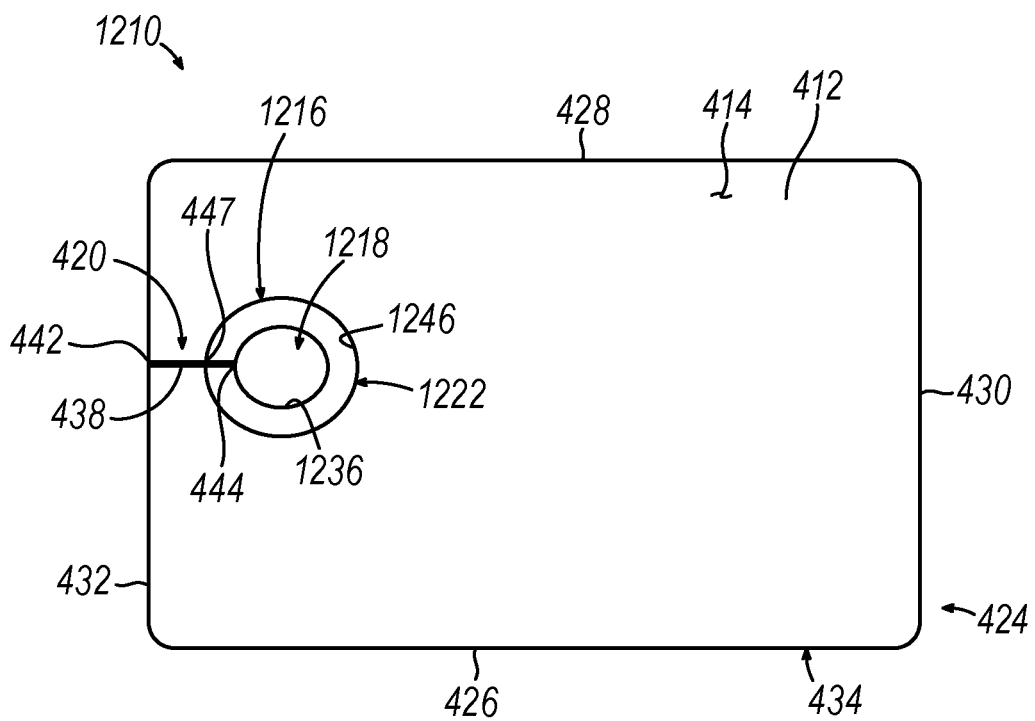
FIG. 38 depicts a front elevational view of the metal transaction card of FIG. 37.
Figure 39:
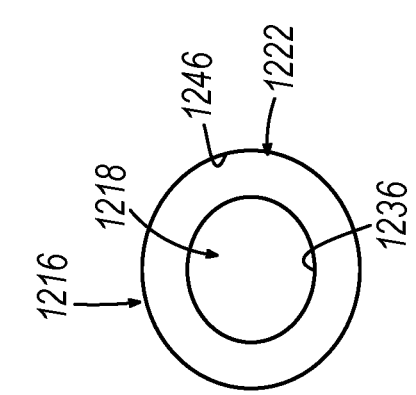
FIG. 39 depicts a magnified front elevational view of the thirteenth shaped opening of FIG. 37.
Figure 40:
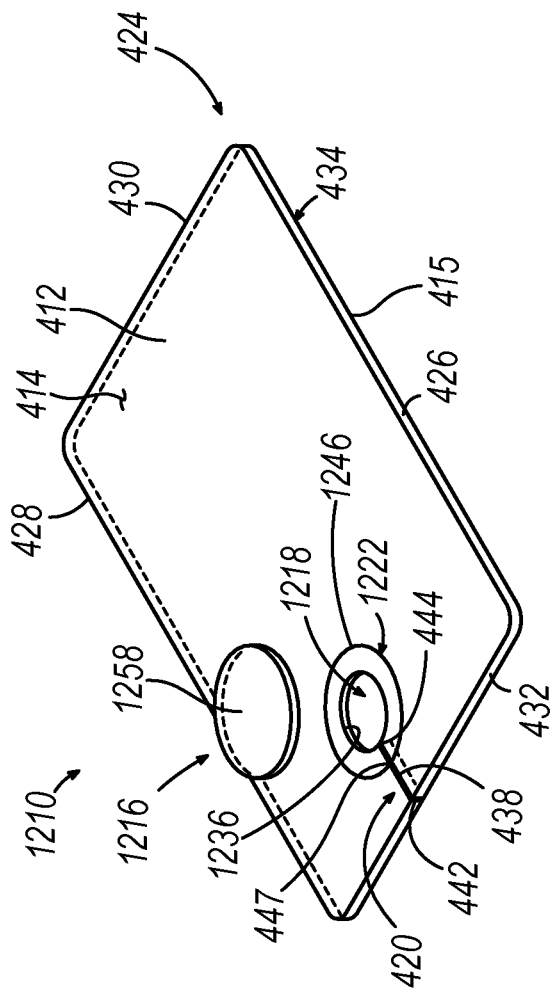
FIG. 40 depicts a front perspective view of the metal transaction card of FIG. 37 with an exemplary transponder chip module aligned with the thirteenth shaped opening.
Figure 41:
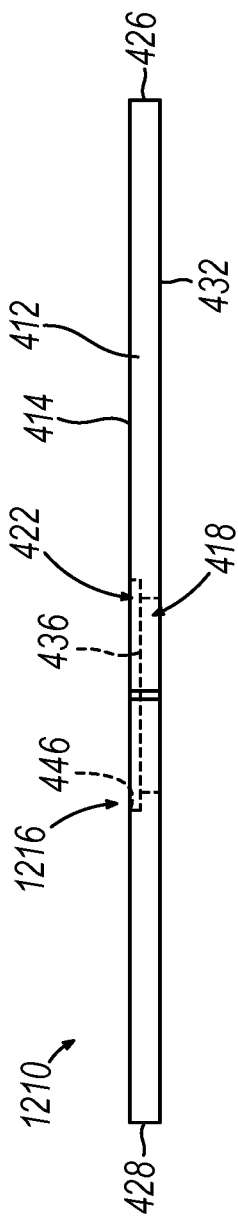
FIG. 41 depicts a side elevational view of the metal transaction card of FIG. 37.

FIG. 4 shows a materials sheet (310) including a 25-up metal layer (312) having a front face (not shown) and an opposing rear face (315). The present example of materials sheet (310) includes only metal layer (312), but other examples of materials sheet may alternatively include additional layers, including plastic or metal layers. A fourth example of a plurality of chip openings (316) including a lower shaped chip hole (318) as well as a respective fourth example of a plurality of shaped slits (320) are shown formed into metal layer (312) in anticipation of an upper shaped chip hole (322) being formed around lower shaped chip hole (318) and singulation of a plurality of metal transaction card bodies (324). To this end, a fourth exemplary metal transaction card body (324) has a long bottom body edge (326), a long top body edge (328), a short right lateral body edge (330), and a short left lateral body edge (332) as viewed from rear face (315) and shown in FIG. 4. Bottom and top body edges (326, 328) are generally parallel to each other and may be referred to herein as relatively horizontal. Right and left lateral body edges (330, 332) are generally parallel to each other and may be referred to herein as relatively vertical. Bottom and top body edges (326, 328) are thus perpendicular to right and left lateral body edges (330, 332). Bottom and top body edges (326, 328) in conjunction with right and left lateral body edges (330, 332) define an outer periphery (334) of metal transaction card body (324).

In the present example, lower shaped chip hole (318) has a generally elliptical shape defined by a lower edge (336), and shaped slit (320) has a pair of linear channels (338, 340) intersecting with at an intermediate channel (341) therebetween and extending from lower shaped chip hole (318) to outer periphery (334). More particularly, linear channel (338) has an origin (342) of shaped slit (320) in outer periphery (334) at right lateral body edge (330) and extends horizontally from origin (42) to intersect intermediate channel (341). Intermediate channel (341) extends at a predetermined angle between horizontally extending linear channel (338) to vertically extending linear channel (340). Linear channel (340) vertically extends from intermediate channel (341) toward lower shaped chip hole (318) and opens into lower edge (336) at an endpoint (344) of shaped slit (320).

Linear channel (340) thus extends through upper shaped chip hole (322) to endpoint (344) in lower edge (336). In the present example, upper shaped chip hole (322) is generally rectangular with arcuate, rounded corners defined by upper edge (346) such that linear channel (340) extends through a top horizontal portion of upper edge (346) toward endpoint (344). Shaped slit (320) thus also includes a terminus (347) at upper edge (346) as at least a portion of shaped slit (320) opens into upper shaped chip hole (322) of chip opening (316). In the present example, chip opening (316) is configured to receive a transponder chip module (not shown) such that chip opening (316) is the same shape as an module antenna (not shown) for improved performance relative to dissimilar shapes between chip opening (316) and module antenna (not shown). While chip opening (316) with the particular lower and upper shaped chip holes (318, 322) in conjunction with the particular shaped slit (320) is shown in the present example of FIG. 4, alternative arrangements and shapes for receiving transponder chip module (not shown) relative to a slit for inductive coupling may be similarly integrated into an alternative metal transaction card such that the invention is not intended to be unnecessarily limited to the particular chip opening (316) and shaped slit (320) shown and described herein.

E. Fifth Exemplary Arrangement of a Shaped Opening and a Shaped Slit

FIGS. 5-8 show at least a portion of a metal transaction card (410) including a metal layer (412) having a front face (414) and an opposing rear face (415). The present example of metal transaction card (410) includes only metal layer (412), but other examples of metal transaction card (410) may alternatively include additional layers, including plastic or metal layers. A fifth example of a chip opening (416) including a non-rectangular lower shaped chip hole (418) as well as a fifth example of a shaped slit (420) are shown formed into metal layer (412) in addition to an upper shaped chip hole (422) of chip opening (416) being formed around lower shaped chip hole (418). To this end, a fifth exemplary metal transaction card body (424) has a long bottom body edge (426), a long top body edge (428), a short right lateral body edge (430), and a short left lateral body edge (432) as viewed from front face (414) and shown in FIG. 6. Bottom and top body edges (426, 428) are generally parallel to each other and may be referred to herein as relatively horizontal. Right and left lateral body edges (430, 432) are generally parallel to each other and may be referred to herein as relatively vertical. Bottom and top body edges (426, 428) are thus perpendicular to right and left lateral body edges (430, 432). Bottom and top body edges (426, 428) in conjunction with right and left lateral body edges (430, 432) define an outer periphery (434) of metal transaction card body (424).

In the present example, lower shaped chip hole (418) has a generally round, circular shape defined by a lower edge (436), and shaped slit (420) has a linear channel (438) that extends from lower shaped chip hole (418) to outer periphery (434). More particularly, linear channel (438) has an origin (442) of shaped slit (420) in outer periphery (434) at left lateral body edge (432) and horizontally toward lower shaped chip hole (418) and opens into lower edge (436) at an endpoint (444) of shaped slit (420). The generally round, circular shape defined by lower edge (436) of the present example does not have any portions, such as linear portions, thereof that are parallel or perpendicular to body edges (426, 428, 430, 432) nor are any such portions of lower edge (436) parallel or perpendicular to any portion or upper shaped chip hole (422).

Linear channel (438) thus extends through upper shaped chip hole (422) to endpoint (444) in lower edge (436). In the present example, upper shaped chip hole (422) is generally rectangular with arcuate, rounded corners defined by upper edge (446) such that linear channel (438) extends through a left, vertical, linear portion of upper edge (446) toward endpoint (444). Shaped slit (420) thus also includes a terminus (447) at upper edge (446) as at least a portion of shaped slit (420) opens into upper shaped chip hole (422) of chip opening (416). In the present example, chip opening (416) is configured to receive a transponder chip module (not shown) such that chip opening (416) is the same shape as an module antenna (not shown) for improved performance relative to dissimilar shapes between chip opening (416) and module antenna (not shown). While chip opening (416) with the particular lower and upper shaped chip holes (418, 422) in conjunction with the particular shaped slit (420) is shown in the present example of FIGS. 5-8, alternative arrangements and shapes for receiving transponder chip module (not shown) relative to a slit for inductive coupling may be similarly integrated into an alternative metal transaction card such that the invention is not intended to be unnecessarily limited to the particular chip opening (416) and shaped slit (420) shown and described herein. Also, in one or more examples, an alternative upper shaped chip hole may be shaped as lower shaped chip hole (420) such that any description provided herein with respect to lower edge (436) may be incorporated in whole or in part into an alternative upper shaped chip hole or vice versa.

F. Sixth Exemplary Arrangement of a Shaped Opening and a Shaped Slit

FIGS. 9-12 show at least a portion of a metal transaction card (510) including metal layer (412) discussed above such that like numbers below indicate like features discussed above in greater detail. The present example of metal transaction card (510) includes only metal layer (412), but other examples of metal transaction card (510) may alternatively include additional layers, including plastic or metal layers. A sixth example of a chip opening (516) including a non-rectangular lower shaped chip hole (518) as well as shaped slit (420) are shown formed into metal layer (412) in addition to upper shaped chip hole (422) of chip opening (516) being formed around lower shaped chip hole (518). In the present example, lower shaped chip hole (518) has a generally elliptical shape defined by a lower edge (536), and shaped slit (420) has linear channel (438) that extends horizontally from lower shaped chip hole (618) to outer periphery (434) between origin (442) and endpoint (444) and through terminus (447). The generally elliptical shape defined by lower edge (536) of the present example does not have any portions, such as linear portions, thereof that are parallel or perpendicular to body edges (426, 428, 430, 432) nor are any such portions of lower edge (536) parallel or perpendicular to any portion or upper shaped chip hole (422).

In the present example, chip opening (516) is configured to receive a transponder chip module (not shown) such that chip opening (516) is the same shape as an module antenna (not shown) for improved performance relative to dissimilar shapes between chip opening (516) and module antenna (not shown). While chip opening (516) with the particular lower and upper shaped chip holes (518, 422) in conjunction with the particular shaped slit (420) is shown in the present example of FIGS. 9-12, alternative arrangements and shapes for receiving transponder chip module (not shown) relative to a slit for inductive coupling may be similarly integrated into an alternative metal transaction card such that the invention is not intended to be unnecessarily limited to the particular chip opening (516) and shaped slit (420) shown and described herein. Also, in one or more examples, an alternative upper shaped chip hole may be shaped as lower shaped chip hole (520) such that any description provided herein with respect to lower edge (536) may be incorporated in whole or in part into an alternative upper shaped chip hole or vice versa.

G. Seventh Exemplary Arrangement of a Shaped Opening and a Shaped Slit

FIGS. 13-16 show at least a portion of a metal transaction card (610) including metal layer (412) discussed above such that like numbers below indicate like features discussed above in greater detail. The present example of metal transaction card (610) includes only metal layer (412), but other examples of metal transaction card (610) may alternatively include additional layers, including plastic or metal layers. A seventh example of a chip opening (616) including a non-rectangular, lower shaped chip hole (618) as well as shaped slit (420) are shown formed into metal layer (412) in addition to upper shaped chip hole (422) of chip opening (616) being formed around lower shaped chip hole (618). In the present example, lower shaped chip hole (618) has a generally parallelogram shape defined by a lower edge (636), and shaped slit (420) has linear channel (438) that extends horizontally from lower shaped chip hole (618) to outer periphery (434) between origin (442) and endpoint (444) and through terminus (447).

To this end, lower edge (636) more particularly includes a bottom lower edge (648), a top lower edge (650), a left lateral lower edge (652), and a right lateral lower edge (654) defining the parallelogram shape with a plurality of rounded corners (656). Left and right lateral lower edges (652, 654) are parallel to lateral portions of upper shaped chip hole (422) as well as right and left lateral body edges (430, 432). In contrast, bottom and top lower edges (648, 650) are neither parallel nor perpendicular to any portion of upper shaped chip hole (422) and furthermore are neither parallel nor perpendicular to any portion of body edges (426, 428, 430, 432).

In the present example, chip opening (616) is configured to receive a transponder chip module (not shown) such that chip opening (616) is the same shape as an module antenna (not shown) for improved performance relative to dissimilar shapes between chip opening (616) and module antenna (not shown). While chip opening (616) with the particular lower and upper shaped chip holes (618, 422) in conjunction with the particular shaped slit (420) is shown in the present example of FIGS. 13-16, alternative arrangements and shapes for receiving transponder chip module (not shown) relative to a slit for inductive coupling may be similarly integrated into an alternative metal transaction card such that the invention is not intended to be unnecessarily limited to the particular chip opening (616) and shaped slit (420) shown and described herein. Also, in one or more examples, an alternative upper shaped chip hole may be shaped as lower shaped chip hole (620) such that any description provided herein with respect to lower edge (636) may be incorporated in whole or in part into an alternative upper shaped chip hole or vice versa.

H. Eighth Exemplary Arrangement of a Shaped Opening and a Shaped Slit

FIGS. 17-20 show at least a portion of a metal transaction card (710) including metal layer (412) discussed above such that like numbers below indicate like features discussed above in greater detail. The present example of metal transaction card (710) includes only metal layer (412), but other examples of metal transaction card (710) may alternatively include additional layers, including plastic or metal layers. An eighth example of a chip opening (716) including a non-rectangular, lower shaped chip hole (718) as well as shaped slit (420) are shown formed into metal layer (412) in addition to upper shaped chip hole (422) of chip opening (716) being formed around lower shaped chip hole (718). In the present example, lower shaped chip hole (718) has a generally trapezoid shape defined by a lower edge (736), and shaped slit (420) has linear channel (438) that extends horizontally from lower shaped chip hole (718) to outer periphery (434) between origin (442) and endpoint (444) and through terminus (447).

Lower edge (736) more particularly includes a bottom lower edge (748), a top lower edge (750), a left lateral lower edge (752), and a right lateral lower edge (754) defining the trapezoid shape with a plurality of rounded corners (756). Left and right lateral lower edges (752, 754) are parallel to lateral portions of upper shaped chip hole (422) as well as right and left lateral body edges (430, 432). In contrast, bottom and top lower edges (748, 750) are neither parallel nor perpendicular to any portion of upper shaped chip hole (422) and furthermore are neither parallel nor perpendicular to any portion of body edges (426, 428, 430, 432).

In the present example, chip opening (716) is configured to receive a transponder chip module (not shown) such that chip opening (716) is the same shape as an module antenna (not shown) for improved performance relative to dissimilar shapes between chip opening (716) and module antenna (not shown). While chip opening (716) with the particular lower and upper shaped chip holes (718, 422) in conjunction with the particular shaped slit (420) is shown in the present example of FIGS. 17-20, alternative arrangements and shapes for receiving transponder chip module (not shown) relative to a slit for inductive coupling may be similarly integrated into an alternative metal transaction card such that the invention is not intended to be unnecessarily limited to the particular chip opening (716) and shaped slit (420) shown and described herein. Also, in one or more examples, an alternative upper shaped chip hole may be shaped as lower shaped chip hole (720) such that any description provided herein with respect to lower edge (736) may be incorporated in whole or in part into an alternative upper shaped chip hole or vice versa.

I. Ninth Exemplary Arrangement of a Shaped Opening and a Shaped Slit

FIGS. 21-24 show at least a portion of a metal transaction card (810) including metal layer (412) discussed above such that like numbers below indicate like features discussed above in greater detail. The present example of metal transaction card (810) includes only metal layer (412), but other examples of metal transaction card (810) may alternatively include additional layers, including plastic or metal layers. A ninth example of a chip opening (816) including a lower shaped chip hole (818) as well as shaped slit (420) are shown formed into metal layer (412) in addition to upper shaped chip hole (422) of chip opening (816) being formed around lower shaped chip hole (818). In the present example, lower shaped chip hole (818) has a generally rectangular, and, more particularly, square shape defined by a lower edge (836), and shaped slit (420) has linear channel (438) that extends horizontally from lower shaped chip hole (818) to outer periphery (434) between origin (442) and endpoint (444) and through terminus (447).

Lower edge (836) more particularly includes a bottom lower edge (848), a top lower edge (850), a left lateral lower edge (852), and a right lateral lower edge (854) defining the square shape with a plurality of right-angled corners (856). The square shape defined by lower edge (836) is tilted, such as if rotated at a predetermined orientation, such that none of the bottom, top, and lateral edges (848, 850, 852, 854) are perpendicular or parallel with any portion of upper shaped chip hole (422). Furthermore, none of the bottom, top, and lateral edges (848, 850, 852, 854) are perpendicular or parallel with any portion of body edges (426, 428, 430, 432).

In the present example, chip opening (816) is configured to receive a transponder chip module (not shown) such that chip opening (816) is the same shape as an module antenna (not shown) for improved performance relative to dissimilar shapes between chip opening (816) and module antenna (not shown). While chip opening (816) with the particular lower and upper shaped chip holes (818, 422) in conjunction with the particular shaped slit (420) is shown in the present example of FIGS. 21-24, alternative arrangements and shapes for receiving transponder chip module (not shown) relative to a slit for inductive coupling may be similarly integrated into an alternative metal transaction card such that the invention is not intended to be unnecessarily limited to the particular chip opening (816) and shaped slit (420) shown and described herein. Also, in one or more examples, an alternative upper shaped chip hole may be shaped as lower shaped chip hole (820) such that any description provided herein with respect to lower edge (836) may be incorporated in whole or in part into an alternative upper shaped chip hole or vice versa.

J. Tenth Exemplary Arrangement of a Shaped Opening and a Shaped Slit

FIGS. 25-28 show at least a portion of a metal transaction card (910) including metal layer (412) discussed above such that like numbers below indicate like features discussed above in greater detail. The present example of metal transaction card (910) includes only metal layer (412), but other examples of metal transaction card (910) may alternatively include additional layers, including plastic or metal layers. A tenth example of a chip opening (916) including a non-rectangular, lower shaped chip hole (918) as well as shaped slit (420) are shown formed into metal layer (412) in addition to upper shaped chip hole (422) of chip opening (916) being formed around lower shaped chip hole (918). In the present example, lower shaped chip hole (918) has an irregular polygonal shape defined by a lower edge (936), and shaped slit (420) has linear channel (438) that extends horizontally from lower shaped chip hole (918) to outer periphery (434) between origin (442) and endpoint (444) and through terminus (447).

Lower edge (936) more particularly includes a bottom lower edge (948), a top lower edge (950), a left lateral lower edge (952), and a right lateral lower edge (954) defining the irregular polygonal shape with a plurality of rounded corners (956). More particularly, each of bottom and top lower edge (948, 950) has a pair of portions intersecting with an inner obtuse angle, whereas each of left and right lateral lower edges (952, 954) have a pair of portions intersecting with an inner acute angle. Thus, no portions of bottom, top, left lateral, and right lateral lower edges (948, 950, 952, 954) are parallel or perpendicular with any portion of upper shaped chip hole (422). Furthermore, no portions of the bottom, top, and lateral edges (948, 950, 952, 954) are perpendicular or parallel with any portion of body edges (426, 428, 430, 432).

In the present example, chip opening (916) is configured to receive a transponder chip module (not shown) such that chip opening (916) is the same shape as an module antenna (not shown) for improved performance relative to dissimilar shapes between chip opening (916) and module antenna (not shown). While chip opening (916) with the particular lower and upper shaped chip holes (918, 422) in conjunction with the particular shaped slit (420) is shown in the present example of FIGS. 25-28, alternative arrangements and shapes for receiving transponder chip module (not shown) relative to a slit for inductive coupling may be similarly integrated into an alternative metal transaction card such that the invention is not intended to be unnecessarily limited to the particular chip opening (916) and shaped slit (420) shown and described herein. Also, in one or more examples, an alternative upper shaped chip hole may be shaped as lower shaped chip hole (920) such that any description provided herein with respect to lower edge (936) may be incorporated in whole or in part into an alternative upper shaped chip hole or vice versa.

K. Eleventh Exemplary Arrangement of a Shaped Opening and a Shaped Slit

FIGS. 29-32 show at least a portion of a metal transaction card (1010) including metal layer (412) discussed above such that like numbers below indicate like features discussed above in greater detail. The present example of metal transaction card (1010) includes only metal layer (412), but other examples of metal transaction card (1010) may alternatively include additional layers, including plastic or metal layers. An eleventh example of a chip opening (1016) including a non-rectangular, lower shaped chip hole (1018) as well as shaped slit (420) are shown formed into metal layer (412) in addition to upper shaped chip hole (422) of chip opening (1016) being formed around lower shaped chip hole (1018). In the present example, lower shaped chip hole (1018) has an irregular polygonal shape defined by a lower edge (1036), and shaped slit (420) has linear channel (438) that extends horizontally from lower shaped chip hole (1018) to outer periphery (434) between origin (442) and endpoint (444) and through terminus (447).

Lower edge (1036) more particularly includes a bottom lower edge (1048), a top lower edge (1050), a left lateral lower edge (1052), and a right lateral lower edge (1054) defining the irregular polygonal shape with a plurality of rounded corners (1056). More particularly, each of bottom and top lower edges (1048, 1050) has a plurality of edge portions intersecting with a plurality of alternating inner obtuse angles and inner acute angles. Each of left and right lateral lower edges (1052, 1054) similarly has a plurality of edge portions intersecting with a plurality of alternating inner obtuse angles and inner acute angles. Thus, no portions of bottom, top, left lateral, and right lateral lower edges (1048, 1050, 1052, 1054) are parallel or perpendicular with any portion of upper shaped chip hole (422). Furthermore, no portions of the bottom, top, and lateral edges (1048, 1050, 1052, 1054) are perpendicular or parallel with any portion of body edges (426, 428, 430, 432).

In the present example, chip opening (1016) is configured to receive a transponder chip module (not shown) such that chip opening (1016) is the same shape as an module antenna (not shown) for improved performance relative to dissimilar shapes between chip opening (1016) and module antenna (not shown). While chip opening (1016) with the particular lower and upper shaped chip holes (1018, 422) in conjunction with the particular shaped slit (420) is shown in the present example of FIGS. 29-32, alternative arrangements and shapes for receiving transponder chip module (not shown) relative to a slit for inductive coupling may be similarly integrated into an alternative metal transaction card such that the invention is not intended to be unnecessarily limited to the particular chip opening (1016) and shaped slit (420) shown and described herein. Also, in one or more examples, an alternative upper shaped chip hole may be shaped as lower shaped chip hole (1020) such that any description provided herein with respect to lower edge (1036) may be incorporated in whole or in part into an alternative upper shaped chip hole or vice versa.

L. Twelfth Exemplary Arrangement of a Shaped Opening and a Shaped Slit

FIGS. 33-36 show at least a portion of a metal transaction card (1110) including metal layer (412) discussed above such that like numbers below indicate like features discussed above in greater detail. The present example of metal transaction card (1110) includes only metal layer (412), but other examples of metal transaction card (1110) may alternatively include additional layers, including plastic or metal layers. A twelfth example of a chip opening (1116) including a non-rectangular, lower shaped chip hole (1118) as well as shaped slit (420) are shown formed into metal layer (412) in addition to upper shaped chip hole (422) of chip opening (1116) being formed around lower shaped chip hole (1118). In the present example, lower shaped chip hole (1118) has an irregular polygonal shape defined by a lower edge (1136), and shaped slit (420) has linear channel (438) that extends horizontally from lower shaped chip hole (1118) to outer periphery (434) between origin (442) and endpoint (444) and through terminus (447).

Lower edge (1136) more particularly includes a bottom lower edge (1148), a top lower edge (1150), a left lateral lower edge (1152), and a right lateral lower edge (1154) defining the irregular polygonal shape with a plurality of rounded corners (1156). More particularly, each of bottom, top, left lateral, and right lateral lower edges (1148, 1150, 1152, 1154) has an inner, arcuate, convex surface. Thus, no portions of bottom, top, left lateral, and right lateral lower edges (1148, 1150, 1152, 1154) are parallel or perpendicular with any portion of upper shaped chip hole (422). Furthermore, no portions of the bottom, top, and lateral edges (1148, 1150, 1152, 1154) are perpendicular or parallel with any portion of body edges (426, 428, 430, 432).

In the present example, chip opening (1116) is configured to receive a transponder chip module (not shown) such that chip opening (1116) is the same shape as an module antenna (not shown) for improved performance relative to dissimilar shapes between chip opening (1116) and module antenna (not shown). While chip opening (1116) with the particular lower and upper shaped chip holes (1118, 422) in conjunction with the particular shaped slit (420) is shown in the present example of FIGS. 33-36, alternative arrangements and shapes for receiving transponder chip module (not shown) relative to a slit for inductive coupling may be similarly integrated into an alternative metal transaction card such that the invention is not intended to be unnecessarily limited to the particular chip opening (1116) and shaped slit (420) shown and described herein. Also, in one or more examples, an alternative upper shaped chip hole may be shaped as lower shaped chip hole (1120) such that any description provided herein with respect to lower edge (1136) may be incorporated in whole or in part into an alternative upper shaped chip hole or vice versa.

M. Thirteenth Exemplary Arrangement of a Shaped Opening and a Shaped Slit

FIGS. 37-41 show at least a portion of a metal transaction card (1210) including metal layer (412) discussed above such that like numbers below indicate like features discussed above in greater detail. The present example of metal transaction card (1210) includes only metal layer (412), but other examples of metal transaction card (1210) may alternatively include additional layers, including plastic or metal layers. A thirteenth example of a chip opening (1216) including a non-rectangular, lower shaped chip hole (1218) as well as shaped slit (420) are shown formed into metal layer (412) in addition to a non-rectangular upper shaped chip hole (1222) of chip opening (1216) being formed around lower shaped chip hole (1218).

In the present example, lower shaped chip hole (1218) has an elliptical shape defined by a lower edge (1236), and shaped slit (420) has linear channel (438) that extends horizontally from lower shaped chip hole (1218) to outer periphery (434) between origin (442) and endpoint (444) and through terminus (447). In addition, upper shaped chip hole (1222) has an elliptical shape defined by an upper edge (1246) such that the elliptical shape of the upper edge (1246), which is relatively larger than elliptical shape of lower edge (1236), is positioned laterally about the elliptical shape of lower edge (1236), which is relatively smaller than elliptical shape of lower edge (1236). Thus, no portions of lower and upper edges (1236, 1246) are perpendicular or parallel with any portion of body edges (426, 428, 430, 432).

In the present example, chip opening (1216) is configured to receive a transponder chip module (1258) such that chip opening (1216) is the same shape as an module antenna (not shown) for improved performance relative to dissimilar shapes between chip opening (1216) and module antenna (not shown). While chip opening (1216) with the particular lower and upper shaped chip holes (1218, 1222) in conjunction with the particular shaped slit (420) is shown in the present example of FIGS. 33-36, alternative arrangements and shapes for receiving transponder chip module relative to a slit for inductive coupling may be similarly integrated into an alternative metal transaction card such that the invention is not intended to be unnecessarily limited to the particular chip opening (1116) and shaped slit (420) shown and described herein.

N. Various Examples of a Shaped Slit in a Metal Transaction Card

FIGS. 42-47 show various examples of portions of metal transaction cards (1310, 1410, 1510, 1610, 1710, 1810, 1910, 2010, 2110) having exemplary shaped slits (1320, 1420, 1520, 1620, 1720, 1820, 1920, 2020, 2120) formed, such as by mechanical engraving or laser etching, in metal layer (412) and arranged in relation to chip opening (416) and body edges (426, 428, 430, 432). In this respect, like numbers below indicate like features discussed above in greater detail. While the present examples of metal transaction cards (1310, 1410, 1510, 1610, 1710, 1810, 1910, 2010, 2110) include chip opening (416) arranged with shaped slits (1320, 1420, 1520, 1620, 1720, 1820, 1920, 2020, 2120), the following features, particularly shaped slits (1320, 1420, 1520, 1620, 1720, 1820, 1920, 2020, 2120) may be used in place of any such slits such that the invention is not intended to be unnecessarily limited to any particular example of metal transaction cards (1310, 1410, 1510, 1610, 1710, 1810, 1910, 2010, 2110) shown in the present examples. Additionally, each of shaped slits (1320, 1420, 1520, 1620, 1720, 1820, 1920, 2020, 2120) has an origin (1342, 1442, 1542, 1642, 1742, 1842, 1942, 2042, 2142), a terminus (1347, 1447, 1547, 1647, 1747, 1847, 1947, 2047, 2147), and an endpoint (1344, 1444, 1544, 1644, 1744, 1844) in the present examples. To this end, each exemplary endpoint (1344, 1444, 1544, 1644, 1744, 1844) is shown at a center of chip opening (416) and extends to outer periphery (434) of metal layer (412) in metal transaction card body (424). During further stages of manufacturing, additional portions of metal layer (412) around shaped slits (1320, 1420, 1520, 1620, 1720, 1820, 1920, 2020, 2120) within a bottom recess area (1317) of chip opening (416) may thus be removed in one or more examples during CNC milling of any remainder of chip opening (416).

While performing x, which is horizontal, and y, which is vertical, torsion & bend tests on metal transaction card bodies (424) having shaped slit (1320, 1420, 1520, 1620, 1720, 1820, 1920, 2020, 2120), a variety of features affect EMV payment transaction performance and a maximum force (Newton cm$^{-1}$) which can be applied to metal transaction card body (424) up to destruction of metal transaction card body (424), i.e. sufficient mechanical defects to render metal transaction cards (1310, 1410, 1510, 1610, 1710, 1810, 1910, 2010, 2110) effectively unusable for a transaction. This variety of features includes, but is not limited to, a distance from origin (1342, 1442, 1542, 1642, 1742, 1842, 1942, 2042, 2142) to shaped chip opening (416), a direction from origin (1342, 1442, 1542, 1642, 1742, 1842, 1942, 2042, 2142) to shaped chip opening (416), an angle of emergence relative to outer periphery (434), a length of shaped slit (1320, 1420, 1520, 1620, 1720, 1820, 1920, 2020, 2120), a shape of shaped slit (1320, 1420, 1520, 1620, 1720, 1820, 1920, 2020, 2120). On one hand, a straight, linear channel of a slit, such as shaped slit (1320) offers the best performance in terms of performing EMV transactions. A straight, linear channel of a slit, such as portions of shaped slit (1520), emanating from shaped chip opening (416) at 45 degrees splits the horizontal and vertical forces for improved performance in torsion and bending. A curved, arcuate channel of a slit, such as portions of shaped slit (1620, 1720, 1820) are preferably spaced at a distance from shaped chip opening (416) to inhibit, and even prevent, electrical shorting. Therefore, the shape of a slit, such as any of shaped slits (1320, 1420, 1520, 1620, 1720, 1820, 1920, 2020, 2120), is a compromise between a straight portion, an angled portion, and/or an oscillation portion (e.g. sinusoidal) with an overall defining shape. Alternatively or in addition, non-functional, fake channels may partially or wholly define alternative slits for aesthetic purposes. Alternatively or in addition, a slit, such as one or more portions of shaped slits (1320, 1420, 1520, 1620, 1720, 1820, 1920, 2020, 2120), can be partially disguised behind a magnetic stripe or a printed artwork. Alternatively or in addition, a slit, such as one or more portions of shaped slits (1320, 1420, 1520, 1620, 1720, 1820, 1920, 2020, 2120), can rise above or fall below a shaped chip opening, such as shaped chip opening (416).

Shaped slits (1320, 1420, 1520, 1620, 1720, 1820, 1920, 2020, 2120) may emerge from any surrounding portion, such as four sides, of the shaped chip opening (416). Shaped slits (1320, 1420, 1520, 1620, 1720, 1820, 1920, 2020, 2120) may overlap (underlie) a module antenna (not shown) from a top, passing under a connecting bridge, passing under a center point, or passing under any isolated metal on a contact side of the transponder chip module. An embedded metal transaction card, such as card having a metal core layer or a metal veneer layer, with contactless functionality upon full assembly has a single metal layer, such as metal layer (412) of with one of shaped slits (1320, 1420, 1520, 1620, 1720, 1820, 1920, 2020, 2120) extending from shaped chip opening (416) to outer periphery (434). In such an example, this single metal layer (412) with one of shaped slits (1320, 1420, 1520, 1620, 1720, 1820, 1920, 2020, 2120) is sandwiched between layers of plastic, and can have a very structurally stable metal transaction card body (424), particularly if metal layer (412) has a thickness of about 250 μm (~10 mils) to about 300 μm (~12 mils), such as 250 μm (~10 mils) or 300 μm (~12 mils). As metal layer thickness exceeds 380 μm (15 mils), Shaped slits (1320, 1420, 1520, 1620, 1720, 1820, 1920, 2020, 2120) are reinforced in construction with a filler to inhibit, and even prevent, bending around an area of shaped slits (1320, 1420, 1520, 1620, 1720, 1820, 1920, 2020, 2120) and shaped chip opening (416). In the case of the embedded metal transaction card, shaped slits (1320, 1420, 1520, 1620, 1720, 1820, 1920, 2020, 2120) may be a micro-slit, which has a kerf of 50 μm, but in one or more examples shaped slits (1320, 1420, 1520, 1620, 1720, 1820, 1920, 2020, 2120) are not micro-slits. However as a width of shaped slits (1320, 1420, 1520, 1620, 1720, 1820, 1920, 2020, 2120) increases, whitening or ghosting of shaped slits (1320, 1420, 1520, 1620, 1720, 1820, 1920, 2020, 2120) on a front surface of the embedded metal transaction card becomes evident to a user, such as during normal wear over a usable life of the embedded metal transaction card.

In the case of a metal face transaction card with any of shaped slits (1320, 1420, 1520, 1620, 1720, 1820, 1920, 2020, 2120), a exposed front metal layer is laminated to a rear plastic layer or layers and has a micro-slit to disguise the presence of shaped slit (1320, 1420, 1520, 1620, 1720, 1820, 1920, 2020, 2120). Upon final assembly, the metal face transaction card may have two metal layers (412), which may be referred to as two-layer metal inlay construction, and in one example includes two metal layers of 200 μm (8 mils) separated by a dielectric, such as adhesive, to provide improved structural integrity with mechanical strength. In another example, a metal face transaction card may have a single metal layer (412), but the shaped slit (1320, 1420,

1520, 1620, 1720, 1820, 1920, 2020, 2120) is formed as a micro-slit and filled with a filler for reinforcement.

By way of further example, shaped slits (1320, 1420, 1520, 1620, 1720, 1820, 1920, 2020, 2120) can be filled with a UV curing epoxy or a two component adhesive, dispensed as a microfluidic droplet for in situ bonding of shaped slits (1320, 1420, 1520, 1620, 1720, 1820, 1920, 2020, 2120) under pressure and or vacuum control. For reference, ISO 7816 Minimum and Maximum Thickness Dimensions of a Card Body are as follows: Min 0.68 mm (680 µm) to Max 0.84 mm (840 µm); or Min 0.027 inch to Max 0.033 inch.

As indicated above, these portions of metal transaction cards (1310, 1410, 1510, 1610, 1710, 1810, 1910, 2010, 2110) may be arranged with one metal layer (416) of construction or with a plurality of metal layers (416), such as two metal layers (416), in the assembly embedded metal transaction cards or metal face transaction cards. The following metal layers (416) with respective shaped slits (1320, 1420, 1520, 1620, 1720, 1820, 1920, 2020, 2120) may thus be used alone or in combination as desired for assembling embedded metal transaction cards or metal face transaction cards. Furthermore, any of shaped slits (1320, 1420, 1520, 1620, 1720, 1820, 1920, 2020, 2120) may be incorporated into any metal layer of card construction with alternative shaped chip openings such that the invention is not intended to be unnecessarily limited to particular arrangement of metal transaction cards (1310, 1410, 1510, 1610, 1710, 1810, 1910, 2010, 2110) shown in the present examples.

i. Sixth Example of a Shaped Slit

Figure 42:
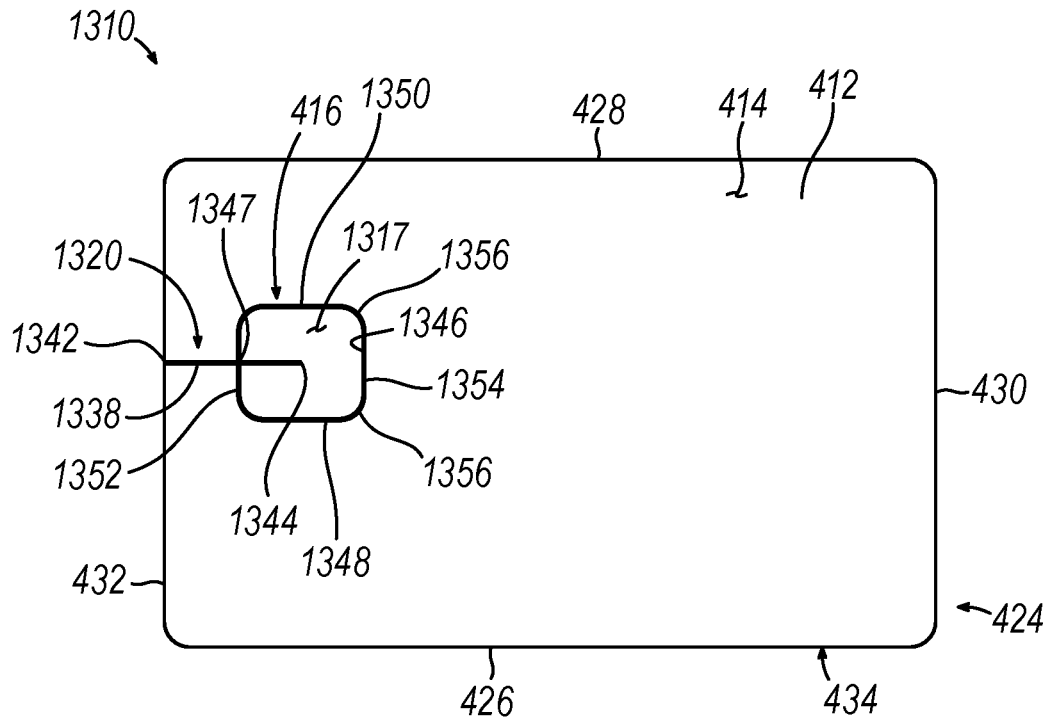
FIG. 42 depicts a front elevational view of another exemplary metal transaction card having the fifth shaped opening and a sixth exemplary shaped slit.

FIG. 42 shows at least a portion of a metal transaction card (1310) with a sixth example of a shaped slit (1320) extending from the center of shaped chip opening (416) to outer periphery (434) for inductive coupling to the transponder chip module and operable in accordance with the description above. In the present example, shaped slit (1320) further includes a linear channel (1338) horizontally extending from an origin (1342) in left lateral body edge (432) of metal layer (412) through a terminus (1347) at a peripheral surrounding edge (1346) about shaped chip opening (416) to an endpoint (1344) in bottom recess area (1317). Peripheral surrounding edge (1346) of the present example includes a bottom edge (1348), a top edge (1350), a left lateral edge (1352), and a right lateral edge (1354) as well as a plurality of rounded corners (1356). In this respect, terminus (1347) is positioned in a center of left lateral edge (1352) of chip opening (416) with endpoint (1344) and origin (1342) in the same horizontal axis parallel between bottom and top body edges (426, 428).

ii. Seventh Example of a Shaped Slit

Figure 43:
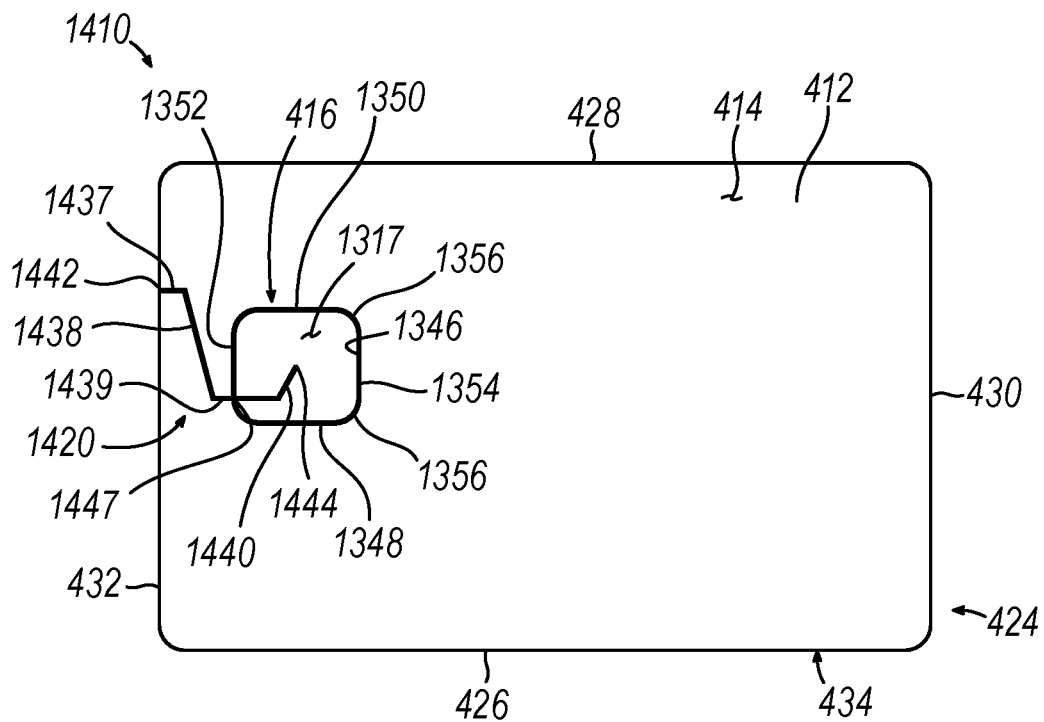
FIG. 43 depicts a front elevational view of another exemplary metal transaction card having the fifth shaped opening and a seventh exemplary shaped slit.

FIG. 43 shows at least a portion of a metal transaction card (1410) with a seventh example of a shaped slit (1420) extending from the center of shaped chip opening (416) to outer periphery (434) for inductive coupling to the transponder chip module and operable in accordance with the description above. In the present example, shaped slit (1420) further includes, from left to right, an outer horizontal linear channel (1437), an outer angled linear channel (1438), an inner horizontal linear channel (1439), and an inner angled linear channel (1440). Channels (1437, 1438, 1439, 1440) successively extend as shown in FIG. 43 and intersect from an origin (1442) through a terminus (1447) at peripheral surrounding edge (1346) of shaped chip opening (416) to an endpoint (1444) in bottom recess area (1317) such that origin (1442) is generally above terminus (1447) and endpoint (1444) in the present example. In this respect, origin (1442) is in a top portion of left lateral body edge (432), and terminus (1447) is positioned in a bottom portion of left lateral edge (1352) of shaped chip opening (416).

iii. Eighth Example of a Shaped Slit

Figure 44:
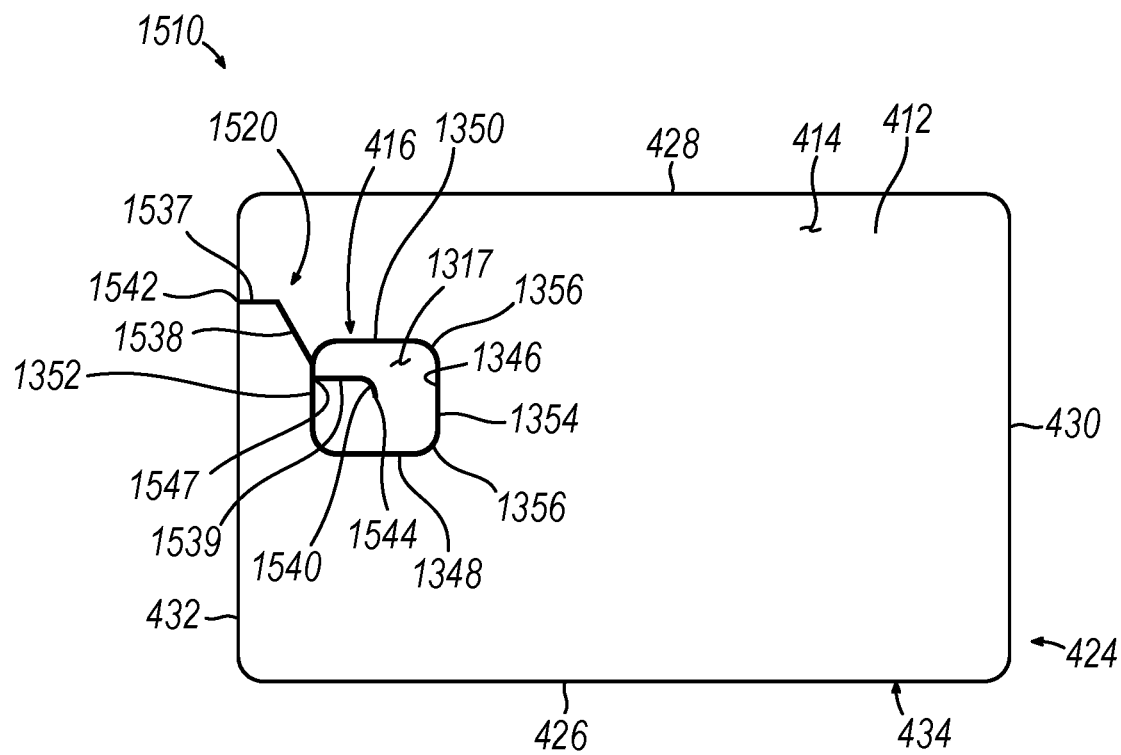
FIG. 44 depicts a front elevational view of another exemplary metal transaction card having the fifth shaped opening and an eighth exemplary shaped slit.

FIG. 44 shows at least a portion of a metal transaction card (1510) with an eighth example of a shaped slit (1520) extending from the center of shaped chip opening (416) to outer periphery (434) for inductive coupling to the transponder chip module and operable in accordance with the description above. In the present example, shaped slit (1520) further includes, from left to right, an outer horizontal linear channel (1537), an angled linear channel (1538), an inner horizontal linear channel (1539), and a vertical linear channel (1540). Channels (1537, 1538, 1539, 1540) successively extend as shown in FIG. 44 and intersect from an origin (1542) through a terminus (1547) at peripheral surrounding edge (1346) of shaped chip opening (416) to an endpoint (1544) in bottom recess area (1317) such that origin (1542) is generally above terminus (1547) and endpoint (1544) in the present example. In this respect, origin (1542) is in a top portion of left lateral body edge (432), and terminus (1547) is positioned in a top portion of left lateral edge (1352) of shaped chip opening (416).

iv. Ninth Example of a Shaped Slit

Figure 45:
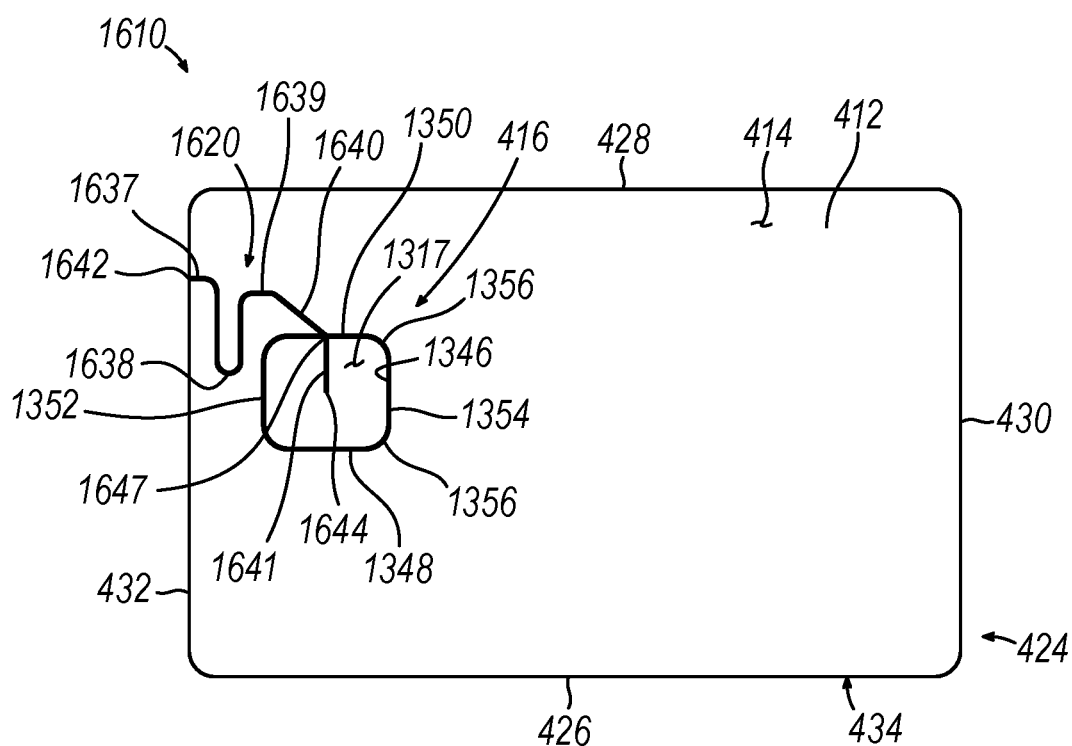
FIG. 45 depicts a front elevational view of another exemplary metal transaction card having the fifth shaped opening and a ninth exemplary shaped slit.

FIG. 45 shows at least a portion of a metal transaction card (1610) with an ninth example of a shaped slit (1620) extending from the center of shaped chip opening (416) to outer periphery (434) for inductive coupling to the transponder chip module and operable in accordance with the description above. In the present example, shaped slit (1620) further includes, from left to right, an outer horizontal linear channel (1637), an upward U-shape arcuate channel (1638), an inner horizontal linear channel (1639), an angled linear channel (1640), and a vertical linear channel (1641). Channels (1637, 1638, 1639, 1640, 1641) successively extend as shown in FIG. 45 and intersect from an origin (1642) through a terminus (1647) at peripheral surrounding edge (1346) of shaped chip opening (416) to an endpoint (1644) in bottom recess area (1317) such that origin (1642) is generally above terminus (1647) and endpoint (1644) in the present example. In this respect, origin (1642) is in a top portion of left lateral body edge (432), and terminus (1547) is positioned in a top edge (1350) of shaped chip opening (416).

v. Tenth Example of a Shaped Slit

Figure 46:
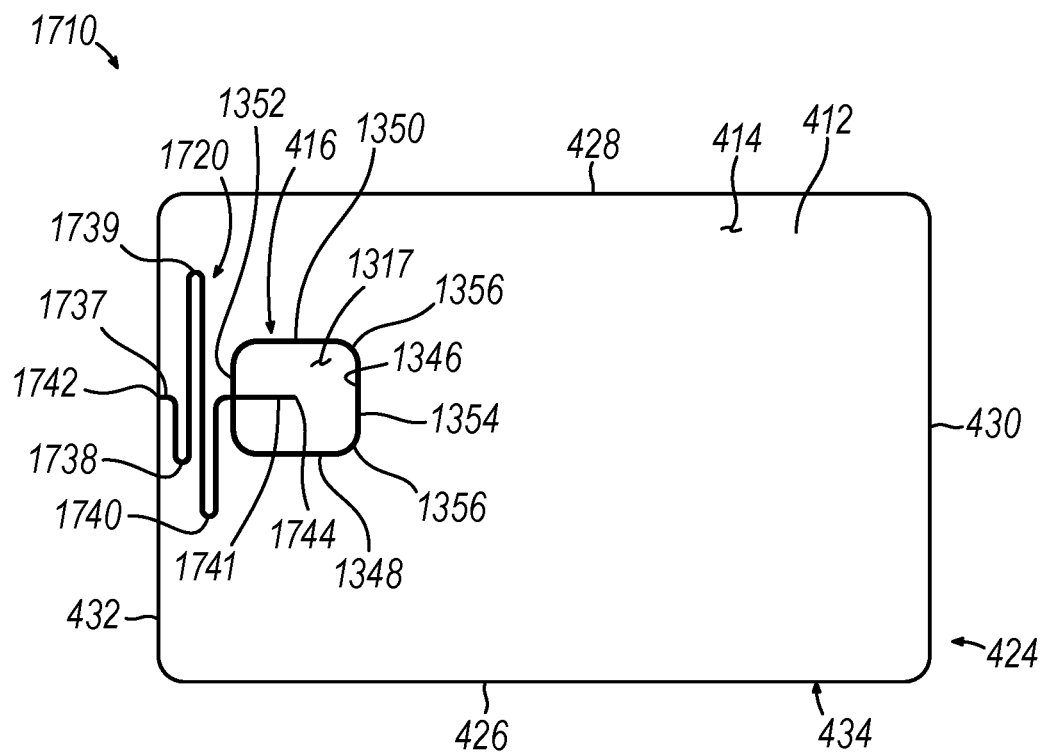
FIG. 46 depicts a front elevational view of another exemplary metal transaction card having the fifth shaped opening and a tenth exemplary shaped slit.

FIG. 46 shows at least a portion of a metal transaction card (1710) with a tenth example of a shaped slit (1720) extending from the center of shaped chip opening (416) to outer periphery (434) for inductive coupling to the transponder chip module and operable in accordance with the description above. In the present example, shaped slit (1720) further includes, from left to right, an outer horizontal linear channel (1737), an outer upward U-shape arcuate channel (1738), downward U-shape arcuate channel (1739), an inner upward U-shape arcuate channel (1740), and a inner horizontal linear channel (1741). Channels (1737, 1738, 1739, 1740, 1741) successively extend as shown in FIG. 46 and intersect from an origin (1742) through a terminus (1747) at peripheral surrounding edge (1346) of shaped chip opening (416) to an endpoint (1744) in bottom recess area (1317) such that origin (1742), terminus (1747), and endpoint (1744) are horizontally aligned along a horizontal axis in the present example.

vi. Eleventh Example of a Shaped Slit

Figure 47:
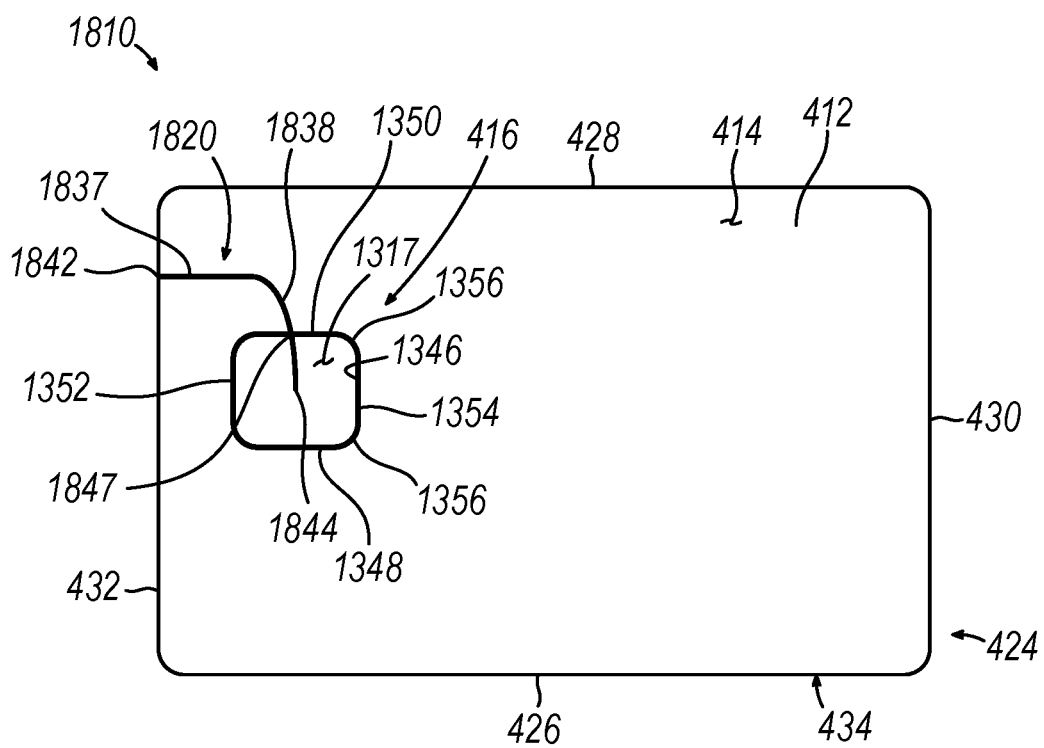
FIG. 47 depicts a front elevational view of another exemplary metal transaction card having the fifth shaped opening and an eleventh exemplary shaped slit.

FIG. 47 shows at least a portion of a metal transaction card (1810) with an eleventh example of a shaped slit (1820) extending from the center of shaped chip opening (416) to outer periphery (434) for inductive coupling to the transponder chip module and operable in accordance with the description above. In the present example, shaped slit (1820) further includes, from left to right, a horizontal linear channel (1837) and an angled linear channel (1838). Channels (1837, 1838) successively extend as shown in FIG. 47 and intersect from an origin (1842) through a terminus (1847) at peripheral surrounding edge (1346) of shaped chip opening (416) to an endpoint (1844) in bottom recess area (1317) such that origin (1842) is generally above terminus (1847) and endpoint (1844) in the present example. In this respect, origin (1842) is in a top portion of left lateral body edge (432), and terminus (1847) is positioned in a central portion of top edge (1350) of shaped chip opening (416).

vii. Twelfth Example of a Shaped Slit and Corresponding Graphic

Figure 48:
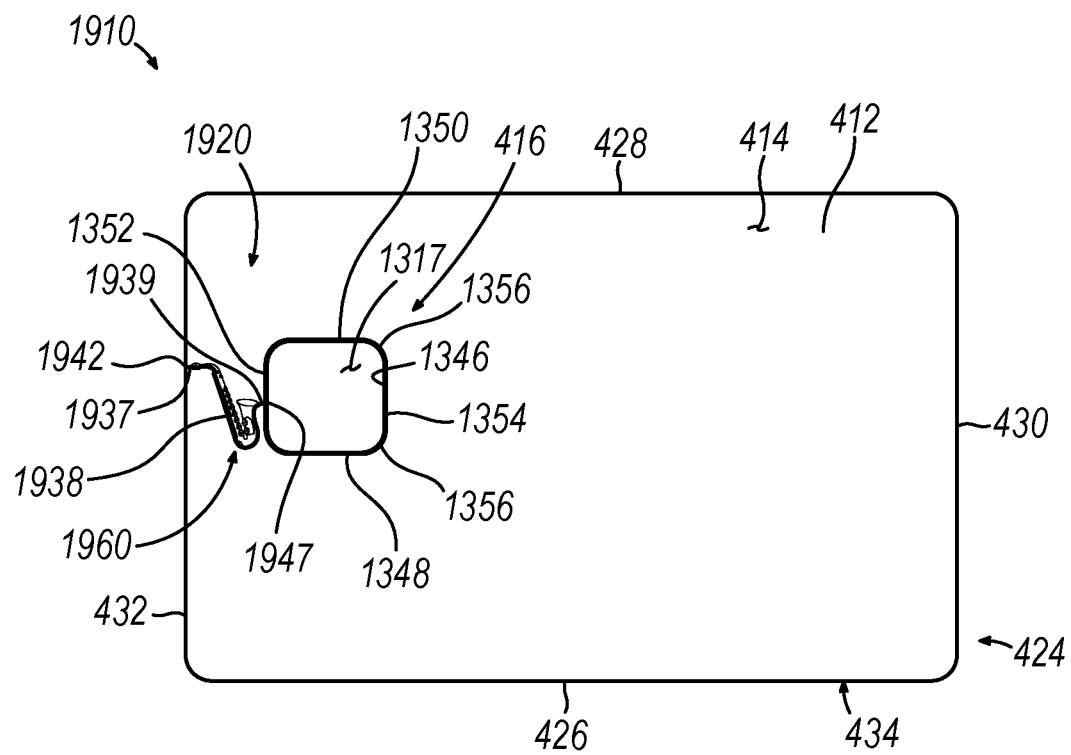
FIG. 48 depicts a front elevational view of another exemplary metal transaction card having the fifth shaped opening, a twelfth exemplary shaped slit, and a first exemplary graphic.
Figure 49:
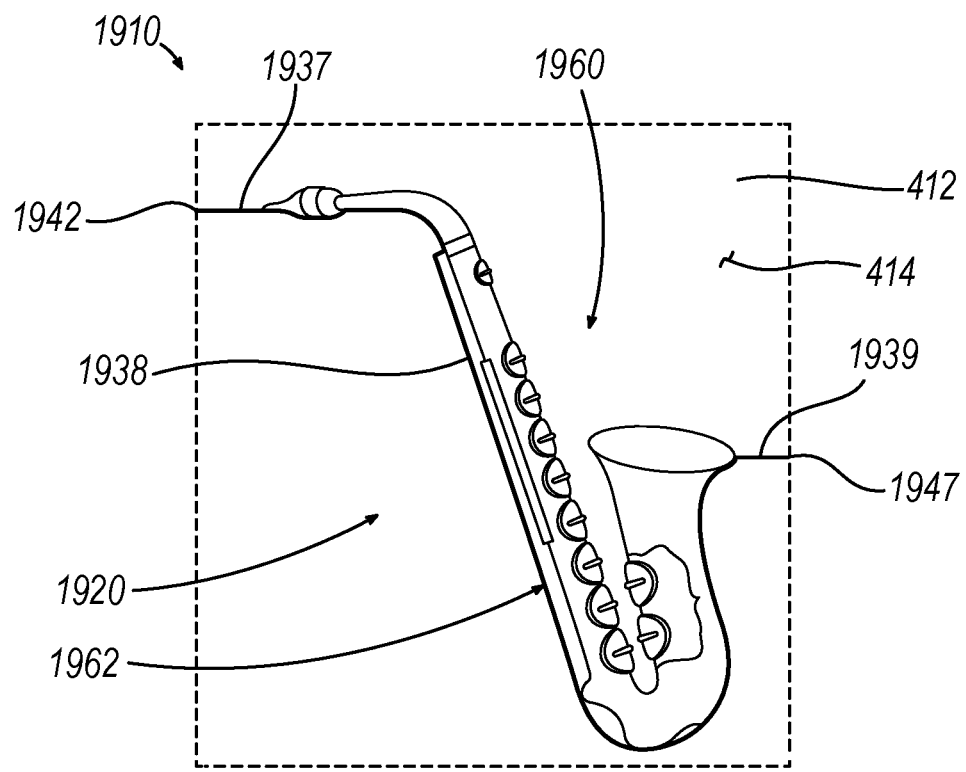
FIG. 49 depicts a magnified front elevational view of a portion of the metal transaction card of FIG. 48 having the twelfth shaped slit and the first graphic.

FIGS. 48-49 show at least a portion of a metal transaction card (1910) with a twelfth example of a shaped slit (1920) extending from peripheral surrounding edge (1346) of shaped chip opening (416) to outer periphery (434) for inductive coupling to the transponder chip module and operable in accordance with the description above. In the present example, front face (414) of metal layer (412) further includes a first exemplary graphic (1960), such as an object, artistic design, and/or logo, which is particularly a saxophone graphic (1960) as shown in FIGS. 48-49. Shaped slit (1920) is disposed along a predetermined portion of saxophone graphic (1960) and thereby configured to be camouflaged amongst saxophone graphic (1960), such as by following a predetermined outline (1962), internal or external, along saxophone graphic (1960) while also allowing metal layer (412) to function as a coupling frame.

Shaped slit (1920) has a depth though an entirety of metal layer (412) and is continuous from peripheral surrounding edge (1346) of shaped chip opening (416) to outer periphery (434). Between a majority of peripheral surrounding edge (1346) of shaped chip opening (416) to outer periphery (434), shaped slit (1920) overlaps an external predetermined outline (1962) along at least a bottom portion of saxophone graphic (1960) and, more particularly, along an entire bottom portion of saxophone graphic (1960) such that portions of the shaped slit (1920) define the bottom portion of saxophone graphic (1960). In this respect, shaped slit (1920) defines an incomplete outline of saxophone graphic (1960). Additional portions of saxophone graphic (1960) may be engraved, marked, textured, and/or colored for other desired aesthetics and/or camouflage of shaped slit (1920). Of course, shaped slit (1920) may be mechanically engraved or laser etched and the invention is not intended to be unnecessarily limited to either mechanical or laser formation.

Figure 50:
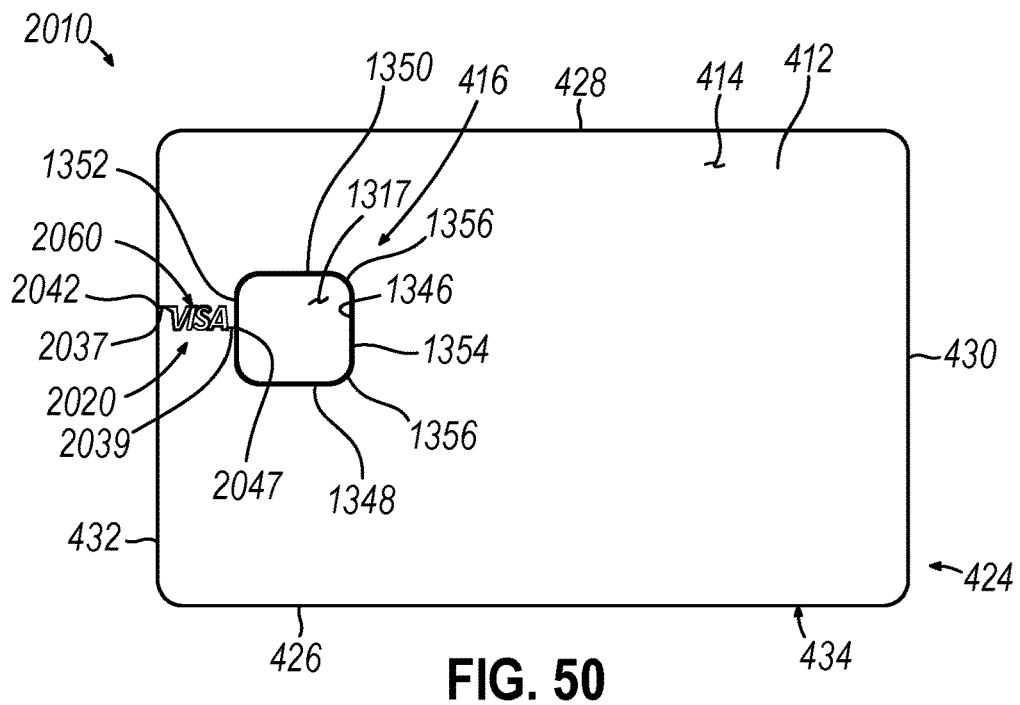
FIG. 50 depicts a front elevational view of another exemplary metal transaction card having the fifth shaped opening, a thirteenth exemplary shaped slit, and a second exemplary graphic.
Figure 51:
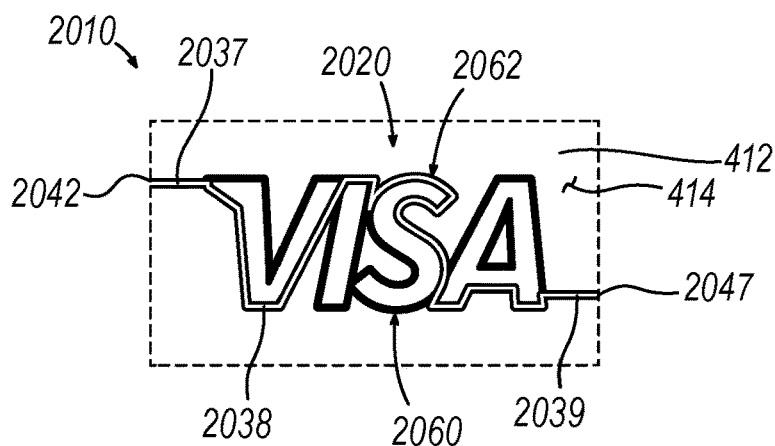
FIG. 51 depicts a magnified front elevational view of a portion of the metal transaction card of FIG. 50 having the thirteenth shaped slit and the second graphic.

To this end, shaped slit (1920) of the present example overlaps saxophone graphic (1960) to include, from left to right, an outer horizontal linear channel (1937), a non-linear graphic portion channel (1938) extending along saxophone mouthpiece, saxophone neck, saxophone body, saxophone U-shape, and saxophone flared bell, and an inner horizontal linear channel (1939). Channels (1937, 1938, 1939) successively extend as shown in FIGS. 48-49 and intersect from an origin (1942) through a terminus (1947) at peripheral surrounding edge (1346) of shaped chip opening (416) to an endpoint (not shown) such that origin (1942) is generally above terminus (1947) and endpoint (not shown) in the present example.

viii. Thirteenth and Fourteenth Examples of a Shaped Slit and Corresponding Graphic FIGS. 50-51 show at least a portion of a metal transaction card (2010) with a thirteenth example of a shaped slit (2020) extending from peripheral surrounding edge (1346) of shaped chip opening (416) to outer periphery (434) for inductive coupling to the transponder chip module and operable in accordance with the description above. In the present example, front face (414) of metal layer (412) further includes a second exemplary graphic (2060), such as an object, artistic design, and/or logo, which is particularly a logo graphic (2060), such as VISA™ as shown in FIGS. 50-51. Shaped slit (2020) is disposed along a predetermined portion of logo graphic (2060) and thereby configured to be camouflaged amongst logo graphic (2060), such as by following a predetermined outline (2062), internal or external, along logo graphic (2060) while also allowing metal layer (412) to function as a coupling frame.

Shaped slit (2020) has a depth though an entirety of metal layer (412) and is continuous from peripheral surrounding edge (1346) of shaped chip opening (416) to outer periphery (434). Between a majority of peripheral surrounding edge (1346) of shaped chip opening (416) to outer periphery (434), shaped slit (2020) overlaps an external and internal predetermined outline (2062) along a bottom portion of logo graphic (1960), an interior portion of logo graphic (2060), and a top portion of logo graphic (2060). Portions of shaped slit (2020) thereby define portions of the bottom, the interior, and top portions of logo graphic (2060). In this respect, shaped slit (2020) defines an incomplete outline of logo graphic (2060). Additional portions of logo graphic (2060) may be engraved, marked, textured, and/or colored for other desired aesthetics and/or camouflage of shaped slit (2020). Of course, shaped slit (2020) may be mechanically engraved or laser etched and the invention is not intended to be unnecessarily limited to either mechanical or laser formation.

To this end, shaped slit (2020) of the present example overlaps logo graphic (2060) to include, from left to right, an outer horizontal linear channel (2037), a non-linear graphic portion channel (2038) extending along left and right portions of "V", top portions of "I" and "S", right portion of "S", bottom portion of "A", and an inner horizontal linear channel (2039). Channels (2037, 2038, 2039) successively extend as shown in FIGS. 50-51 and intersect from an origin (2042) through a terminus (2047) at peripheral surrounding edge (1346) of shaped chip opening (416) to an endpoint (not shown) such that origin (2042) is generally above terminus (2047) and endpoint (not shown) in the present example.

Figure 52:
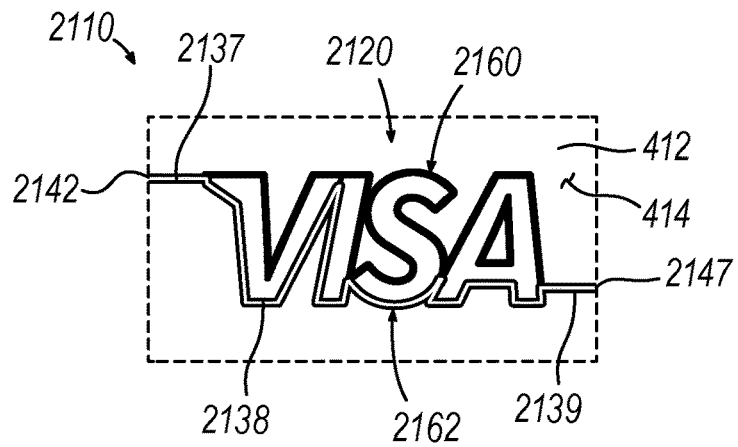
FIG. 52 depicts a magnified front elevational view of a portion of another exemplary metal transaction card having a fourteenth exemplary shaped slit and the second graphic.

FIG. 52 shows a fourteenth example of a shaped slit (2120) in metal layer (412) of a metal transaction card (2110) that corresponds to logo graphic (2060), such as VISA™ similar to that discussed above such that like numbers indicate like features. Generally, shaped slit (2120) is like shaped slit (2020) (see FIG. 51), but extends along a different portion of logo graphic (2060) to form an alternative predetermined outline (2062). To this end, shaped slit (2220) of the present example overlaps logo graphic (2060) to include, from left to right, an outer horizontal linear channel (2137), a non-linear graphic portion channel (2138) extending along a bottom portion of logo graphic (2060), and an inner horizontal linear channel (2139). Channels (2037, 2038, 2039) successively extend as shown in FIG. 52 and intersect from an origin (2142) through a terminus (2147) at peripheral surrounding edge (1346) (see FIG. 50) of shaped chip opening (416) (see FIG. 50) to an endpoint (not shown) such that origin (2142) is generally above terminus (2147) and endpoint (not shown) in the present example.

It will be appreciated that alternative predetermined outlines, external and/or internal, may be similarly be incorporated into any corresponding pattern to in whole or in part represent alternative logos, people, animal, signature, character, digital data, geographic area, and any other representation. The invention is thus not intended to be unnecessarily limited to any particular corresponding shaped slit shown and described herein.

O. Various Layered Arrangements for a Metal Transaction Card

While the above referenced metal transaction cards (410, 510, 610, 710, 810, 910, 1010, 1110, 1210, 1310, 1410, 1510, 1610, 1710, 1810, 1910, 2010, 2110) with metal transaction card bodies (24, 124, 224, 324, 424) show combinations of exemplary shaped chip openings (16, 116, 216, 316, 416, 516, 616, 716, 816, 916, 1016, 1116, 1216) and exemplary shaped slits (20, 120, 220, 320, 420, 1320, 1420, 1520, 1620, 1720, 1820, 1920, 2020, 2120) in one or more of exemplary metal layers (12, 112, 212, 312, 412), these metal layers (12, 112, 212, 312, 412) are configured to be assembled with additional layers for production. By way of example, various metal transaction card bodies (2210, 2310, 2410, 2510) are shown in FIGS. 53-56 as portions of exemplary metal transaction cards (2214, 2314, 2414, 2514). These metal transaction card bodies (2210, 2310, 2410, 2510) are shown with metal layers (2222, 2330, 2420, 2516), although one or more aspects of metal layers, such as metal layers (12, 112, 212, 312, 412) discussed above, may be incorporated into metal transaction card bodies (2210, 2310, 2410, 2510). Similarly, any shaped chip opening, such as shaped chip openings (16, 116, 216, 316, 416, 516, 616, 716, 816, 916, 1016, 1116, 1216), and shaped slits, such as shaped slits (20, 120, 220, 320, 420, 1320, 1420, 1520, 1620, 1720, 1820, 1920, 2020, 2120), may be incorporated in any combination into metal transaction card bodies (2210, 2310, 2410, 2510). The invention is thus not intended to be unnecessarily limited to layered arrangement.

i. Metal Transaction Card and a First Layered Arrangement of Layers

Figure 53:
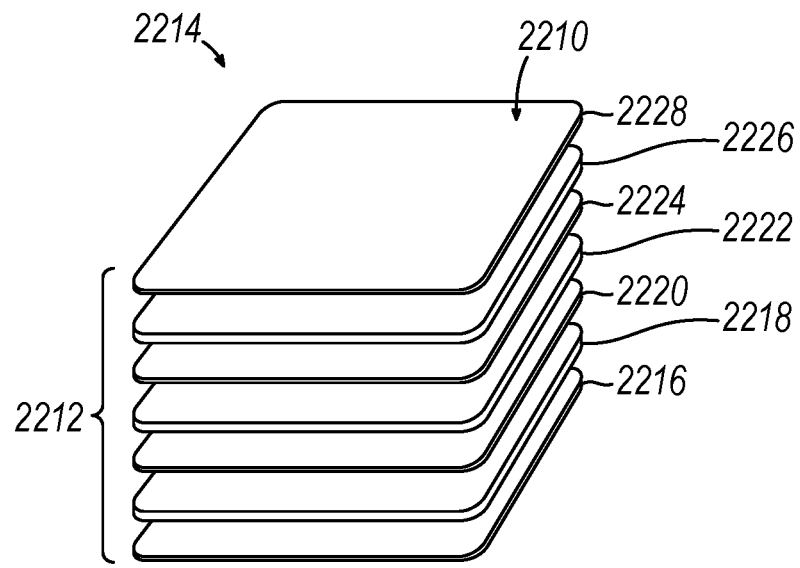
FIG. 53 depicts a disassembled front perspective view of another exemplary metal transaction card having a first exemplary layered arrangement of layers.

FIG. 53 shows a sixth exemplary metal transaction card body (2210) having a first layered arrangement (2212) for a metal transaction card (2214), such as an embedded metal transaction card (2214). More particularly, layers (2216, 2218, 2220, 2222, 2224, 2226, 2228) forming metal transaction card (2214) include a bottom and top overlay (2216, 2228), a bottom and top print layer (2218, 2226), a bottom and top bonding layer (2220, 2224), and a central metal layer (2222). Metal transaction card (2214) thus has seven layers (2216, 2218, 2220, 2222, 2224, 2226, 2228), although alternative numbers of layers, such as more or less layers, may be applied.

Overlay layers (2216, 2228) may be a plastic or other clear bondable material, such as a laser engravable polyvinyl chloride having a thickness of about approximately 0.003 inches (~75 μm). Print layers (2218, 2226) may be a plastic or paper material that can accept various types of printed words, images, and colors, and may be, for example, a polyvinyl chloride having a thickness of approximately 0.006 inches (~150 μm). Bonding layers (2220, 2224) may be a plastic or adhesive layer such as, for example, polyethylene terephthalate, having a thickness of around 0.003 inches (~75 μm). Metal layer (2222) may be a metal of any suitable type such as, for example, tempered 301 stainless steel, titanium, aluminum, or other metals that provide durability and aesthetics, having a thickness of approximately 0.01 inches (~250 μm). Layers (16, 2218, 2220, 2222, 2224, 2226, 2228) are selected and arranged as shown so that during a heated and pressurized lamination process, each layer (16, 2218, 2220, 2222, 2224, 2226, 2228) will be bound to any other transversely adjacent layer (16, 2218, 2220, 2222, 2224, 2226, 2228). For example, overlay (2216), when heated and cooled, will bind to print layer (2218), while the bonding layer (2220) will bind to print layer (2218) and metal layer (2222), and so on. The resulting layered arrangement (2212) for a metal transaction card (2214) will be durable, resistant to delamination, and have a thickness of between approximately 0.027 inches (~685 μm) and approximately 0.033 inches (~838 μm). More particularly, such thickness may be between approximately 0.032 inches (~812 μm) and approximately 0.033 inches (~838 μm). In addition, such thickness may be increased in cases of a post lamination varnish (PLV) finish to metal transaction card (2214). Additional details regarding aspects of such construction are described in greater detail in U.S. Pat. No. 10,583,683, entitled "Embedded Metal Transaction Card and Related Method," filed on Feb. 2, 2018, which is incorporated by reference herein.

ii. Metal Transaction Card and a Second Layered Arrangement of Layers

Figure 54:
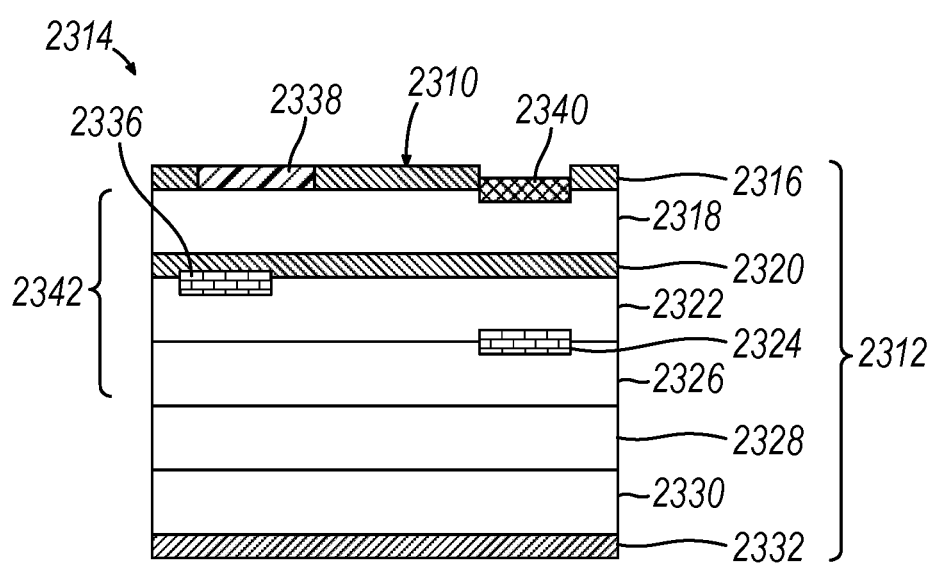
FIG. 54 depicts a cross-sectional view of another exemplary metal transaction card having a second exemplary layered arrangement of layers.

FIG. 54 shows a seventh exemplary metal transaction card body (2310) having a second layered arrangement (2312) for a metal transaction card (2314). More particularly, layers (2316, 2318, 2320, 2322, 2324, 2326, 2328, 2330) forming metal transaction card (2314) include offset printed layer (2316), clear overlay plastic layer (2318), offset printed layer (2320), core plastic layer (2322), clear overlay plastic layer (2326), adhesive layer (2328), and metal layer (2330) with an outer surface (2332) thereof. Metal transaction card (2314) of the present example also includes transponder chip modules (2334, 2336), a magnetic strip (2338), and a contact chip (2340).

Once laminated during assembly, outer surface (2332) of metal layer (2330) may be etched, embossed or engraved (coined and debossed) with any personalized information or decorated with any pattern. In addition, offset printed layer (2316) may be attached or formed on an outer surface of clear overlay plastic layer (2318). Magnetic stripe (2338) may also be attached to the outer surface of clear overlay plastic layer (2318).

Contact chip (2340) is placed within a top region of clear overlay plastic layer (2318) by forming a cavity on, and within, the outer surface of clear overlay plastic layer (2318). Such cavity may be formed by milling or any other suitable process and inserting Contact chip (2340) within the cavity. Contact chip (2340) will generally be flush with the surface and can be visible, although it could also be placed along the outer surface of clear overlay plastic layer (2318). Contact chip (2340) is typically added after a reminder of metal transaction card (2314) is finished, but it can be inserted or placed before or after lamination.

For metal transaction card (2314) whose thickness is approximately 0.03 inches, the cumulative thickness of the layers forming a first "plastic" assembly (2342) can range from 0.005 to 0.025 inches. Adhesive layer (2328) may range in thickness from 0.0005 to 0.005 inches, and metal layer (2330) may range in thickness from 0.008 to 0.025 inches.

Metal transaction card body (2310) may be made such that it is essentially half metal and half plastic. However, it should be evident that the thickness ratio of metal to plastic may be greatly varied. Also, the thickness of the card may be greater or less than 0.03 inches. Additional details regarding aspects of such construction are described in greater detail in U.S. Pat. No. 8,672,232, entitled "Combination Card of Metal and Plastic," filed on Jun. 27, 2011, which is incorporated by reference herein.

iii. Metal Transaction Card and a Third Layered Arrangement of Layers

Figure 55:
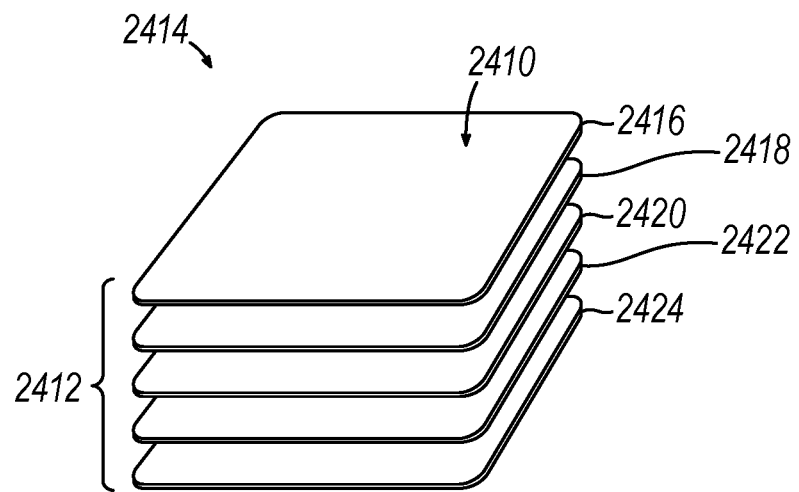
FIG. 55 depicts a disassembled front perspective view of another exemplary metal transaction card having a third exemplary layered arrangement of layers.

FIG. 55 shows an eighth exemplary metal transaction card body (2410) having a third layered arrangement (2412) for a metal transaction card (2414). More particularly, layers (2416, 2418, 2420, 2422, 2424) forming metal transaction card (2414) include bottom and top overlays (2416, 2424) with a digital reverse print which may be laser engravable, a bottom and top bonding layer (2418, 2422), and a central metal layer (2420) with a slit (not shown). Metal transaction card (2314) of the present example thus has five layers (2416, 2418, 2420, 2422, 2424), although alternative numbers of layers, such as more or less layers, may be applied. Also in the present example, metal layer (2420) with slit (not shown) has a depth of ~23 mils and is reinforced to stabilize the structural integrity of metal transaction card (2314), which may have a weight of 22 grams and total thickness, which may also be referred to herein as depth, pre-lamination of ~834.6 µm (32.85 mils). The following will address examples of each of layers (2416, 2418, 2420, 2422, 2424) and other aspects of metal transaction card (2414) in turn as a stack-up from top to bottom of metal transaction card (2414).

A hard or diamond coat layer (not shown) is optional and may be on a release layer or deposited there.

Top overlay (2416) includes a clear PVC front overlay of depth~50.8 µm (2.0 mils) with digital reverse print.

Printed Information of ink, such as UV Curable Flexible Ink of depth~13 µm (0.5 mils). Additionally or alternatively, top overlay (2416) may be laser engraved.

Top bonding layer (2418) includes adhesive bonding film, such as double-sided adhesive on a polyethylene terephthalate (PET) carrier of depth~63.5 µm (2.5 mils).

Metal layer (2420) includes a single metal layer (2420), such as stainless steel, of depth~580 µm (23 mils), with a reinforced slit (not shown) via a metal inlay.

Bottom bonding layer (2422) includes adhesive bonding film, such as double-sided adhesive on a PET carrier of depth~63.5 µm (2.5 mils).

Printed Information of ink, such as UV Curable Flexible Ink of depth~13 µm (0.5 mils). Additionally or alternatively, bottom overlay (2424) may be laser engraved.

Bottom overlay (2424) includes a clear PVC rear overlay and magnetic stripe of depth~50.8 µm (2.0 mils) with digital reverse print.

Additional elements including a signature panel (not shown) and a hologram (not shown) may be attached to bottom overlay (2424).

While the above stack-up of from top to bottom of metal transaction card (2414) provides one example of metal transaction card (2414), it will be appreciated that these features, dimensions, and weights may vary such that the invention is not intended to be unnecessarily limited to the above stack-up of metal transaction card (2414).

iv. Metal Transaction Card and a Fourth Layered Arrangement of Layers

Figure 56:
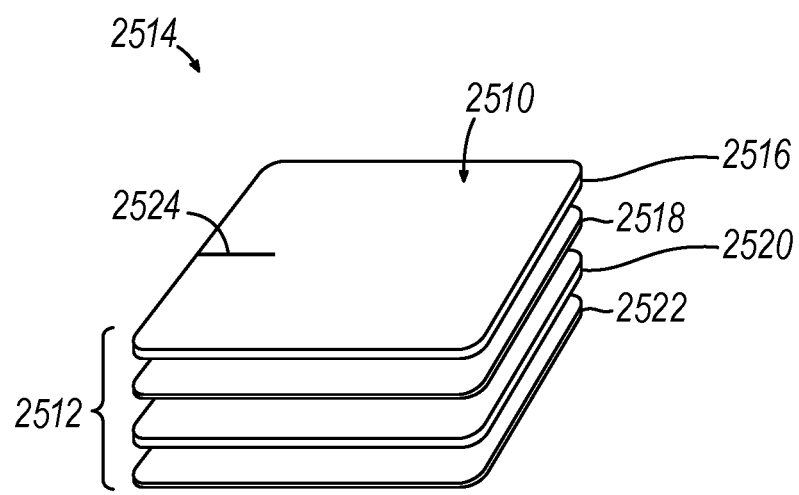
FIG. 56 depicts a disassembled front perspective view of another exemplary metal transaction card having a fourth exemplary layered arrangement of layers and a fifteenth exemplary shaped slit.

FIG. 56 shows a ninth exemplary metal transaction card body (2510) having a fourth layered arrangement (2512) for a metal transaction card (2514). More particularly, layers (2516, 2518, 2520, 2522) forming metal transaction card (2514) include a top metal layer (2516) with a fifteenth example of a shaped slit (2524) to function as a coupling frame and may be laser engravable or CNC engraved, a bonding layer (2518), a bottom print layer (2520), and a bottom overlay (2522) with a magnetic stripe (not shown). Metal transaction card body (2510) thus has four layers (2516, 2518, 2520, 2522), although alternative numbers of layers, such as more or less layers, may be applied. With metal layer (2516) exposed, with an optional hard or diamond coat thereon, a logo may be mechanically engraved or the laser etched thereon. To support this single metal layer (2516) with slit (2524), the underlying layers may include a layer of fiberglass, carbon fiber or a rigid textile for additional structural integrity about slit (2524). Also in the present example, metal layer (2516) with slit (2524) has a depth, pre-lamination of ~823 µm (32.4 mils). The following will address examples of each of layers (2516, 2518, 2520, 2522) and other aspects of metal transaction card (2514) in turn as a stack-up from top to bottom of metal transaction card (2514).

A hard or diamond coat layer (not shown) of depth~12 µm is optional and may be on a release layer or deposited there.

A plain flood front with artwork of depth 25 µm with ink, such as digitally printed flexible ink, of depth~0.5-0.6 mils, and primer, such as digitally printed primer, of 0.3-0.4 mils.

Metal layer (2516) includes a single metal layer (2516) of depth~508 µm (20 mils), with slit (2524).

Bonding layer (2518) includes adhesive bonding film, such as double-sided adhesive on a PET carrier of depth~63.5 µm (2.5 mils). Alternatively, bonding layer (2518) may be replaced by a thin layer of adhesive at depth~20 µm on a high density polyethylene (HDPE) liner.

Bottom print layer (2520) includes a clear, which may also be referred to herein as transparent, PVC layer that is digitally printed of depth~125 µm (5 mils)

Printed Information of ink and primer at depth~25 µm and, more particularly, ink at depth~0.6 mils and primer at depth~0.3-0.4 mils.

Bottom overlay (2522) includes a clear PVC rear overlay and magnetic stripe of depth~64 µm (2.5 mils).

Additional elements including a signature panel (not shown) and a hologram (not shown) may be attached to bottom overlay (2522).

While the above stack-up of from top to bottom of metal transaction card (2514) provides one example of metal transaction card (2514), it will be appreciated that these features, dimensions, and weights may vary such that the invention is not intended to be unnecessarily limited to the above stack-up of metal transaction card (2514).

P. Metal Transaction Card with a Fifth Exemplary Layered Arrangement and Various Examples of Laterally Opposing Arrangements of a Shaped Chip Opening and a Shaped Slit While the above referenced metal transaction cards (410, 510, 610, 710, 810, 910, 1010, 1110, 1210, 1310, 1410, 1510, 1610, 1710, 1810, 1910, 2010, 2110, 2214, 2314, 2414, 2514) with metal transaction card bodies (24, 124, 224, 324, 424, 2210, 2310, 2410, 2510) show combinations of exemplary shaped chip openings (16, 116, 216, 316, 416, 516, 616, 716, 816, 916, 1016, 1116, 1216) and exemplary shaped slits (20, 120, 220, 320, 420, 1320, 1420, 1520, 1620, 1720, 1820, 1920, 2020, 2120, 2524) in one or more of exemplary metal layers (12, 112, 212, 312, 412, 2222, 2330, 2420, 2516), these metal layers (12, 112, 212, 312, 412, 2222, 2330, 2420, 2516) are configured to be assembled with additional layers for production. By way of further example to such layered arrangements (2212, 2312, 2412) discussed above, another example of a metal transaction card body (2601) is shown in FIGS. 57-61 as portions of exemplary metal transaction cards (2600, 2700, 2800) with a fifth layered arrangement (2601'). Metal transaction card body (2601) is shown with metal layers (2610, 2618), although one or more aspects of metal layers, such as metal layers (12, 112, 212, 312, 412, 2222, 2330, 2420, 2516) discussed above, may be incorporated into metal transaction card body (2601). Similarly, any shaped chip opening, such as shaped chip openings (16, 116, 216, 316, 416, 516, 616, 716, 816, 916, 1016, 1116, 1216), and shaped slits, such as shaped slits (20, 120, 220, 320, 420, 1320, 1420, 1520, 1620, 1720, 1820, 1920, 2020, 2120), may be incorporated in any combination into metal transaction card body (2601). The invention is thus not intended to be unnecessarily limited to layered arrangement.

In addition, FIGS. 57-61B show additional examples of metal transaction cards (2700, 2800) with exemplary shaped chip openings (2736, 2836) and exemplary shaped slits (2734, 2834) extending from a right portion of chip opening (2736, 2836) to a vertically extending centerline of metal transaction cards (2700, 2800). In this respect, no portion of shape slits (2734, 2834) extend from a left portion of chip opening (2736, 2836) and any such origin (2748, 2848) and terminus (2752, 2852) are positioned rightward of chip opening (2736, 2836), such as alternative slits discussed above. For clarity as to the relative dimensions, the left portion defines a left lateral dimension horizontally left of chip opening (2736, 2836) to a left lateral body edge (2778), the right portion defines a right lateral dimension horizontally right of chip opening (2736, 2836) to a right lateral body edge (2776), and left lateral dimension is smaller than right lateral body dimension.

Figure 57:
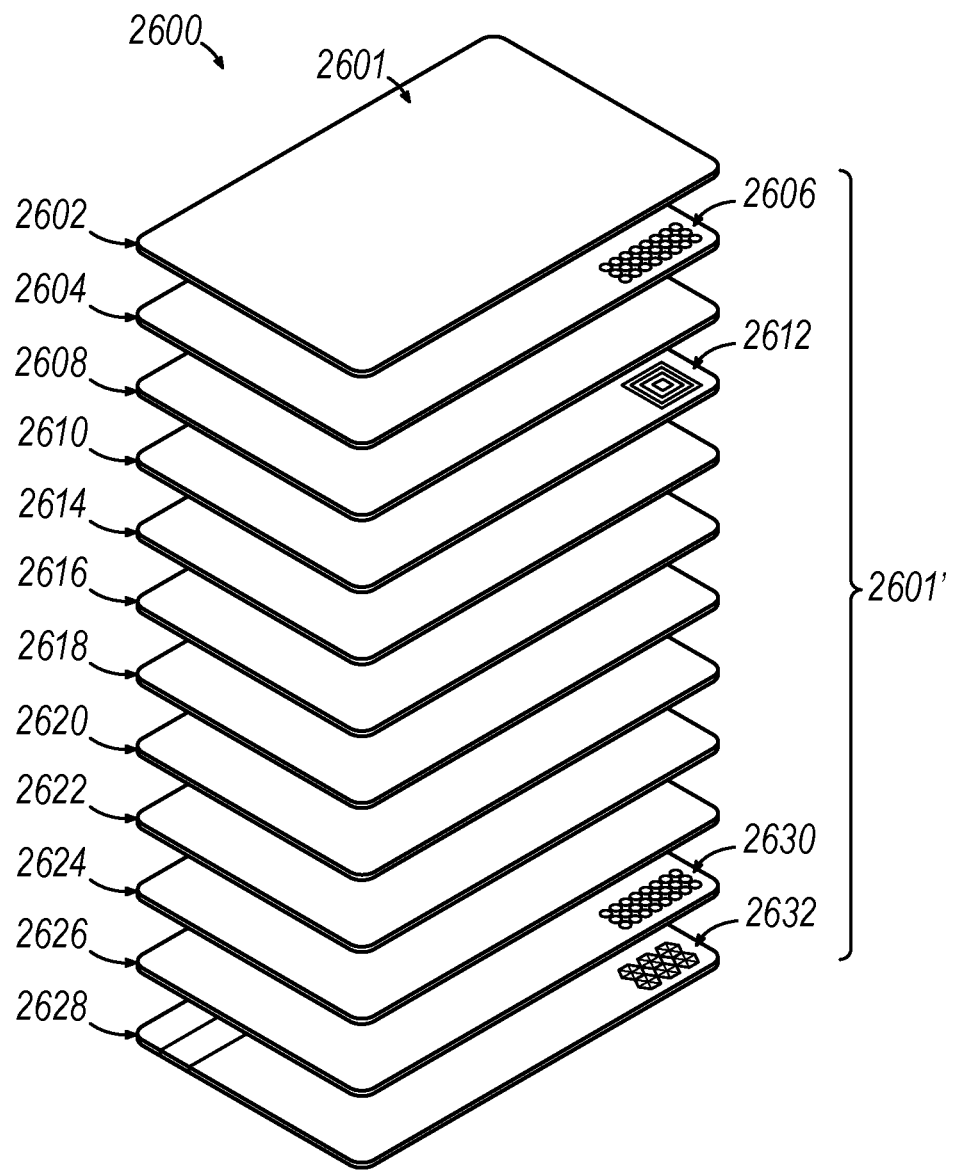
FIG. 57 depicts a disassembled front perspective view of another exemplary metal transaction card having a fifth exemplary layered arrangement of layers.
Figure 58A:
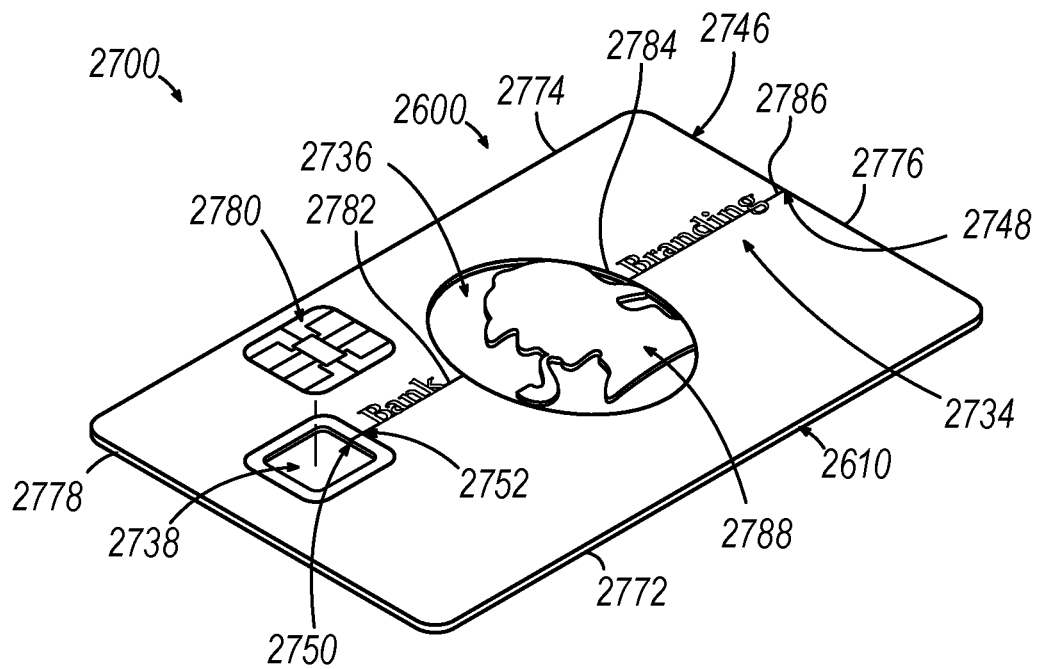
FIG. 58A depicts a front perspective view of another exemplary metal transaction card having the fifth layered arrangement of layers, a fourteenth exemplary shaped opening, a sixteenth exemplary shaped slit, and an exemplary center opening.
Figure 58B:
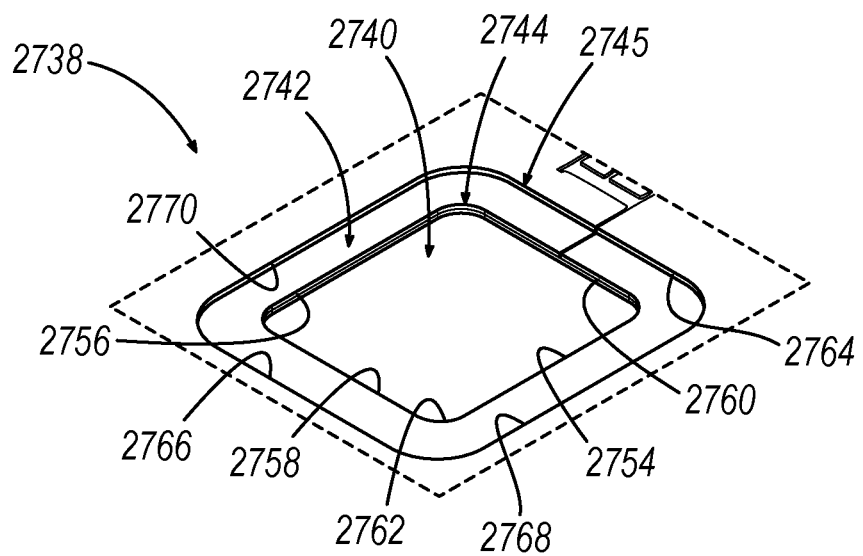
FIG. 58B depicts a magnified front perspective view of a portion of the metal transaction card of FIG. 58A having the fourteenth exemplary shaped opening.
Figure 59:
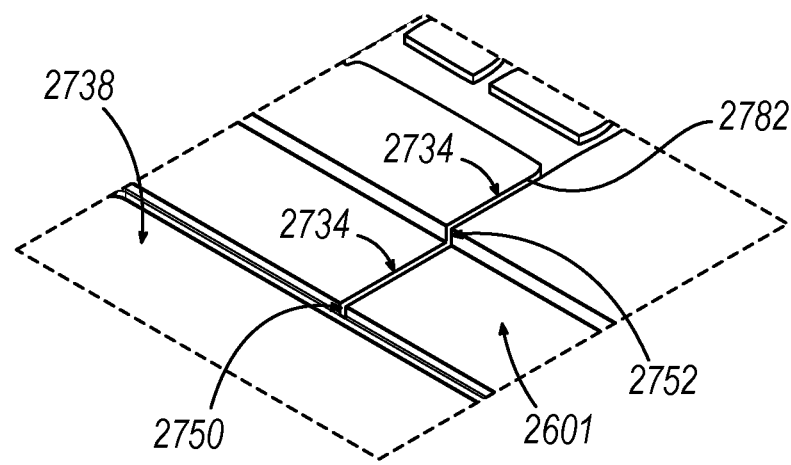
FIG. 59 depicts a magnified front perspective view of a portion of the metal transaction card of FIG. 58A having an endpoint of the sixteenth shaped slit.
Figure 60:
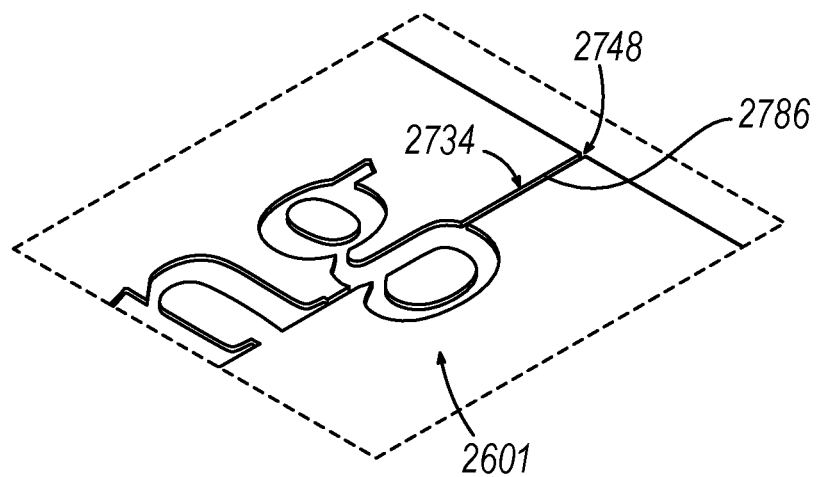
FIG. 60 depicts a magnified front perspective view of a portion of the metal transaction card of FIG. 58A having an origin of the sixteenth shaped slit.

As a preliminary matter, metal transaction cards (2600, 2700, 2800) have fifth exemplary layered arrangement (2601') of metal transaction card body (2601). Metal transaction card body (2601) of the present example includes the following layers, from top to bottom, which may also be respectively referred to herein as front to rear, in a stack-up as shown in FIG. 57: a post lamination varnish (PLV) (2602), a protective coating (2604) having a laser etching (2606) thereon, a front design layer (2608), a flexible metal layer (2610) having a mechanical engraving (2612) thereon, an inter design layer (2614), a dielectric layer (2616), a supporting metal layer (2618), an adhesive layer (2620), a clear PVC layer (2622), a rear design layer (2624), a clear PVC layer (2626), and a magnetic stripe (2628). In addition, clear PVC layer (2626) has a personalization (2630), such as a laser etching, positioned thereon, whereas magnetic stripe (2628) has a security element (2632) hot stamped into position thereon. In the present example, such stack-up has pre-lamination depth~32.6 mils (828 μm). By way of further example, shaped chip opening (not shown), other openings, and metal artwork may be formed by a chemical etching process, laser cutting, waterjet cutting or punching. Also in the present example, chip opening (not shown) is configured to receive a transponder chip module (not shown) such that chip opening (not shown) is the same shape as an module antenna (not shown) for improved performance relative to dissimilar shapes between chip opening (not shown) and module antenna (not shown). The laser personalization step (ultraviolet (UV), infrared (IR) or green) may laser ablate any synthetic surfaces therethrough up to any one of metal layers (2610, 2618). The following will address examples of each of layers (2602, 2604, 2608, 2610, 2614, 2616, 2618, 2620, 2622, 2624, 2626, 2628) and other aspects of metal transaction card (2600) in turn as the stack-up from top to bottom of metal transaction card (2600).

Post lamination varnish (2602) includes a first ink layer with raised alphanumeric characters disposed on protective coating (2604). Such disposition in one example is by digital deposition of a primer and hard ink. In the present example, post lamination varnish (2602) has depth~20 μm, which includes digitally printed hard ink of depth~0.2 mil-1.0 mil and adhesion promoter and/or primer.

Protective coating (2604) includes a laser reactive coating, which may include a lacquer, a varnish, or an ink disposed a second ink layer of front design layer (2608). Such lacquer, a varnish, or an ink may represent cardholder user data, an issue bank logo, a payment scheme logo and include adhesion promotor and/or primer. In the present example, protective coating (2604) has depth~15 μm. Protective coating (2604) as shown in FIG. 57 also has laser etching (2606) thereon. Laser etching (2606) represents a personalization applied to protective coating (2604), such as to scribe cardholder data.

Front design layer (2608) includes laser reactive coating of colored ink to have the second ink layer disposed on adhesion promoter and/or primer or vice versa. Such colored ink may be divided into a plurality of ink layers separated by clear ink layers. In the present example, front design layer (2608) has depth~20 μm.

Flexible metal layer (2610) is a first, front face layer of edge to edge metal with a shaped chip opening (not shown), a shaped slit (not shown), a center opening (not shown), metal artwork, alpha numeric text, and/or graphic elements. In the present example, flexible metal layer (2610) has depth~152 μm (6 mils) and may be laser cut for the above referenced elements thereon. To this end, flexible metal layer (2610) of the present example has mechanical engraving (2612) produce a debossed logo of a payment scheme thereon. Flexible metal layer (2610) may be formed from 304 flexible stainless steel and have a surface that is raw, grain structured, pickled or electro-polished or coated (e.g., physical vapor deposition or diamond-like carbon).

Inter design layer (2614) includes a third ink layer, which is disposed on an adhesive side of dielectric layer (2616) or on a synthetic layer representing an intermediate design layer visible through center opening (not shown). The third ink layer represents printed information, graphics features, and/or texture.

Dielectric layer (2616) has thermosetting epoxy adhesive on both sides, also referred to herein as double-sided, of a carrier (e.g., PET or polyethylene naphthalate (PEN)) disposed between a rear surface of flexible metal layer (2610) and a front surface of supporting metal layer (2618). Dielectric layer (2616) is configured to be an electrical insulation between flexible metal layer (2610) and supporting metal layer (2618) and has a depth~75 μm (2.95 mils).

Supporting metal layer (2618) also includes shaped chip opening (not shown) and shaped slit (not shown) disposed below dielectric layer (2616) and is configured to provide structural reinforcement to flexible metal layer (2610) for improved structural integrity. Supporting metal layer (2618) may be formed from 304 stainless steel at depth~305 μm (12 mils) with shaped chip opening (not shown) offset from shaped slip (not shown) for structural support.

Adhesive layer (2620) includes free standing adhesive film of thermosetting epoxy disposed below supporting metal layer (2618). In the present example adhesive layer (2620) has depth~25 μm (1.0 mil).

Clear PVC layer (2622) includes a synthetic layer of clear Transparent PVC laminate disposed below the adhesive layer with a depth~152 μm (6 mils). Clear PVC layer (2622) also includes lithographically offset printed Pantone Matching System (PMS) colors and silk screen printed solvent ink or digitally printed ink.

Rear design layer (2624) includes a fourth ink layer with or without primer disposed on clear PVC layer (2622). Such fourth ink layer represents artwork and/or graphics and depth~20 μm with primer at depth at ~0.3-0.4 mils and ink at depth~0.6 mils. In one example, rear design layer (2624) is colored so as to match a color of supporting metal layer (2618).

Clear PVC layer (2626) with magnetic stripe (2628) have hot stamped security elements (2632), such as the signature panel and the hologram, disposed below rear design layer (2624) and has depth~64 μm (2.5 mils). Clear PVC layer (2626) is laser reactive so as to be laser engravable as an overlay, such as for additional personalization.

While the above stack-up of from top to bottom of metal transaction card (2600) provides one example of metal transaction card (2600), it will be appreciated that these features, dimensions, and weights may vary such that the invention is not intended to be unnecessarily limited to the above stack-up of metal transaction card (2600), such as incorporated with any of the following metal transaction cards (2700, 2800).

i. Metal Transaction Card with a Center Opening and a Sixteenth Example of a Shaped Slit FIGS. 58A-60 show a metal transaction card (2700), such as a metal face transaction card (2700), with layered arrangement (2601') of edge to edge metal transaction card body (2600) discussed above as well as a sixteenth example of a shaped slit (2734) and a center opening (2736). To this end, like numbers below indicate like feature discussed above in greater detail. Metal transaction card body (2600) further includes a fourteenth example of a chip opening (2738) including a generally rectangular, lower shaped chip hole (2740) and a generally rectangular, upper shaped chip hole (2742) being formed around lower shaped chip hole (2740). In the present example, lower shaped chip hole (2740) has the generally rectangular shape defined by a lower edge (2744), and upper shaped chip hole (2742) has the generally rectangular shape defined by an upper edge (2745). Shaped slit (2734) extends rightward from lower edge (2744) to center opening (2736) and then further rightward to an outer periphery (2746) between an origin (2748) and an endpoint (2750) and through a terminus (2752).

To this end, lower edge (2744) more particularly includes a bottom lower edge (2754), a top lower edge (2756), a left lateral lower edge (2758), and a right lateral lower edge (2760) defining the generally rectangular shape with a plurality of rounded corners (2762). Left and right lateral lower edges (2858, 2860) are parallel to right and left lateral upper edges (2764, 2766) of upper shaped chip hole (2742) as well as perpendicular to bottom and top upper edges (2768, 2770) of upper shaped chip hole (2742). Upper and lower shaped chip holes (2742, 2740) are generally positioned on a left portion of metal transaction card body (2600), which includes vertically opposing long bottom and top body edges (2772, 2774) and horizontally opposing short right and left lateral body edges (2776, 2778) defining outer periphery (2746). Upper and lower shaped chip holes (2742, 2740) are generally closer to top and left lateral body edges (2774, 2778) than bottom and right lateral body edges (2772, 2776), respectively. The right lateral dimension from a right lateral upper edge (2764) to right lateral body edge (2776) is thus larger than the left lateral dimension from a left lateral upper edge (2766) to left lateral body edge (2778) and, in the present example, the right lateral dimension is a greater than a majority of a full length dimension from right lateral body edge (2776) to left lateral body edge (2778). In this respect, as used herein, term "center" in the context of center opening (2736) means that center opening (2736) is generally located in a central portion of metal card body (2600) rightward of chip opening (2738) and along the right lateral dimension between chip opening (2738) and right lateral body edge (2776).

Chip opening (2738) is configured to receive a transponder chip module (2780) such that chip opening (2738) is the same shape as an module antenna (not shown) for improved performance relative to dissimilar shapes between chip opening (2738) and module antenna (not shown). In the present example, chip opening (2738) is configured to receive a rectangular shaped transponder chip module (2780), which may also be referred to as an inductive chip module. Upper shaped chip hole (2742) of the present example has a depth of 250 μm in the front face of metal layer (2610) and matches the shape and the dimensional size of transponder chip module (2780). Lower shaped chip hole (2740) of the present example has a depth of 600 μm into metal transaction card body (2600) into supporting metal layer (2618) and corresponds in rectangular shape to the shape of the encapsulation on the bond side of transponder chip module (2780).

From chip opening (2738), shaped slit (2734) includes, successively intersecting from left to right, an inner linear channel (2782), a non-linear graphic portion channel (2784), and an outer linear channel (2786) extending from endpoint (2750), through terminus (2752) in right lateral upper edge (2764), and to origin (2748) in right lateral body edge (2776). Non-linear graphic portion channel (2784) more particularly traces along a third exemplary graphic (2788), such as alphanumeric characters, script or graphic elements representing a name or logo, defining a path to center opening (2736) in metal layer (2618) incorporating metal artwork design features and further extending to additional alphanumeric characters, script or graphic elements. As such, shaped slit (2734) forms an integral portion of the graphic (2788). In the present example, path of shaped slit (2734) from origin (2748) to terminus (2752) is such that origin (2748), terminus (2752), and endpoint (2750) are along a horizontal axis parallel to long bottom and top body edges (2772, 2774). Metal transaction card (2700) may also dispose of raised alphanumeric characters (embossed), a mechanical engraving of a payment scheme logo (debossed), a radio frequency symbol for contactless payment, and laser personalization of data scribed into or onto top surface protective coating (2604) (see FIG. 57) of metal transaction card body (2600)

Figure 61A:
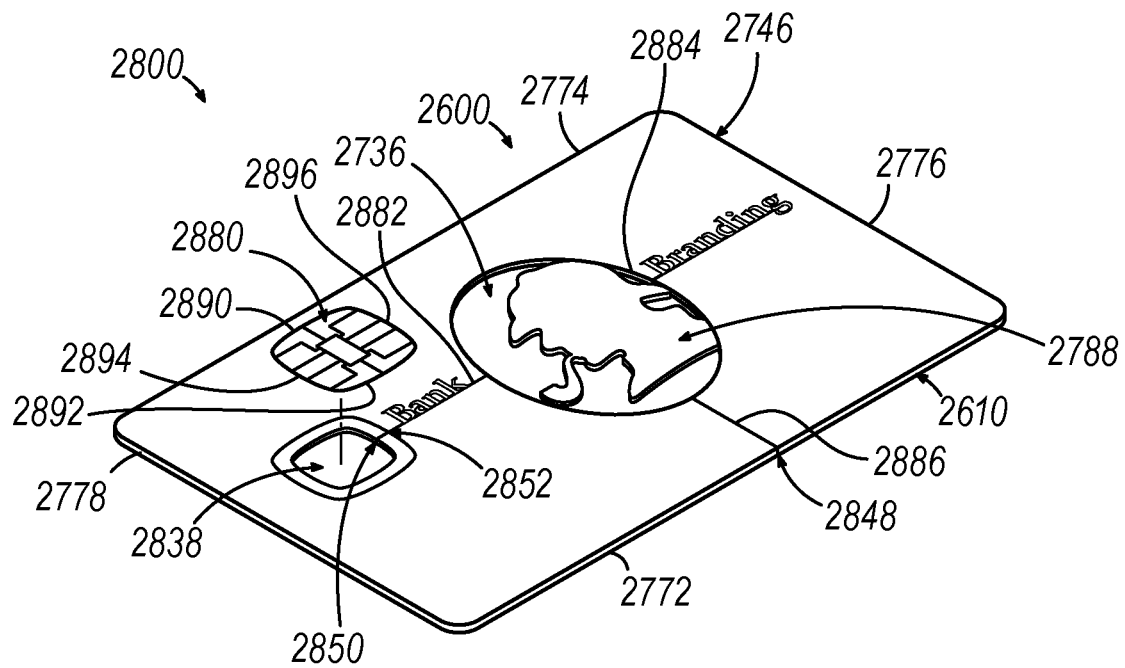
FIG. 61A depicts a front perspective view of another exemplary metal transaction card having the fifth layered arrangement of layers, a fifteenth exemplary shaped opening, a seventeenth exemplary shaped slit, and the center opening.
Figure 61B:
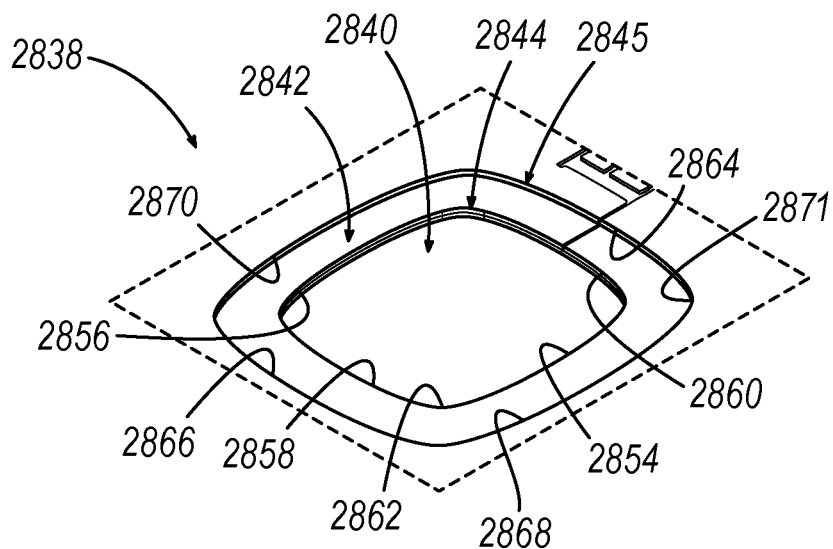
FIG. 61B depicts a magnified front perspective view of a portion of the metal transaction card of FIG. 61A having the fifteenth shaped opening.

While chip opening (2738) with the particular lower and upper shaped chip holes (2740, 2742) in conjunction with the particular shaped slit (2734) is shown in the present example of FIGS. 58A-60, alternative arrangements and shapes for receiving a transponder chip module relative to a slit for inductive coupling may be similarly integrated into an alternative metal transaction card such that the invention is not intended to be unnecessarily limited to the particular chip opening (2738) and shaped slit (2734) shown and described herein. Also, in one or more examples, an alternative upper shaped chip hole may be shaped as lower shaped chip hole (2740) such that any description provided herein with respect to lower edge (2744) may be incorporated in whole or in part into an alternative upper shaped chip hole or vice versa.

ii. Metal Transaction Card with a Center Opening and a Seventeenth Example of a Shaped Slit FIGS. 61A-61B show a metal transaction card (2800), such as a metal face transaction card (2800), with layered arrangement (2601') of edge to edge metal transaction card body (2600) discussed above as well as a seventeenth example of a shaped slit (2834) and center opening (2736). To this end, like numbers below indicate like feature discussed above in greater detail. Metal transaction card body (2600) further includes a fifteenth example of a chip opening (2838) including a non-rectangular, lower shaped chip hole (2840) and a non-rectangular, upper shaped chip hole (27842) being formed around lower shaped chip hole (2840). In the present example, lower shaped chip hole (2840) has the non-rectangular shape defined by a lower edge (2844) and upper shaped chip hole (2782) has the non-rectangular shape defined by an upper edge (2845). Shaped slit (2834) extends rightward from lower edge (2844) to center opening (2836) and downward to outer periphery (2746) between an origin (2748) and an endpoint (2850) and through a terminus (2852).

To this end, lower edge (2744) more particularly includes a bottom lower edge (2854), a top lower edge (2856), a left lateral lower edge (2858), and a right lateral lower edge (2860) defining the non-rectangular shape with a plurality of rounded corners (2862). Upper edge (2845) also more particularly includes a bottom upper edge (2868), a top upper edge (2870), a left lateral upper edge (2866), and a right lateral upper edge (2864) defining the non-rectangular shape with a plurality of rounded corners (2871). Each edge (2854, 2856, 2858, 2860, 2864, 2866, 2868, 2870) is generally arcuate so as to have a concave inner surface in the present example such that no edge (2854, 2856, 2858, 2860, 2864, 2866, 2868, 2870) is parallel or perpendicular with any of body edges (2772, 2774, 2776, 2778). Upper and lower shaped chip holes (2842, 2840) are generally positioned on a left portion of metal transaction card body (2600) and are generally closer to top and left lateral body edges (2774, 2778) than bottom and right lateral body edges (2772, 2776), respectively. The right lateral dimension from a right lateral upper edge (2864) to right lateral body edge (2776) is thus larger than the left lateral dimension from left lateral upper edge (2866) to left lateral body edge (2778) and, in the present example, the right lateral dimension is a greater than a majority of a full length dimension from right lateral body edge (276) to left lateral body edge (2778). In this respect, as used herein, term "center" in the context of center opening (2736) means that center opening (2736) is generally located in a central portion of metal card body (2600) rightward of chip opening (2838) and along the right lateral dimension between chip opening (2838) and right lateral body edge (2876).

Chip opening (2838) is configured to receive a transponder chip module (2880) such that chip opening (2738) is the same shape as an module antenna (not shown) for improved performance relative to dissimilar shapes between chip opening (2738) and module antenna (not shown). In the present example, chip opening (2838) is configured to receive a non-rectangular shaped transponder chip module (2880), which may also be referred to as an inductive chip module, such as an oval, elliptical, polygon, or round shape. Transponder chip module (2880) of the present example more particularly includes top, bottom, left lateral, and right lateral edges (2890, 2892, 2894, 2896) that are arcuate and have a convex outer surface to complement the concave inner surfaces of chip opening (2838). Upper shaped chip hole (2842) of the present example has a depth of 250 μm in the front face of metal layer (2610) and matches the non-rectangular shape and the dimensional size of transponder chip module (2880). Lower shaped chip hole (2840) of the present example has a depth of 600 μm into metal transaction card body (2600) into supporting metal layer (2618) and corresponds in shape to the non-rectangular shape of the encapsulation on the bond side of transponder chip module (2880).

From chip opening (2838), shaped slit (2834) includes, successively intersecting from left to right to down, an inner linear channel (2882), a non-linear graphic portion channel (2884), and an outer linear channel (2886) extending from endpoint (2850), through terminus (2852) in right lateral upper edge (2864), and to origin (2848) in bottom body edge (2772). Shaped slit (2834) may thus terminate in non-rectangular chip opening (2838) at endpoint (2850) with a shape in the form of a semi-circle or delta. In addition, Shaped slit (2834) commencing at outer periphery (2746) of metal transaction card body (2601) at origin (2848) may also have a form of a semi-circle or delta.

Non-linear graphic portion channel (2784) more particularly traces along graphic (2788), such as alphanumeric characters, script or graphic elements representing a name or logo, defining a path to center opening (2736) in metal layer (2618) incorporating metal artwork design features and further extending to additional alphanumeric characters, script or graphic elements. As such, shaped slit (2834) forms an integral portion of graphic (2888). In the present example, path of shaped slit (2834) from origin (2848) to terminus (2852) is such that origin (2748) and terminus (2752) are not both along a horizontal axis parallel to long bottom and top body edges (2772, 2774). More particularly, inner linear channel (2882) horizontally extends between center opening (2736) and chip opening (2838), whereas outer linear channel (2886) is perpendicular to inner linear channel (2882) and vertically extends between center opening (2736) and bottom body edge (2772). While the present example shows shaped slit (2834) along a path with origin (2848) in bottom body edge (2772), alternative shaped slits (2834) may extend along alternative paths to other portions of any of body edges (2772, 2774, 2776, 2778). Metal transaction card (2800) may also dispose of raised alphanumeric characters (embossed), a mechanical engraving of a payment scheme logo (debossed), a radio frequency symbol for contactless payment, and laser personalization of data scribed into or onto top surface protective coating (2604) (see FIG. 57) of metal transaction card body (2600)

While chip opening (2838) with the particular lower and upper shaped chip holes (2840, 2842) in conjunction with the particular shaped slit (2834) is shown in the present example of FIGS. 61A-61B, alternative arrangements and shapes for receiving a transponder chip module relative to a slit for inductive coupling may be similarly integrated into an alternative metal transaction card such that the invention is not intended to be unnecessarily limited to the particular chip opening (2838) and shaped slit (2834) shown and described herein. Also, in one or more examples, an alternative upper shaped chip hole may be shaped as lower shaped chip hole (2840) such that any description provided herein with respect to lower edge (2844) may be incorporated in whole or in part into an alternative upper shaped chip hole or vice versa.

Q. Metal Transaction Card with a Sixth Exemplary Layered Arrangement and Various Examples of an Antenna Circuit in Cooperation with a Shaped Slit While the above referenced metal transaction cards (410, 510, 610, 710, 810, 910, 1010, 1110, 1210, 1310, 1410, 1510, 1610, 1710, 1810, 1910, 2010, 2110, 2214, 2314, 2414, 2514, 2600, 2700, 2800) with metal transaction card bodies (24, 124, 224, 324, 424, 2210, 2310, 2410, 2510, 2601) show combinations of exemplary shaped chip openings (16, 116, 216, 316, 416, 516, 616, 716, 816, 916, 1016, 1116, 1216, 2738, 2838) and exemplary shaped slits (20, 120, 220, 320, 420, 1320, 1420, 1520, 1620, 1720, 1820, 1920, 2020, 2120, 2524, 2734, 2834) in one or more of exemplary metal layers (12, 112, 212, 312, 412, 2222, 2330, 2420, 2516, 2610, 2618), these metal layers (12, 112, 212, 312, 412, 2222, 2330, 2420, 2516, 2610, 2618) are configured to be assembled with additional layers for production. By way of further example to such layered arrangements (2212, 2312, 2412, 2601') discussed above, another example of a metal transaction card body (2901) is shown in FIGS. 62-65B as portions of exemplary metal transaction cards (2900, 3000, 3001, 3002) with a sixth layered arrangement (2901'). Metal transaction card body (2901) is shown with metal layers (2910, 2918), although one or more aspects of metal layers, such as metal layers (12, 112, 212, 312, 412, 2222, 2330, 2420, 2516, 2610, 2618) discussed above, may be incorporated into metal transaction card body (2901). Similarly, any shaped chip opening, such as shaped chip openings (16, 116, 216, 316, 416, 516, 616, 716, 816, 916, 1016, 1116, 1216, 2738, 2838), and shaped slits, such as shaped slits (20, 120, 220, 320, 420, 1320, 1420, 1520, 1620, 1720, 1820, 1920, 2020, 2120, 2734, 2834), may be incorporated in any combination into metal transaction card body (2901). The invention is thus not intended to be unnecessarily limited to layered arrangement.

Figure 62:
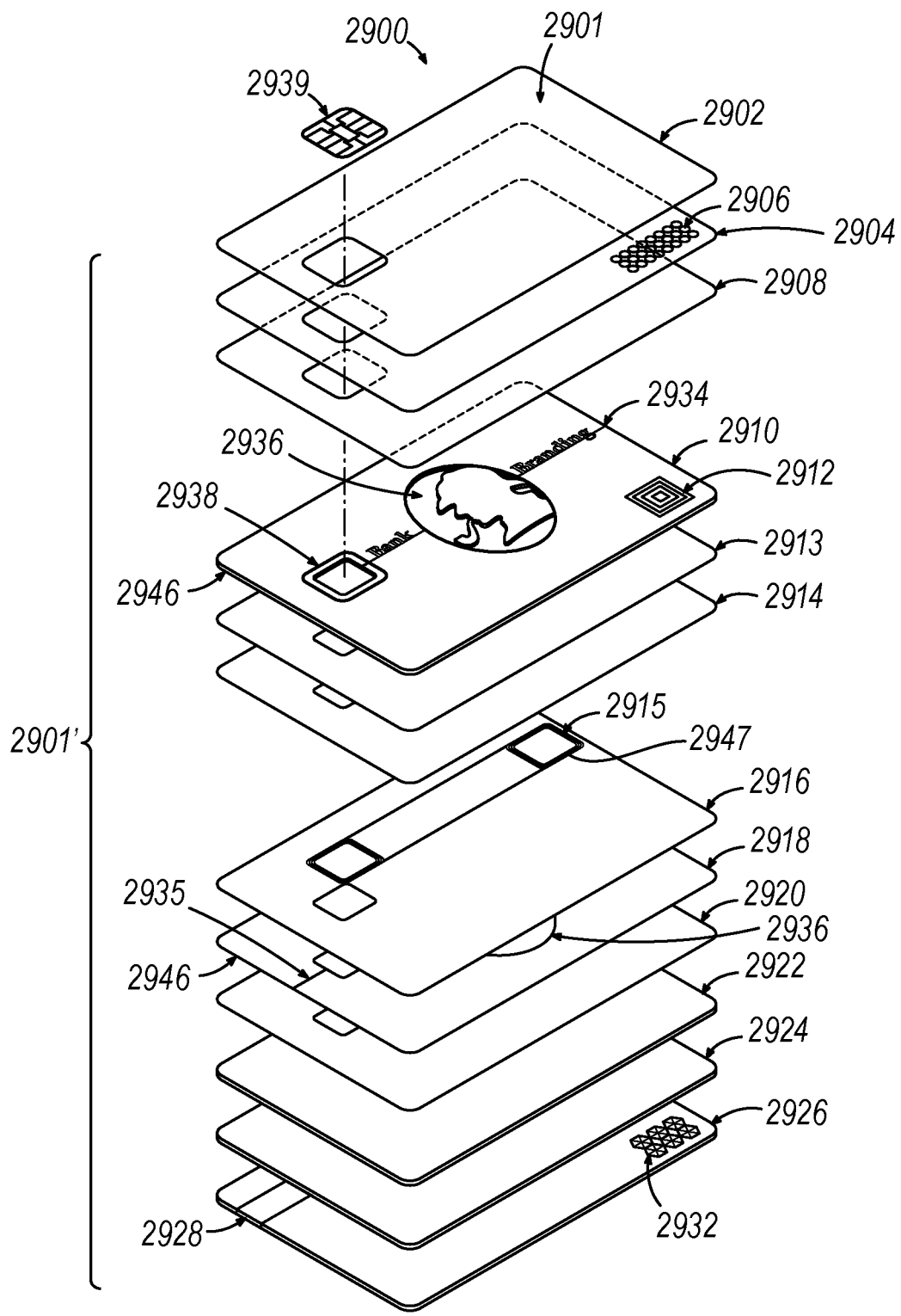
FIG. 62 depicts a disassembled front perspective view of another exemplary metal transaction card having a sixth exemplary layered arrangement of layers, a sixteenth exemplary shaped opening, an eighteenth exemplary shaped slit, and a nineteenth exemplary shaped slit.

As a preliminary matter, metal transaction cards (2900, 3000, 3001, 3002) have sixth exemplary layered arrangement (2901') of metal transaction card body (2901). Metal transaction card body (2901) of the present example includes the following layers, from top to bottom, which may also be respectively referred to herein as front to rear, in a stack-up as shown in FIG. 62: a post lamination varnish (PLV) (2902), a protective coating (2904) having a laser etching (2906) thereon, a front design layer (2908), a flexible metal layer (2910) having a mechanical engraving (2912) thereon, an adhesive layer (2913), an inter design layer (2914), an antenna circuit layer (2915), a dielectric layer (2916), a supporting metal layer (2918), an adhesive layer (2920), a clear PVC layer (2922), a rear design layer (2924), a clear PVC layer (2926), and a magnetic stripe (2928). In addition, clear PVC layer (2926) has a personalization, such as a laser etching, positioned thereon, whereas magnetic stripe (2928) has a security element (2932) hot stamped into position thereon. In the present example, such stack-up has pre-lamination depth~32.6 mils (828 µm). By way of further example, shaped chip opening (not shown), other openings, and metal artwork may be formed by a chemical etching process, laser cutting, waterjet cutting or punching. Also in the present example, a sixteenth example of a chip opening (2938) is configured to receive a transponder chip module (2939) such that chip opening (2938) is the same shape as an module antenna (not shown) for improved performance relative to dissimilar shapes between chip opening (2938) and module antenna (not shown). Also, as shown in the present example, an eighteenth example of a shaped slit (2934) is formed in flexible metal layer (2910), and a nineteenth example of a shaped slit (2935) is formed in supporting metal layer (2918). The following will address examples of each of layers (2902, 2904, 2908, 2910, 2913, 2914, 2915, 2916, 2918, 2920, 2922, 2924, 2926, 2928) and other aspects of metal transaction card (2900) in turn as the stack-up from top to bottom of metal transaction card (2900).

Post lamination varnish (2902) includes a first ink layer with raised alphanumeric characters disposed on protective coating (2904).

Protective coating (2904) includes a laser reactive coating, which may include a lacquer, a varnish, or an ink disposed a second ink layer of front design layer (2908). Such lacquer, a varnish, or an ink may represent cardholder user data, an issue bank logo, a payment scheme logo and include adhesion promotor and/or primer. Protective coating (2904) as shown in FIG. 62 also has laser etching (2906) thereon. Laser etching (2906) represents a personalization applied to protective coating (2904), such as to scribe cardholder data.

Front design layer (2608) includes colored ink to have the second ink layer disposed on adhesion promoter and/or primer or vice versa. Such colored ink may be divided into a plurality of ink layers separated by clear ink layers Flexible metal layer (2910) is a first, front face layer of edge to edge metal with shaped chip opening (2938), shaped slit (1934), a center opening (2936), metal artwork, alpha numeric text, and/or graphic elements. To this end, flexible metal layer (2910) of the present example has mechanical engraving (2912) produce a debossed logo of a payment scheme thereon.

Adhesive layer (2913) includes a thermosetting epoxy disposed below flexible metal layer (2910) with a cutout portion of center opening (2936).

Inter design layer (2614) includes a third ink layer, with or without primer, which is disposed on an adhesive side of adhesive layer (2913) or on a synthetic layer with an adhesive backing (e.g., polyvinyl acetate (PVA) WA) representing an intermediate design layer visible through center opening (2936).

Antenna circuit layer (2915) includes a flexible circuit having a sense coil or patch antenna to receive surface currents around at least one of slits (2934, 2935) and center opening (2936). In addition, antenna circuit layer (2915)

also includes a coupling coil to drive transponder chip module (2939) via inductive coupling.

Dielectric layer (2916) has thermosetting epoxy adhesive on both sides, also referred to herein as double-sided, of a carrier (e.g., PET or PEN) disposed between a rear surface of flexible metal layer (2910) and a front surface of supporting metal layer (2918). Dielectric layer (2916) is configured to be an electrical insulation between flexible metal layer (2610) and supporting metal layer (2618).

Supporting metal layer (2618) also includes shaped chip opening (2939) and shaped slit (2935) disposed below dielectric layer (2916) and is configured to provide structural reinforcement to flexible metal layer (2910) for improved structural integrity. Supporting metal layer (2910) also includes another cutout portion of center opening (2936).

Adhesive layer (2920) includes thermosetting epoxy disposed below supporting metal layer (2918).

Clear PVC layer (2922) includes a synthetic layer disposed below adhesive layer (2920).

Rear design layer (2924) includes a fourth ink layer with or without primer disposed on clear PVC layer (2622).

Clear PVC layer (2926) with magnetic stripe (2928) have hot stamped security elements (2932), such as the signature panel and the hologram, disposed below rear design layer (2924). Clear PVC layer (2926) is laser reactive so as to be laser engravable as an overlay, such as for additional personalization.

While the above stack-up of from top to bottom of metal transaction card (2900) provides one example of metal transaction card (2900), it will be appreciated that these features, dimensions, and weights may vary such that the invention is not intended to be unnecessarily limited to the above stack-up of metal transaction card (2900), such as incorporated with any of the following metal transaction cards (3000, 3100, 3200). For example, a cutout portion of center opening (2936) in flexible metal layer (2910) with slit (2934) and another cutout portion of center opening (2936) in supporting metal layer (2918) with slit (2935) may be dimensionally different. Alternatively, in the absence of a cutout portion of center opening (2936) in supporting metal layer (2918), a ferrite layer would be positioned on top of supporting metal layer (2918) to offset the effects electromagnetic shielding caused by metal layers (2910, 2918).

The above layered arrangement (2901') defines a stack-up construction of metal transaction card (2900), such as a metal face transaction card (2900), with a laser engravable protective coating on the outer surface to scratch protect a front face metal layer (2910) with chip opening (2938) for transponder chip module (2939), shaped slit (2910, 2918), alphanumeric text, script, and/or graphic elements, center opening (2936), metal artwork and additional graphic elements and mechanical engraving of one or more surfaces of metal layers (2910, 2918). A Center of Technology, which may also be referred to as a "CoT," is at a center portion of metal transaction card body (2901). The CoT in the present example operates RFID communications from the center portion of a metal transaction card body, such as metal transaction card body (2901). The CoT may be in contrast to slit technology, which operates from a chip opening. This Center of Technology (CoT) is enabled in the present example by antenna circuit layer (2915) disposed under center opening (2936) in metal transaction card body (2901), with antenna circuit layer (2915) driving, directly or inductively, transponder chip module (2939).

In use, loops of electrical current, referred to as eddy currents, induced within metal layer (2910, 2918) by the changing of electromagnetic field generated by the contactless point of sale (POS) terminal and thus attenuate the electromagnetic field. By way of further example, this flow of eddy currents can be manipulated via slit (2934, 2935) in the edge to metal layer (2910, 2918) extending from chip opening (2938) to center opening (2936), which in the present examples has metal artwork, with slit (2934, 2935) extending to an outer periphery (2946). A metal edge, which may also be referred to as a ledge, of center opening (2936) operatively couples with the underlying antenna circuit (2947) to receive surface currents to inductively drive transponder chip module (2939) or directly power an RFID chip module without a module antenna (not shown). Antenna circuit (2947) may not be visible from the front face of metal transaction card body (2901), but may hidden under a layer of synthetic material with a printed design, such as front design layer (2908), which aesthetically blends in with and camouflages center opening (2936) in the front face of metal layer (2910).

Figure 63A:
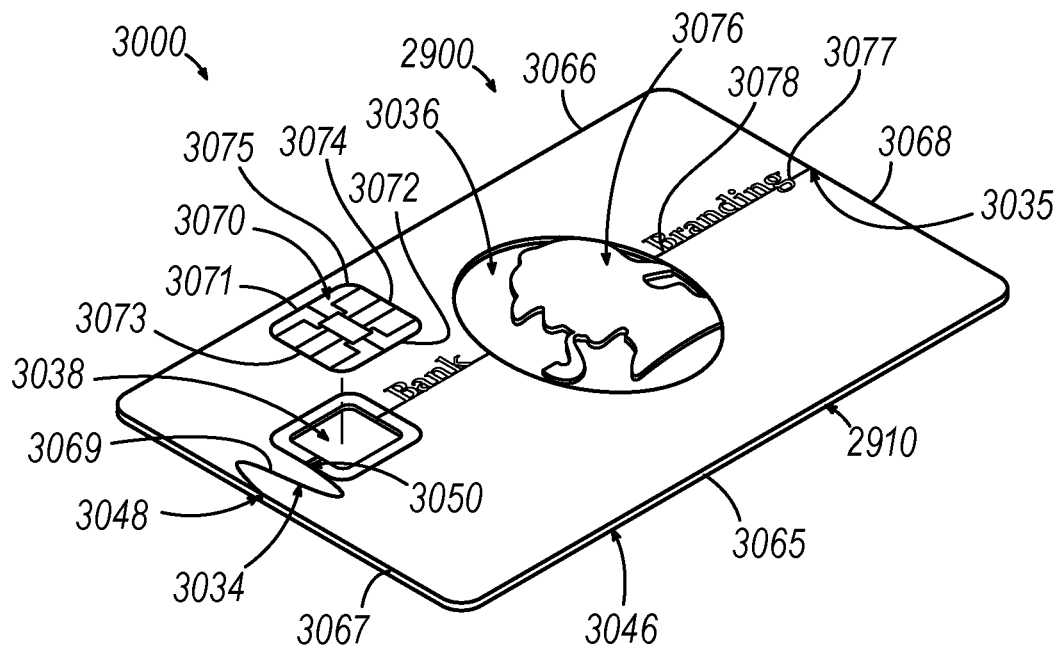
FIG. 63A depicts a front perspective view of another exemplary metal transaction card having the sixth layered arrangement of layers, a seventeenth exemplary shaped opening, a first exemplary arrangement of laterally opposed twentieth and twenty-first exemplary slits, and an exemplary center opening.
Figure 63B:
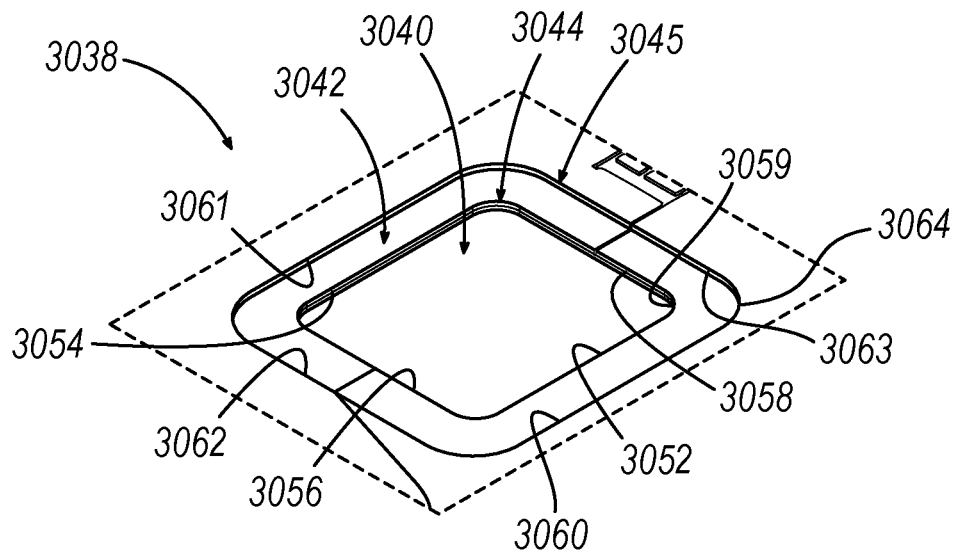
FIG. 63B depicts a magnified front perspective view of a portion of the metal transaction card of FIG. 63A having the seventeenth shaped opening.

Notably, in order to enhance structural integrity of the present example of layered arrangement (2901'), as well as one or more other examples herein, slit (2934, 2935) is not positioned at a left side of metal transaction card body (2900), which is the ATM insertion side of metal transaction card body (2901), but rather commences at chip opening (2938) and extends to a right side of metal transaction card body (2900). Also as a result of the present example of layered arrangement (2901'), during interrogation from a contactless point of sale (POS) terminal, magnetic flux lines initiate and come from a center of metal transaction card body (2901). In this respect the magnetic flux lines of the present example do not initiate and come from transponder chip module (2939), which is the direction from which other metal transaction cards with RFID slit technology travel during contactless communication.

i. Metal Transaction Card with a First Arrangement of Laterally Opposing Slits and an Antenna Circuit FIGS. 63A and 63B show a metal transaction card (3000) with layered arrangement (2901') of edge to edge metal transaction card body (2900) discussed above as well as a twentieth example of a shaped slit (3034), a twenty-first example of a shaped slit (3035), and a center opening (3036). To this end, like numbers below indicate like feature discussed above in greater detail. Metal transaction card body (2900) further includes a seventeenth example of a chip opening (3038) including a generally rectangular, lower shaped chip hole (3040) and a generally rectangular, upper shaped chip hole (3042) being formed around lower shaped chip hole (3040). In the present example, lower shaped chip hole (3040) has the generally rectangular shape defined by a lower edge (3044), and upper shaped chip hole (3042) has the generally rectangular shape defined by an upper edge (3045). Shaped slit (3034) extends leftward from upper edge (3045) to an outer periphery (3046) between an origin (3048) and a terminus (3045). In contrast, shaped slit (3035) extends rightward from center opening (3036) to outer periphery (3046) such that no portion of shaped slit (3035) extends completely from center opening (3036) to chip opening (3038). In one example, shaped slits (3034, 3035) are in metal layer (2910) (see FIG. 62). In another example, shaped slits (3034, 3035) are in metal layer (2918) (see FIG. 62). In yet another example, shaped slit (3034) is in metal layer (2918) (see FIG. 62), and shaped slit (3035) is in metal layer (2910) (see FIG. 62). In still yet another example, shaped slit (3035) is in metal layer (2918) (see FIG. 62), and shaped slit (3034) is in metal layer (2910) (see FIG. 62).

With respect to chip opening (3038), lower shaped chip hole (3040) has lower edge (3044) more particularly including bottom and top lower edges (3052, 3054), left and right lateral lower edges (3056, 3058), and rounded corners (3059). Each of lower edges (3052, 3054, 3056, 3058) of the present example is generally linear such that lower shaped chip hole (3040) is generally rectangular in shape. Upper shaped chip hole (3042) has upper edge (3045) more particularly including bottom and top upper edges (3060, 3061), left and right lateral upper edges (3062, 3063), and rounded corners (3064). Each of upper edges (3060, 3061, 3062, 3063) of the present example is generally linear such that upper shaped chip hole (3044) is generally rectangular in shape.

Metal transaction body (2901) of metal transaction card (3000) of the present example has long bottom and top body edges (3065, 3066) and short left and right lateral body edges (3067, 3068). From origin (3048) in left lateral body edge (3067), shaped slit (3024) extends rightward to terminus (3050) in left lateral upper edge (3062). Shaped slit (3024) has an oscillation channel (3069), which has a sinusoidal shape in the present example and extends such that origin (3048) and terminus (3050) are aligned along a horizontal axis extending parallel between long bottom and top body edges (3065, 3066).

Chip opening (3038) of the present example is configured to receive a transponder chip module (3070) such that chip opening (3038) is the same shape as an module antenna (not shown) for improved performance relative to dissimilar shapes between chip opening (3038) and module antenna (not shown). Transponder chip module (3070) is shown having top and bottom chip edges (3071, 3072) and left and right lateral chip edges (3073, 3074) as well as rounded corners (3075) shaped to complement upper edge (3045) of chip opening (3038). Thus, each of chip edges (3071, 3072, 3073, 3074) is linear in the present example.

Metal transaction card (3000) further includes a graphic (3076), such as alphanumeric characters, script or graphic elements representing a name or logo, in a central portion thereof and proximate to center opening (3036). Shaped slit (3035) includes, successively intersecting from right to left, a linear channel (3035) and a non-linear graphic portion channel (3078) extending from right lateral body edge (3068) to center opening (3036). Non-linear graphic portion channel (3078) thus traces along graphic (3076) defining a path to center opening (3036) incorporating metal artwork design features and further extending to additional alphanumeric characters, script or graphic elements. As such, shaped slit (3035) forms an integral portion of graphic (3076) and does not extend to chip opening (3038).

Figure 64A:
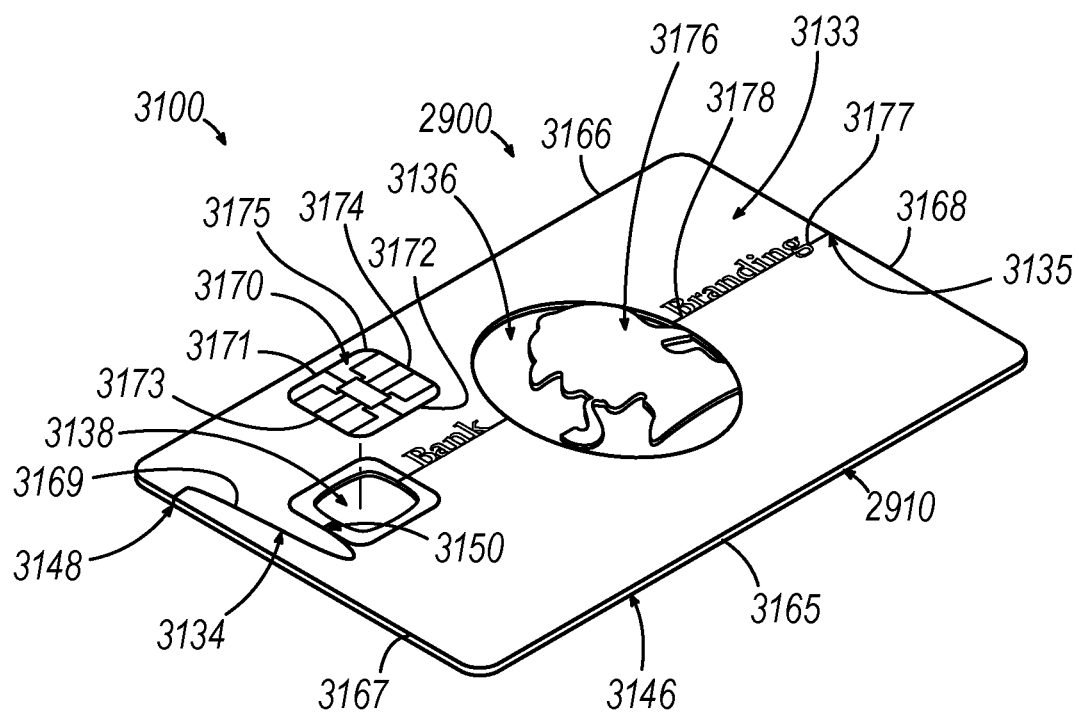
FIG. 64A depicts a front perspective view of another exemplary metal transaction card having the sixth layered arrangement of layers, an eighteenth exemplary shaped opening, a second exemplary arrangement of laterally opposed twenty-second and twenty-third exemplary slits, and an exemplary center opening.
Figure 64B:
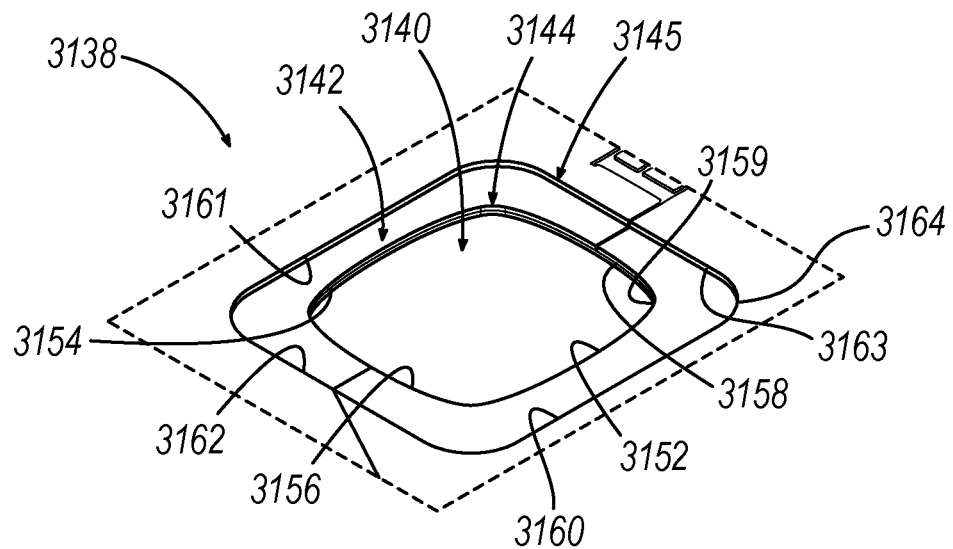
FIG. 64B depicts a magnified front perspective view of a portion of the metal transaction card of FIG. 64A having the eighteenth shaped opening.

While chip opening (3036) with the particular lower and upper shaped chip holes (3040, 3042) in conjunction with the particular shaped slits (3034, 3035) are shown in the present example of FIGS. 63A and 63B, alternative arrangements and shapes for receiving a transponder chip module relative to a slit for inductive coupling may be similarly integrated into an alternative metal transaction card such that the invention is not intended to be unnecessarily limited to the particular chip opening (3038) and shaped slits (3034, 3035) shown and described herein. Also, in one or more examples, an alternative upper shaped chip hole may be shaped as lower shaped chip hole (3040) such that any description provided herein with respect to lower edge (3044) may be incorporated in whole or in part into an alternative upper shaped chip hole or vice versa.

ii. Metal Transaction Card with a Second Arrangement of Laterally Opposing Slits and an Antenna Circuit FIGS. 64A and 64B show a metal transaction card (3100) with layered arrangement (2901') of edge to edge metal transaction card body (2900) discussed above also having a front synthetic layer (3133) as well as a twenty-second example of a shaped slit (3134), a twenty-third example of a shaped slit (3135), and a center opening (3136). To this end, like numbers below indicate like feature discussed above in greater detail. Metal transaction card body (2900) further includes an eighteenth example of a chip opening (3138) including a non-rectangular, lower shaped chip hole (3140) and a generally rectangular, upper shaped chip hole (3142) being formed around lower shaped chip hole (3140). In the present example, lower shaped chip hole (3140) has the non-rectangular shape defined by a lower edge (3144), and upper shaped chip hole (3142) has the generally rectangular shape defined by an upper edge (3145). Shaped slit (3134) extends leftward from upper edge (3145) to an outer periphery (3146) between an origin (3148) and a terminus (3145). In contrast, shaped slit (3135) extends rightward from center opening (3136) to outer periphery (3146) such that no portion of shaped slit (3135) extends completely from center opening (3136) to chip opening (3138). In one example, shaped slits (3134, 3135) are in metal layer (2910) (see FIG. 62). In another example, shaped slits (3134, 3135) are in metal layer (2918) (see FIG. 62). In yet another example, shaped slit (3134) is in metal layer (2918) (see FIG. 62), and shaped slit (3135) is in metal layer (2910) (see FIG. 62). In still yet another example, shaped slit (3135) is in metal layer (2918) (see FIG. 62), and shaped slit (3134) is in metal layer (2910) (see FIG. 62).

With respect to chip opening (3138), lower shaped chip hole (3140) has lower edge (3144) more particularly including bottom and top lower edges (3152, 3154), left and right lateral lower edges (3156, 3158), and rounded corners (3159). Each of lower edges (3152, 3154, 3156, 3158) of the present example is generally arcuate with concave inner surfaces such that lower shaped chip hole (3140) is generally non-rectangular in shape. Upper shaped chip hole (3142) has upper edge (3145) more particularly including bottom and top upper edges (3160, 3161), left and right lateral upper edges (3162, 3163), and rounded corners (3164). Each of upper edges (3160, 3161, 3162, 3163) of the present example is generally linear such that upper shaped chip hole (3144) is generally rectangular in shape.

Metal transaction body (2901) of metal transaction card (3100) of the present example has long bottom and top body edges (3165, 3166) and short left and right lateral body edges (3167, 3168). From origin (3148) in left lateral body edge (3167), shaped slit (3124) extends rightward to terminus (3150) in left lateral upper edge (3162). Shaped slit (3124) has an oscillation channel (3169), which has a sinusoidal shape in the present example and extends such that origin (3148) is closer to top body edge (3166) than terminus (3150).

Chip opening (3138) of the present example is configured to receive a transponder chip module (3170) such that chip opening (3138) is the same shape as an module antenna (not shown) for improved performance relative to dissimilar shapes between chip opening (3138) and module antenna (not shown). Transponder chip module (3170) is shown having top and bottom chip edges (3171, 3172) and left and right lateral chip edges (3173, 3174) as well as rounded corners (3175) shaped to complement upper edge (3145) of chip opening (3138) whereas a bottom portion of transponder chip module (3170) is shaped to complement lower edge (3144). Each of chip edges (3171, 3172, 3173, 3174) is linear in the present example.

Metal transaction card (3100) further includes a graphic (3176), such as alphanumeric characters, script or graphic elements representing a name or logo, in a central portion thereof and proximate to center opening (3136). Shaped slit (3135) includes, successively intersecting from right to left, a linear channel (3135) and a non-linear graphic portion channel (3178) extending from right lateral body edge (3168) to center opening (3136). Non-linear graphic portion channel (3178) thus traces along graphic (3176) defining a path to center opening (3136) incorporating metal artwork design features and further extending to additional alphanumeric characters, script or graphic elements. As such, shaped slit (3135) forms an integral portion of graphic (3176) and does not extend to chip opening (3138).

Figure 65A:
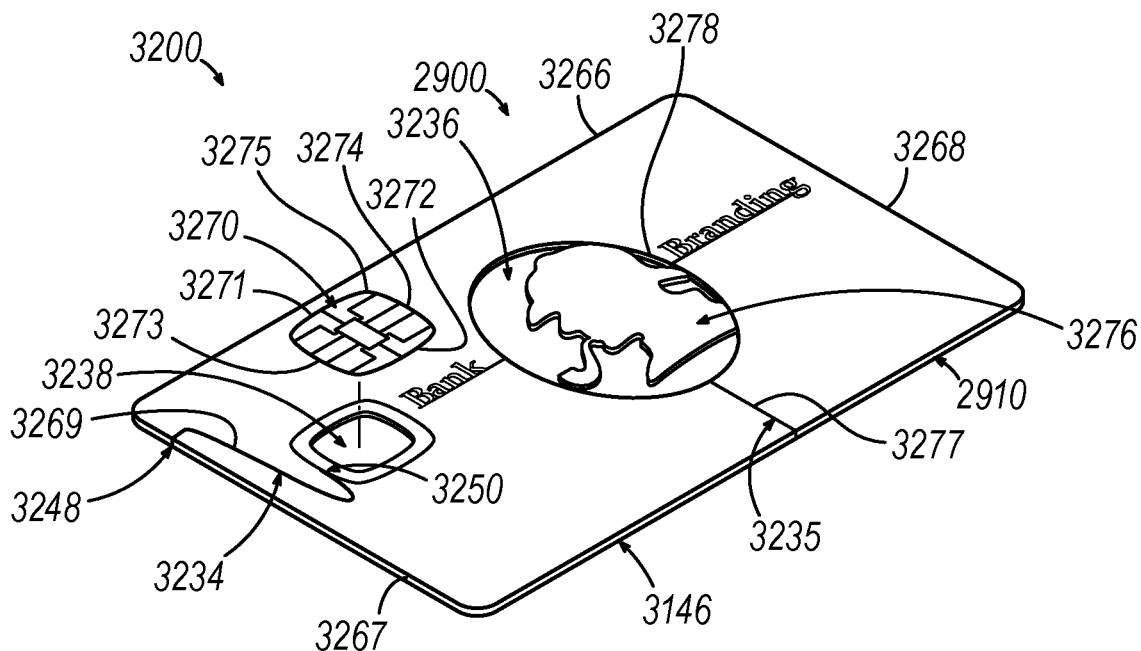
FIG. 65A depicts a front perspective view of another exemplary metal transaction card having the sixth layered arrangement of layers, a nineteenth exemplary shaped opening, a third exemplary arrangement of laterally opposed twenty-fourth and twenty-fifth exemplary slits, and an exemplary center opening.
Figure 65B:
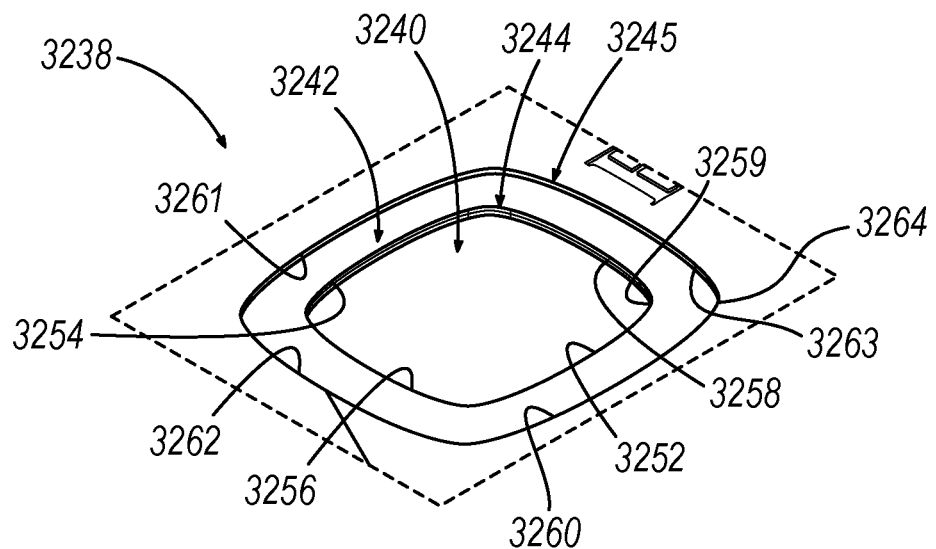
FIG. 65B depicts a magnified front perspective view of a portion of the metal transaction card of FIG. 65A having the nineteenth shaped opening.

While chip opening (3136) with the particular lower and upper shaped chip holes (3140, 3142) in conjunction with the particular shaped slits (3134, 3135) are shown in the present example of FIGS. 64A and 64B, alternative arrangements and shapes for receiving a transponder chip module relative to a slit for inductive coupling may be similarly integrated into an alternative metal transaction card such that the invention is not intended to be unnecessarily limited to the particular chip opening (3138) and shaped slits (3134, 3135) shown and described herein. Synthetic layer (3133) discussed briefly above may be a plastic layer, such as PVC, PC, or PETC, while a core layer is edge to edge metal. Also, in one or more examples, an alternative upper shaped chip hole may be shaped as lower shaped chip hole (3140) such that any description provided herein with respect to lower edge (3144) may be incorporated in whole or in part into an alternative upper shaped chip hole or vice versa.

iii. Metal Transaction Card with a Third Arrangement of Laterally Opposing Slits and an Antenna Circuit FIGS. 65A and 65B shows a metal transaction card (3200) with layered arrangement (2901') of edge to edge metal transaction card body (2900) discussed above as well as a twenty-fourth example of a shaped slit (3234), a twenty-fifth example of a shaped slit (3235), and a center opening (3236). To this end, like numbers below indicate like feature discussed above in greater detail. Metal transaction card body (2900) further includes a nineteenth example of a chip opening (3238) including a non-rectangular, lower shaped chip hole (3140) and a non-rectangular, upper shaped chip hole (3242) being formed around lower shaped chip hole (3240). In the present example, lower shaped chip hole (3240) has the non-rectangular shape defined by a lower edge (3244), and upper shaped chip hole (3242) has the non-rectangular shape defined by an upper edge (3245). In the present example, the non-rectangular shapes of lower and upper edges (3240, 3242) are the same, albeit different sizes. Shaped slit (3234) extends leftward from upper edge (3245) to an outer periphery (3246) between an origin (3248) and a terminus (3245). In contrast, shaped slit (3235) extends vertically downward from center opening (3236) to outer periphery (3246) such that no portion of shaped slit (3235) extends completely from center opening (3236) to chip opening (3238). In one example, shaped slits (3234, 3235) are in metal layer (2910) (see FIG. 62). In another example, shaped slits (3234, 3235) are in metal layer (2918) (see FIG. 62). In yet another example, shaped slit (3234) is in metal layer (2918) (see FIG. 62), and shaped slit (3235) is in metal layer (2910) (see FIG. 62). In still yet another example, shaped slit (3235) is in metal layer (2918) (see FIG. 62), and shaped slit (3234) is in metal layer (2910) (see FIG. 62).

With respect to chip opening (3238), lower shaped chip hole (3240) has lower edge (3244) more particularly including bottom and top lower edges (3252, 3254), left and right lateral lower edges (3256, 3258), and rounded corners (3259). Each of lower edges (3252, 3254, 3256, 3258) of the present example is generally arcuate with concave inner surfaces such that lower shaped chip hole (3240) is generally non-rectangular in shape. Upper shaped chip hole (3242) has upper edge (3245) more particularly including bottom and top upper edges (3260, 3261), left and right lateral upper edges (3262, 3263), and rounded corners (3264). Each of upper edges (3260, 3261, 3262, 3263) of the present example is generally arcuate with concave inner surfaces such that upper shaped chip hole (3242) is generally non-rectangular in shape.

Metal transaction body (2901) of metal transaction card (3200) of the present example has long bottom and top body edges (3265, 3266) and short left and right lateral body edges (3267, 3268). From origin (3248) in left lateral body edge (3267), shaped slit (3224) extends rightward to terminus (3250) in left lateral upper edge (3262). Shaped slit (3224) has an oscillation channel (3269), which has a sinusoidal shape in the present example and extends such that origin (3248) is closer to top body edge (3266) than terminus (3250).

Chip opening (3238) of the present example is configured to receive a transponder chip module (3270) such that chip opening (3238) is the same shape as an module antenna (not shown) for improved performance relative to dissimilar shapes between chip opening (3238) and module antenna (not shown). Transponder chip module (3270) is shown having top and bottom chip edges (3271, 3272) and left and right lateral chip edges (3273, 3274) as well as rounded corners (3275) shaped to complement upper edge (3245) of chip opening (3238) whereas a bottom portion of transponder chip module (3270) is shaped to complement lower edge (3244). Each of chip edges (3171, 3172, 3173, 3174) is arcuate in the present example such that transponder chip module (3270) is non-rectangular.

Metal transaction card (3200) further includes a graphic (3276), such as alphanumeric characters, script or graphic elements representing a name or logo, in a central portion thereof and proximate to center opening (3236). Shaped slit (3235) includes, successively intersecting from bottom toward center, a linear channel (3235) and a non-linear graphic portion channel (3278) extending vertically upward from bottom body edge (3265) to center opening (3236). Non-linear graphic portion channel (3278) thus traces along graphic (3276) defining a path to center opening (3236) incorporating metal artwork design features and further extending to additional alphanumeric characters, script or graphic elements. As such, shaped slit (3235) forms an integral portion of graphic (3276) and does not extend to chip opening (3238).

While chip opening (3236) with the particular lower and upper shaped chip holes (3240, 3242) in conjunction with the particular shaped slits (3234, 3235) are shown in the present example of FIGS. 65A and 65B, alternative arrangements and shapes for receiving a transponder chip module relative to a slit for inductive coupling may be similarly integrated into an alternative metal transaction card such that the invention is not intended to be unnecessarily limited to the particular chip opening (3238) and shaped slits (3234, 3235) shown and described herein. Also, in one or more examples, an alternative upper shaped chip hole may be shaped as lower shaped chip hole (3240) such that any description provided herein with respect to lower edge (3244) may be incorporated in whole or in part into an alternative upper shaped chip hole or vice versa.

III. Shaped Chip Openings for Transponder Chip Modules and Improved Inductive Coupling As already discussed above in some detail, a variety of features associated with shaped slits, such as shaped slits (20, 120, 220, 320, 420, 1320, 1420, 1520, 1620, 1720, 1820, 1920, 2020, 2120, 2524, 2734, 2834, 2934, 2935, 3034, 3035, 3134, 3135, 3234, 3235), and shaped chip openings, such as shaped chip openings (16, 116, 216, 316, 416, 516, 616, 716, 816, 916, 1016, 1116, 1216, 2738, 2838, 2938, 3038, 3138, 3238), affect EMV payment transactions and a maximum force (Newton cm') which can be applied to a metal transaction card body, such as metal transaction card bodies (24, 124, 224, 324, 424, 2210, 2310, 2410, 2510, 2601, 2901), up to destruction of metal transaction card bodies (24, 124, 224, 324, 424, 2210, 2310, 2410, 2510, 2601, 2901). In addition to these features, another feature affecting the performance of EMV transactions includes a relationship between a geometry of shaped chip openings (16, 116, 216, 316, 416, 516, 616, 716, 816, 916, 1016, 1116, 1216, 2738, 2838, 2938, 3038, 3138, 3238) with a corresponding geometry of a module antenna of a transponder chip module, such as transponder chip modules (1258, 2334, 2336, 2780, 2880, 2939, 3070, 3170, 3270). In this context, the term "geometry" generally includes a like shape and complementary dimensions such that the geometries correspond with each other. Also, a number of turns, which may also be referred to as windings, determines both a resonance frequency of the module antenna and a dimensional foot print of the module antenna, whereas the shape and the dimensional size of a chip opening and any surrounding metal determines the effective overlap for inductive coupling with a module antenna and, in turn, further influences a system frequency of a metal transaction card, such as with respect to any above metal transaction cards (410, 510, 610, 710, 810, 910, 1010, 1110, 1210, 1310, 1410, 1510, 1610, 1710, 1810, 1910, 2010, 2110, 2214, 2314, 2414, 2514, 2600, 2700, 2800, 2900, 3000, 3100, 3200) discussed above. While a generally rectangular chip opening may be convenient in some respects, this rectangular chip opening in conjunction with surrounding metal, such as at a lower edge of lower chip hole, overlapping a module antenna may be detrimental to RF performance for less effective EMV payment transactions, if a chip opening and a transducer module chip lack complementary geometries. Notably, sharper right corners, are generally ineffective in high frequency antenna design rules, such as applicable to a module antenna, and hence a pure rectangular opening is not desirable for optimum performance.

By way of example, U.S. Pat. No. 10,762,412, entitled "DI Capacitive Embedded Metal Card," filed on Mar. 22, 2018, and incorporated by reference herein, discussion various examples of transducer chip modules, chip openings, and slits, but fails to address corresponding geometries between a module antenna of a transponder chip module for improved overlap with only limited discussion to rectangular transducer chip modules and a module antenna with vertical interconnects, which, in turn, determines a shape of antenna windings. For additional details with some relation to the discussions herein, reference is made to U.S. patent application Ser. No. 17/079,606, entitled "RFID-Enabled Transactions Cards of Metal and Plastic," filed Oct. 26, 2020, which is incorporated by reference herein.

The following examples of metal transaction cards (3310, 3410, 3510, 3610, 3710, 3810) shown in FIGS. 66-75 include variety of shaped slits (3312, 3412, 3512, 3612, 3712, 3812, 3952) as well as shaped chip openings (3314, 3414, 3514, 3614, 3714, 3814, 3920) and transducer chip modules (3318, 3418, 3518, 3618, 3718, 3818, 3910) with corresponding geometries having a proportional overlap (3334, 3434, 3534, 3634, 3734, 3834, 3968) of shape and dimensions at lower edges (3338, 3438, 3538, 3638, 3738, 3838, 3954) relative to module antennas (3316, 3416, 3516, 3616, 3716, 3816, 3912) to improve EMV payment transactions. Any one or more of these features may be incorporated into any of the previously described metal transaction cards (410, 510, 610, 710, 810, 910, 1010, 1110, 1210, 1310, 1410, 1510, 1610, 1710, 1810, 1910, 2010, 2110, 2214, 2314, 2414, 2514, 2600, 2700, 2800, 2900, 3000, 3100, 3200) such that the invention is not intended to be unnecessarily limited to the particular examples of the following metal transaction cards (3310, 3410, 3510, 3610, 3710, 3810).

A. Corresponding Shaped Chip Openings and Transducer Chip Modules

FIGS. 66-71 show various examples of metal transaction cards (3310, 3410, 3510, 3610, 3710, 3810) respectively having shaped slits (3312, 3412, 3512, 3612, 3712, 3812) and shaped chip openings (3314, 3414, 3514, 3614, 3714, 3814) with corresponding geometries to module antennas (3316 3416, 3516, 3616, 3716, 3816) of transponder chip modules (3318, 3418, 3518, 3618, 3718, 3818). For improved, and even optimized, RF performance of dual interface metal transaction cards (3310, 3410, 3510, 3610, 3710, 3810), the corresponding geometries, such as associated shapes and dimensions, between shaped chip openings (3314, 3414, 3514, 3614, 3714, 3814) and module antennas (3316 3416, 3516, 3616, 3716, 3816) are configured to reduce, and even minimize, negative mutual inductance, which deteriorate EMV payment transactions. More particularly, these corresponding geometries, including shapes and dimensions, of shaped chip openings (3314, 3414, 3514, 3614, 3714, 3814) and module antennas (3316 3416, 3516, 3616, 3716, 3816) overlap with a proportional overlap (3334, 3434, 3534, 3634, 3734, 3834, 3968) to influence the system frequency, resonance curve, Q-factor, and EMV performance as discussed below in greater detail.

Figure 66:
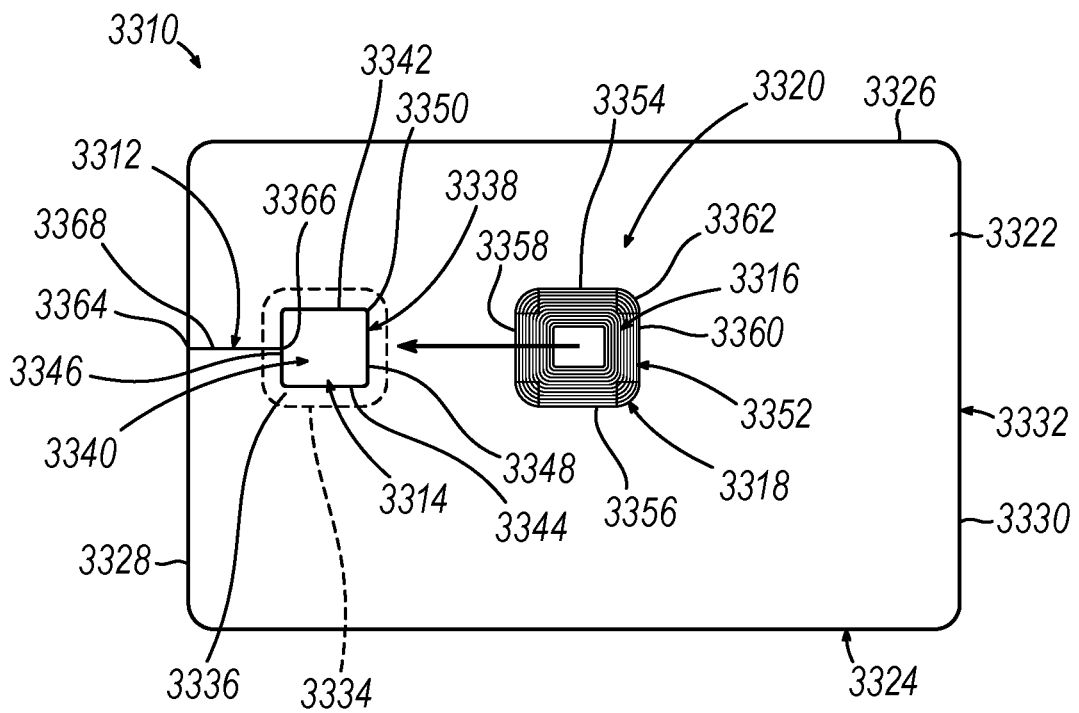
FIG. 66 depicts a front elevational view of another exemplary metal transaction card having a twentieth exemplary shaped opening, a twenty-sixth exemplary shaped slit, a first exemplary module antenna, and a first exemplary proportional overlap of the first module antenna and the twentieth shaped opening.

Each of the following metal transaction cards (3310, 3410, 3510, 3610, 3710, 3810) shows at least a portion of a metal transaction card body (3320) having a metal layer (3322), which is edge to edge of metal transaction card body (3320). Metal transaction card body (3320) has long bottom and top body edges (3324, 3326) and left and right lateral body edges (3328, 3330) collectively defining an outer periphery (3332). Shaped slits (3312, 3412, 3512, 3612, 3712, 3812) and shaped chip openings (3314, 3414, 3514, 3614, 3714, 3814) with corresponding geometries to module antennas (3316 3416, 3516, 3616, 3716, 3816) of transponder chip modules (3318, 3418, 3518, 3618, 3718, 3818) are incorporated into metal transaction card body (3320) as discussed below with respect to FIGS. 66-71. However, it will be appreciated the invention is not intended to be unnecessarily limited to metal transaction cards (3310, 3410, 3510, 3610, 3710, 3810) as shown and described herein.

i. A First Exemplary Proportional Overlap of a Module Antenna and a Chip Opening FIG. 66 shows a metal transaction card (3310) with a twenty-sixth example of a shaped slit (3312), a twentieth example of a shaped chip opening (3314), and a transponder chip module (3316) with a first exemplary module antenna (3318) incorporated into metal layer (3322). To this end, like numbers below indicate like features discussed above. Module antenna (3316) and shaped chip opening (3314) are configured to have a first exemplary proportional overlap (3334) such that the shapes and sizes of each correspond with a proportional dimensional size related to the percentage overlap of a metal shelf ledge (3336) surrounding a lower edge (3338) of shaped chip opening (3314) with module antenna (3316).

In the present example, shaped chip opening (3314) includes a lower chip hole (3340) in metal layer (3322). Once fully assembled, metal transaction card (3310) may also have an upper chip hole (not shown) to further define shaped chip opening (3314) as with other examples discussed herein. Lower chip hole (3340) includes lower edge (3338) having top and bottom lower edges (3342, 3344) and left and right lateral lower edges (3346, 3348) with a generally rectangular shape and rounded corners (3350). In the present example, lower edges (3342, 3344, 3346, 3348) are linear and correspond to module antenna (3316). To this end, module antenna (3316) of the present example has an outer antenna edge (3352) having top and bottom antenna edges (3354, 3356) and left and right lateral lower edges (3358, 3360) with a generally rectangular shape and rounded corners (3362). Antenna edges (3354, 3356, 3358, 3360) of the present example are thus linear such that antenna edges (3354, 3356, 3358, 3360) and rounded corners (3362) respectively correspond to lower edges (3342, 3344, 3346, 3348) and rounded corners (3350) in order to form the proportional overlap (3334) therebetween on metal shelf ledge (3336).

Figure 67:
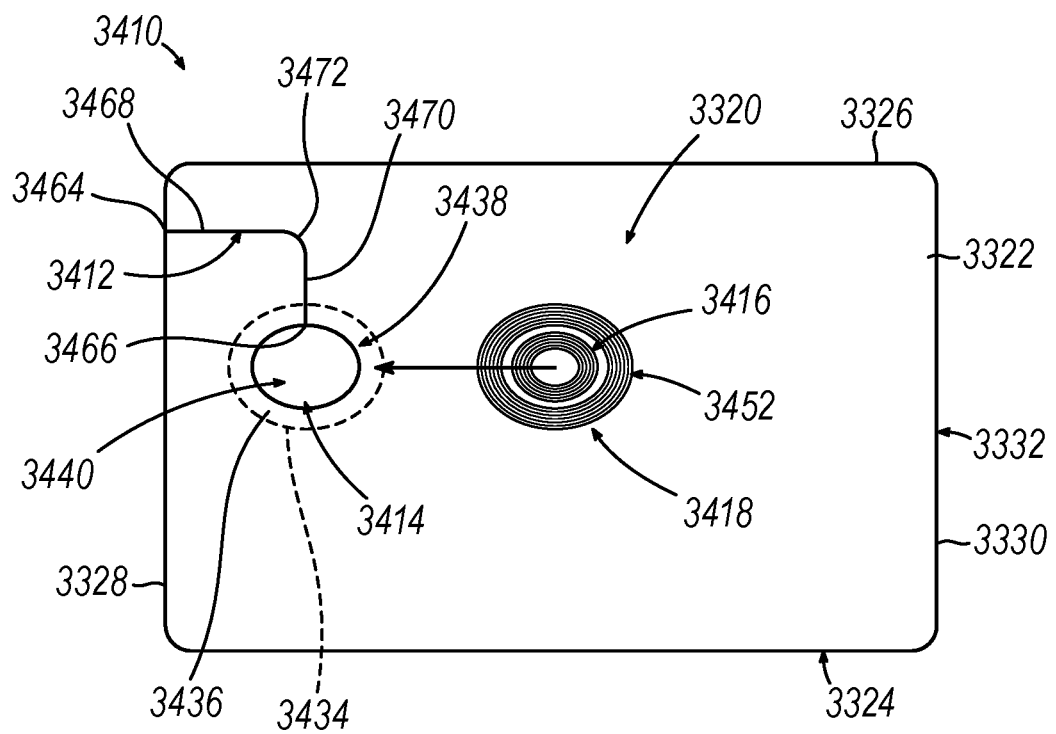
FIG. 67 depicts a front elevational view of another exemplary metal transaction card having a twenty-first exemplary shaped opening, a twenty-seventh exemplary shaped slit, a second exemplary module antenna, and a second exemplary proportional overlap of the second module antenna and the twenty-first shaped opening.

By way of example, metal transaction card (3310) has shaped slit (3312) horizontally extending from an origin (3364) in left lateral body edge (3328) to an endpoint (3366) in left lateral lower edge (3346). Shaped slit (3312) more particularly includes a linear channel (3368) horizontally extending from origin (3364) to endpoint (3366) such that origin (3364) and endpoint (3366) are on a horizontal axis parallel between bottom and top body edges (3326, 3324). In this respect, the intersection of shaped chip opening (3314) at endpoint (3366) along lower edge (3318) allows surface currents to flow from outer periphery (3332) of metal transaction card body (3320) and concentrate about lower edge (3318) during use. Proportional overlap (3334) discussed above thus improves EMV payment transactions during use.

ii. A Second Exemplary Proportional Overlap of a Module Antenna and a Chip Opening FIG. 67 shows a metal transaction card (3410) with a twenty-seventh example of a shaped slit (3412), a twenty-first example of a shaped chip opening (3414), and a transponder chip module (3416) with a second exemplary module antenna (3418) incorporated into metal layer (3322). To this end, like numbers below indicate like features discussed above. Module antenna (3416) and shaped chip opening (3414) are configured to have a second exemplary proportional overlap (3434) such that the shapes and sizes of each correspond with a proportional dimensional size related to the percentage overlap of a metal shelf ledge (3436) surrounding a lower edge (3438) of shaped chip opening (3414) with module antenna (3416).

In the present example, shaped chip opening (3414) includes a lower chip hole (3440) in metal layer (3322). Once fully assembled, metal transaction card (3410) may also have an upper chip hole (not shown) to further define shaped chip opening (3414) as with other examples discussed herein. Lower chip hole (3440) includes lower edge (3438) with an elliptical, oval shape. To this end, module antenna (3416) of the present example has an outer antenna edge (3452) with a generally elliptical, oval shape. Antenna edge (3452) of the present example is thus curved to respectively correspond to lower edge (3438) in order to form the proportional overlap (3434) therebetween on metal shelf ledge (3436).

Figure 68:
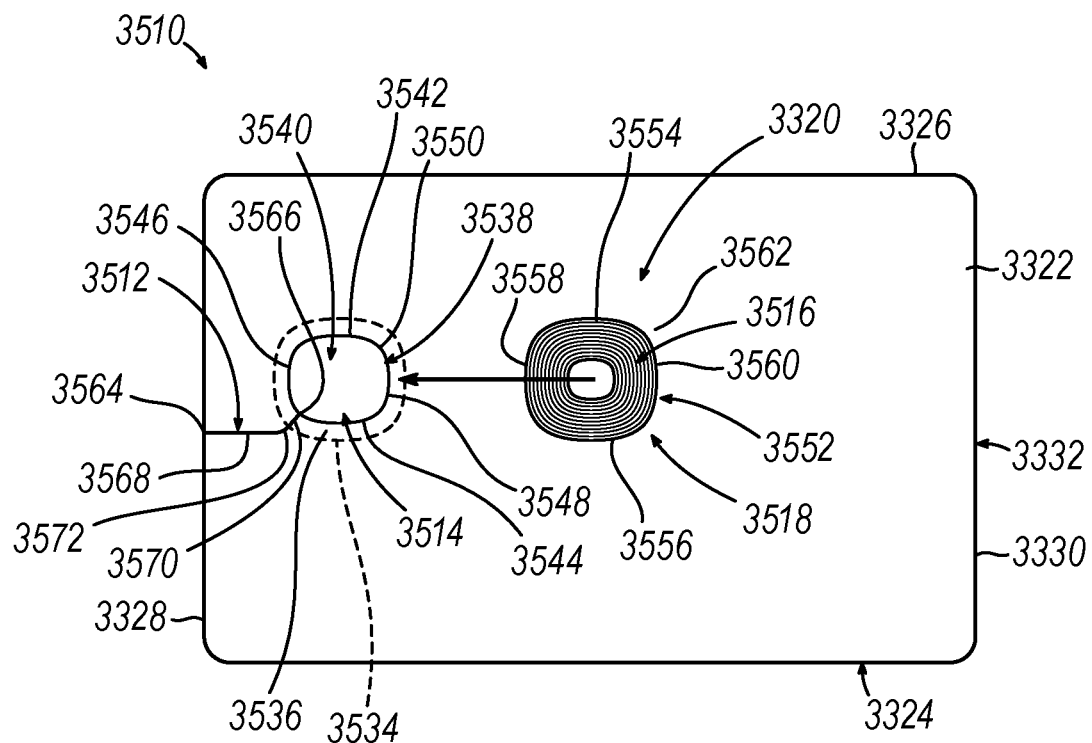
FIG. 68 depicts a front elevational view of another exemplary metal transaction card having a twenty-second exemplary shaped opening, a twenty-eighth exemplary shaped slit, a third exemplary module antenna, and a third exemplary proportional overlap of the third module antenna and the twenty-second shaped opening.

By way of example, metal transaction card (3410) has shaped slit (3412) extending from an origin (3464) in left lateral body edge (3328) to an endpoint (3466) in a top edge portion of lower edge (3438). Shaped slit (3412) more particularly includes a horizontal linear channel (3468) extending from origin (3464) and intersecting with a vertical linear channel (3470) at an arcuate channel (3472). Vertical linear channel (3470) thus extends downward from arcuate channel (3472) to top edge portion of lower edge (3438) such that endpoint (3466) is below origin (3364) and not aligned on a horizontal axis parallel between bottom and top body edges (3326, 3324). In this respect, the intersection of shaped chip opening (3414) at endpoint (3466) along lower edge (3418) allows surface currents to flow from outer periphery (3332) of metal transaction card body (3320) and concentrate about lower edge (3418) during use. Proportional overlap (3434) discussed above thus improves EMV payment transactions during use.

iii. A Third Exemplary Proportional Overlap of a Module Antenna and a Chip Opening FIG. 68 shows a metal transaction card (3510) with a twenty-eighth example of a shaped slit (3512), a twenty-second example of a shaped chip opening (3514), and a transponder chip module (3516) with a third exemplary module antenna (3518) incorporated into metal layer (3322). To this end, like numbers below indicate like features discussed above. Module antenna (3516) and shaped chip opening (3514) are configured to have a third exemplary proportional overlap (3534) such that the shapes and sizes of each correspond with a proportional dimensional size related to the percentage overlap of a metal shelf ledge (3536) surrounding a lower edge (3538) of shaped chip opening (3514) with module antenna (3516).

In the present example, shaped chip opening (3514) includes a lower chip hole (3540) in metal layer (3322). Once fully assembled, metal transaction card (3510) may also have an upper chip hole (not shown) to further define shaped chip opening (3514) as with other examples discussed herein. Lower chip hole (3540) includes lower edge (3538) having top and bottom lower edges (3542, 3544) and left and right lateral lower edges (3546, 3548) with an elliptical oblong shape and rounded corners (3550). In the present example, lower edges (3542, 3544, 3546, 3548) are arcuate and correspond to module antenna (3516). To this end, module antenna (3516) of the present example has an outer antenna edge (3552) having top and bottom antenna edges (3554, 3556) and left and right lateral lower edges (3558, 3560) with an elliptical oblong shape and rounded corners (3562). Antenna edges (3554, 3556, 3558, 3560) of the present example are thus arcuate such that antenna edges (3554, 3556, 3558, 3560) and rounded corners (3562) respectively correspond to lower edges (3542, 3544, 3546, 3548) and rounded corners (3550) in order to form the proportional overlap (3534) therebetween on metal shelf ledge (3536).

Figure 69:
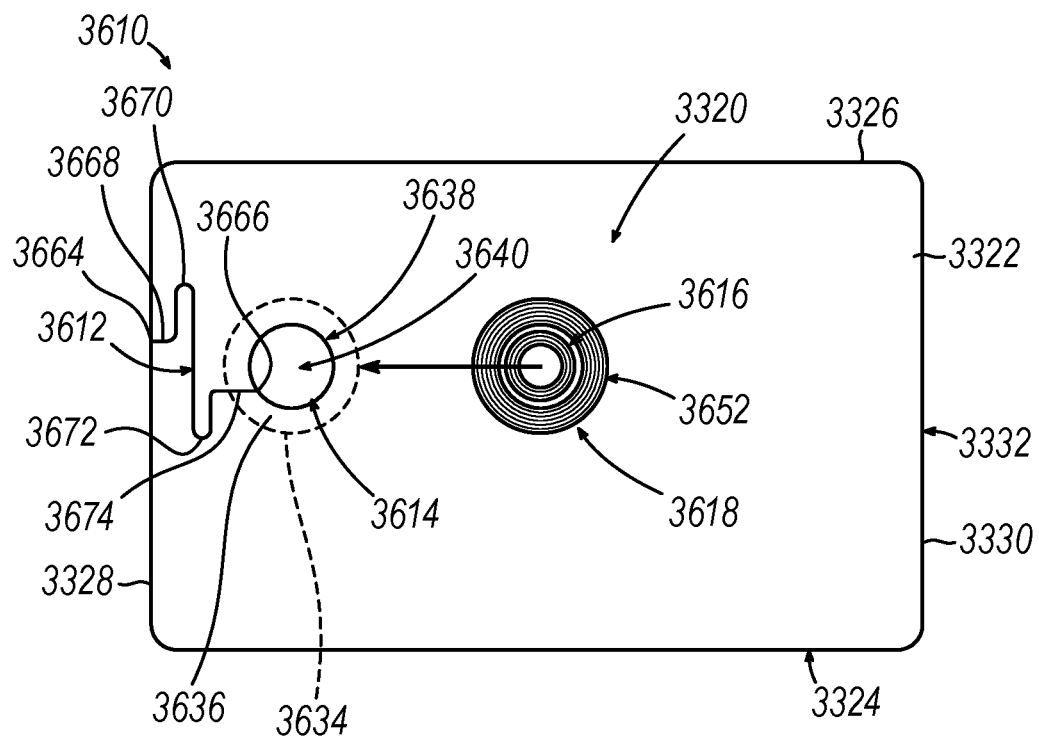
FIG. 69 depicts a front elevational view of another exemplary metal transaction card having a twenty-third exemplary shaped opening, a twenty-ninth exemplary shaped slit, a fourth exemplary module antenna, and a fourth exemplary proportional overlap of the fourth module antenna and the twenty-third shaped opening.

By way of example, metal transaction card (3510) has shaped slit (3512) extending from an origin (3564) in left lateral body edge (3528) to an endpoint (3566) in a leftward bottom rounded corner (3550). Shaped slit (3512) more particularly includes a horizontal linear channel (3568) extending from origin (3564) and intersecting an angled linear channel (3570) at an arcuate channel (3572). From arcuate channel (3572) angled linear channel (3570) extends to endpoint (3566) such that origin (3364) is below endpoint (3366) not on a horizontal axis parallel between bottom and top body edges (3326, 3324). In this respect, the intersection of shaped chip opening (3314) at endpoint (3566) along lower edge (3518) allows surface currents to flow from outer periphery (3332) of metal transaction card body (3320) and concentrate about lower edge (3518) during use. Proportional overlap (3534) discussed above thus improves EMV payment transactions during use.

iv. A Fourth Exemplary Proportional Overlap of a Module Antenna and a Chip Opening FIG. 69 shows a metal transaction card (3610) with a twenty-ninth example of a shaped slit (3612), a twenty-third example of a shaped chip opening (3614), and a transponder chip module (3616) with a fourth exemplary module antenna (3618) incorporated into metal layer (3322). To this end, like numbers below indicate like features discussed above. Module antenna (3616) and shaped chip opening (3614) are configured to have a fourth exemplary proportional overlap (3634) such that the shapes and sizes of each correspond with a proportional dimensional size related to the percentage overlap of a metal shelf ledge (3636) surrounding a lower edge (3638) of shaped chip opening (3614) with module antenna (3616).

In the present example, shaped chip opening (3614) includes a lower chip hole (3640) in metal layer (3322). Once fully assembled, metal transaction card (3610) may also have an upper chip hole (not shown) to further define shaped chip opening (3614) as with other examples discussed herein. Lower chip hole (3640) includes lower edge (3638) with round circular shape. To this end, module antenna (3616) of the present example has an outer antenna edge (3652) with a round circular shape. Antenna edge (3652) of the present example is thus curved to respectively correspond to lower edge (3638) in order to form the proportional overlap (3634) therebetween on metal shelf ledge (3636).

Figure 70:
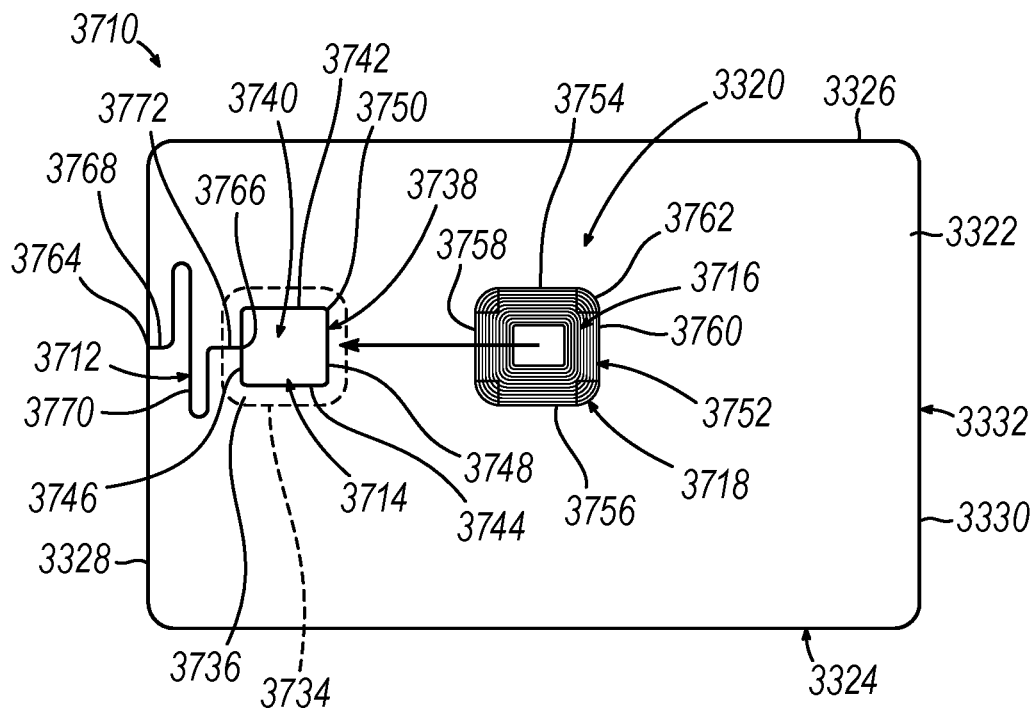
FIG. 70 depicts a front elevational view of another exemplary metal transaction card having a twenty-fourth exemplary shaped opening, a thirtieth exemplary shaped slit, a fifth exemplary module antenna, and a fifth exemplary proportional overlap of the fifth module antenna and the twenty-fourth shaped opening.

By way of example, metal transaction card (3610) has shaped slit (3612) extending from an origin (3664) in left lateral body edge (3628) to an endpoint (3666) in a bottom left portion of lower edge (3638). Shaped slit (3612) more particularly includes, intersecting from left to right, an outer linear channel (3468), a downward U-shape channel (3670), an upward U-shape channel (3672), and an inner linear channel (3674). Endpoint (3666) is below origin (3664) in the present example such that endpoint (3666) and origin (3664) are not aligned on a horizontal axis parallel between bottom and top body edges (3326, 3324). In this respect, the intersection of shaped chip opening (3614) at endpoint (3666) along lower edge (3618) allows surface currents to flow from outer periphery (3420) of metal transaction card body (3422) and concentrate about lower edge (3618) during use. Proportional overlap (3634) discussed above thus improves EMV payment transactions during use.

v. A Fifth Exemplary Proportional Overlap of a Module Antenna and a Chip Opening FIG. 70 shows a metal transaction card (3710) with a thirtieth example of a shaped slit (3712), a twenty-fourth example of a shaped chip opening (3714), and a transponder chip module (3716) with a fifth exemplary module antenna (3718) incorporated into metal layer (3322). To this end, like numbers below indicate like features discussed above. Module antenna (3716) and shaped chip opening (3714) are configured to have a fifth exemplary proportional overlap (3734) such that the shapes and sizes of each correspond with a proportional dimensional size related to the percentage overlap of a metal shelf ledge (3736) surrounding a lower edge (3738) of shaped chip opening (3714) with module antenna (3716).

In the present example, shaped chip opening (3714) includes a lower chip hole (3740) in metal layer (3322). Once fully assembled, metal transaction card (3710) may also have an upper chip hole (not shown) to further define shaped chip opening (3714) as with other examples discussed herein. Lower chip hole (3740) includes lower edge (3738) having top and bottom lower edges (3742, 3744) and left and right lateral lower edges (3746, 3748) with a generally rectangular shape and rounded corners (3750). In the present example, lower edges (3742, 3744, 3746, 3748) are linear and correspond to module antenna (3716). To this end, module antenna (3716) of the present example has an outer antenna edge (3752) having top and bottom antenna edges (3754, 3756) and left and right lateral lower edges (3758, 3760) with a generally rectangular shape and rounded corners (3762). Antenna edges (3754, 3756, 3758, 3760) of the present example are thus linear such that antenna edges (3754, 3756, 3758, 3760) and rounded corners (3762) respectively correspond to lower edges (3742, 3744, 3746, 3748) and rounded corners (3750) in order to form the proportional overlap (3734) therebetween on metal shelf ledge (3736).

Figure 71:
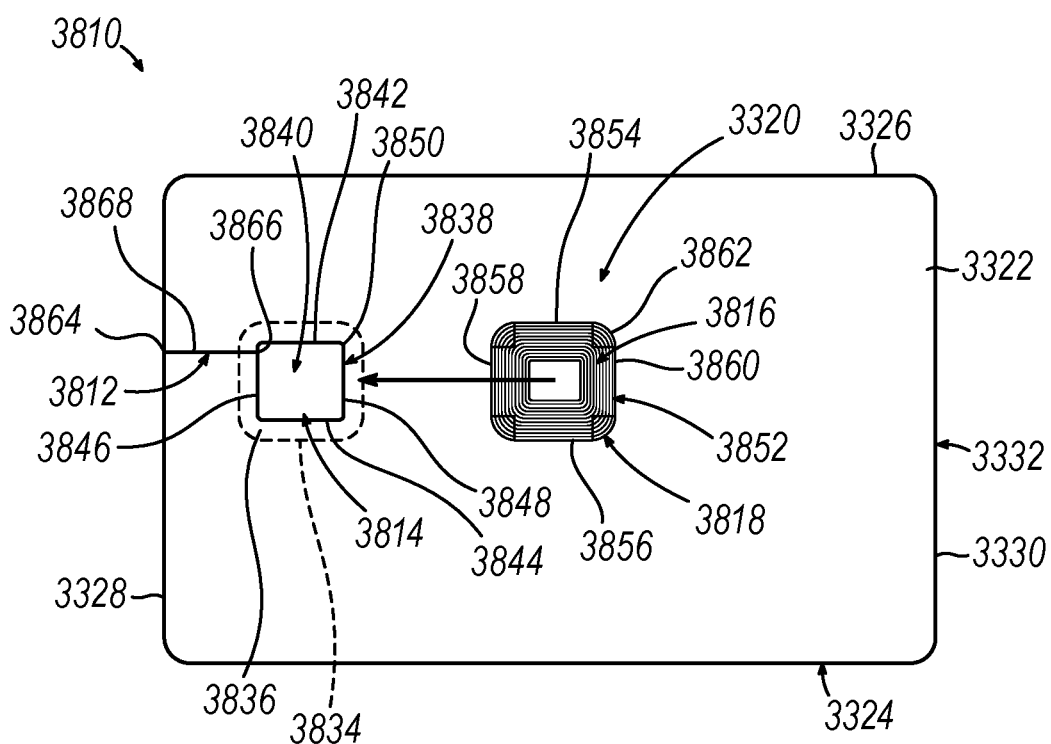
FIG. 71 depicts a front elevational view of another exemplary metal transaction card having a twenty-fifth exemplary shaped opening, a thirty-first exemplary shaped slit, a sixth exemplary module antenna, and a sixth exemplary proportional overlap of the sixth module antenna and the twenty-fifth shaped opening.

By way of example, metal transaction card (3710) has shaped slit (3712) extending from an origin (3764) in left lateral body edge (3728) to an endpoint (3766) in left lateral lower edge (3746). Shaped slit (3312) more particularly includes, intersecting from left to right, an outer linear channel (3768), a sinusoidal shaped channel (377), and an inner linear channel such that origin (3764) and endpoint (3766) are on a horizontal axis parallel between bottom and top body edges (3326, 3324). In this respect, the intersection of shaped chip opening (3714) at endpoint (3766) along lower edge (3718) allows surface currents to flow from outer periphery (3332) of metal transaction card body (3320) and concentrate about lower edge (3718) during use. Proportional overlap (3734) discussed above thus improves EMV payment transactions during use.

vi. A Sixth Exemplary Proportional Overlap of a Module Antenna and a Chip Opening FIG. 71 shows a metal transaction card (3810) with a thirty-first example of a shaped slit (3812), a twenty-fifth example of a shaped chip opening (3814), and a transponder chip module (3816) with a sixth exemplary module antenna (3818) incorporated into metal layer (3322). To this end, like numbers below indicate like features discussed above. Module antenna (3816) and shaped chip opening (3814) are configured to have a sixth exemplary proportional overlap (3834) such that the shapes and sizes of each correspond with a proportional dimensional size related to the percentage overlap of a metal shelf ledge (3836) surrounding a lower edge (3838) of shaped chip opening (3814) with module antenna (3816).

In the present example, shaped chip opening (3814) includes a lower chip hole (3840) in metal layer (3322). Once fully assembled, metal transaction card (3810) may also have an upper chip hole (not shown) to further define shaped chip opening (3814) as with other examples discussed herein. Lower chip hole (3840) includes lower edge (3838) having top and bottom lower edges (3842, 3844) and left and right lateral lower edges (3846, 3848) with a generally rectangular shape and rounded corners (3850). In the present example, lower edges (3842, 3844, 3846, 3848) are linear and correspond to module antenna (3816). To this end, module antenna (3816) of the present example has an outer antenna edge (3852) having top and bottom antenna edges (3854, 3856) and left and right lateral lower edges (3858, 3860) with a generally rectangular shape and rounded corners (3862). Antenna edges (3854, 3856, 3858, 3860) of the present example are thus linear such that antenna edges (3854, 3856, 3858, 3860) and rounded corners (3862) respectively correspond to lower edges (3842, 3844, 3846, 3848) and rounded corners (3850) in order to form the proportional overlap (3834) therebetween on metal shelf ledge (3836).

By way of example, metal transaction card (3810) has shaped slit (3812) horizontally extending from an origin (3864) in left lateral body edge (3828) to an endpoint (3866) in left lateral lower edge (3346) and/or top left rounded corner (3850). Shaped slit (3812) more particularly includes a linear channel (3868) horizontally extending from origin (3864) to endpoint (3866) such that origin (3864) and endpoint (3866) are on a horizontal axis parallel between bottom and top body edges (3826, 3824). In this respect, the intersection of shaped chip opening (3814) at endpoint (3866) along lower edge (3818) allows surface currents to flow from outer periphery (3332) of metal transaction card body (3320) and concentrate about lower edge (3818) during use. Proportional overlap (3834) discussed above thus improves EMV payment transactions during use.

Figure 72:
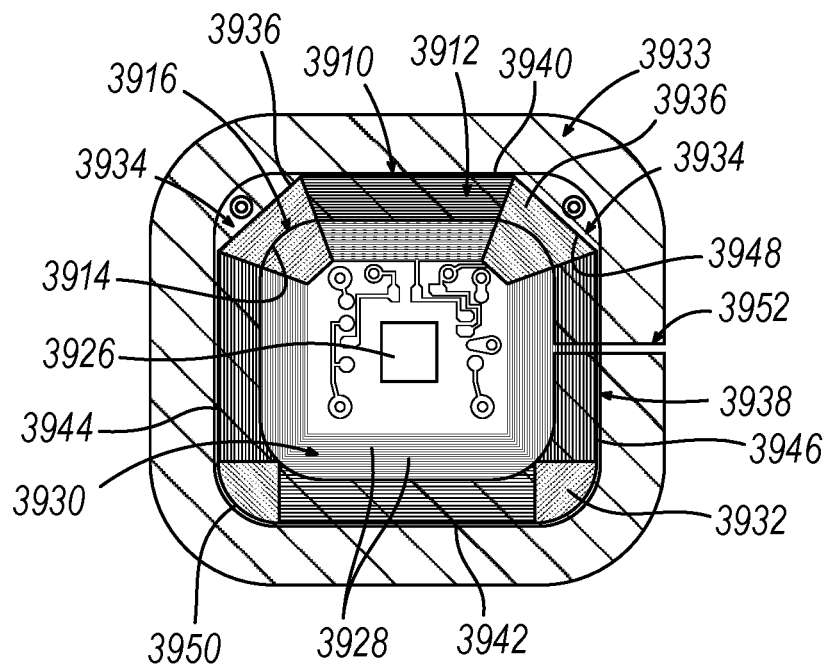
FIGS. 72 and 73 depict a rear elevational view of an exemplary transducer chip module having a seventh exemplary module antenna received against a twenty-sixth exemplary shaped opening.
Figure 73:
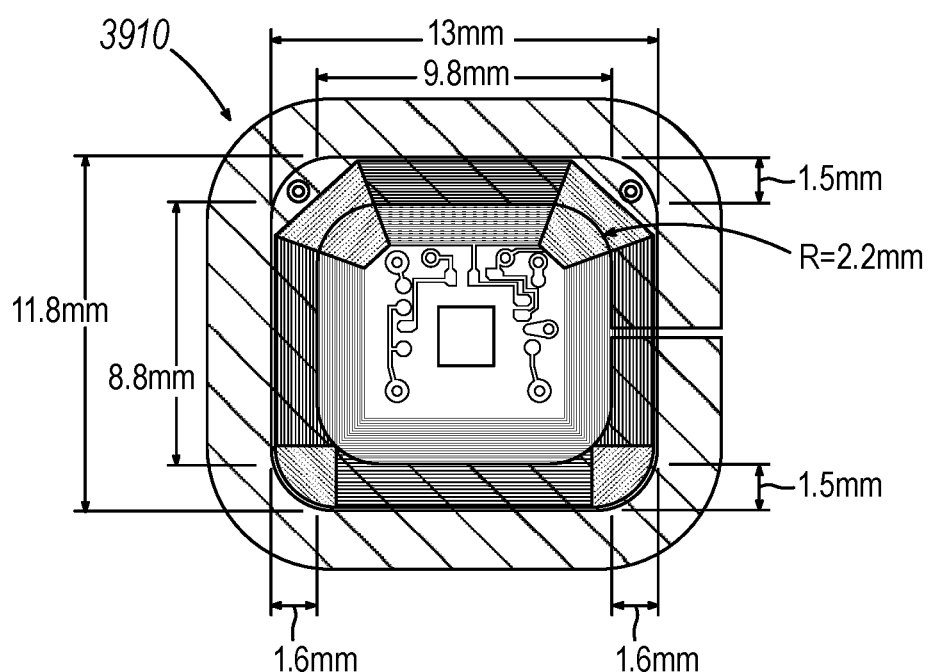
Figure 74:
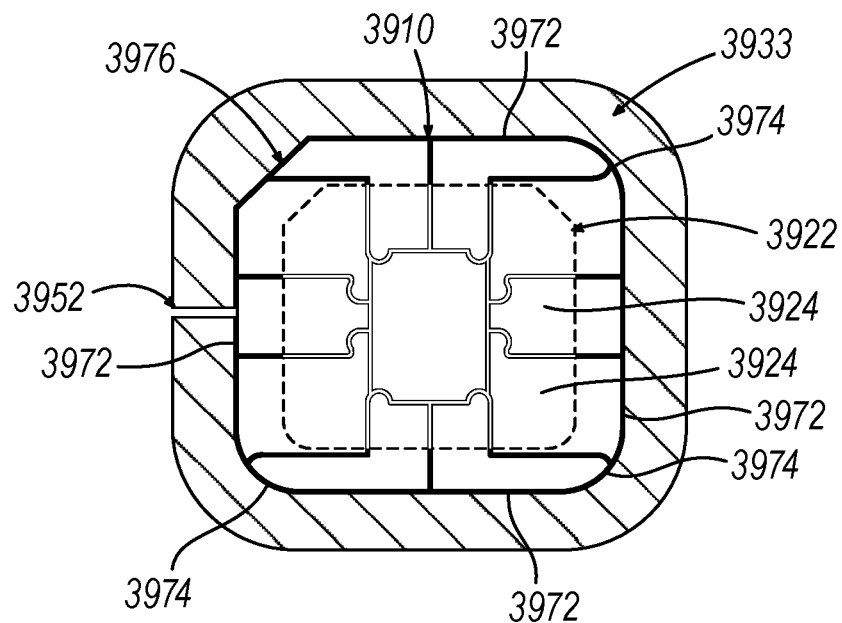
FIG. 74 depicts a front elevational view of the transducer chip module of FIGS. 72 and 73, with the seventh module antenna received against a twenty-seventh exemplary shaped opening.
Figure 75:
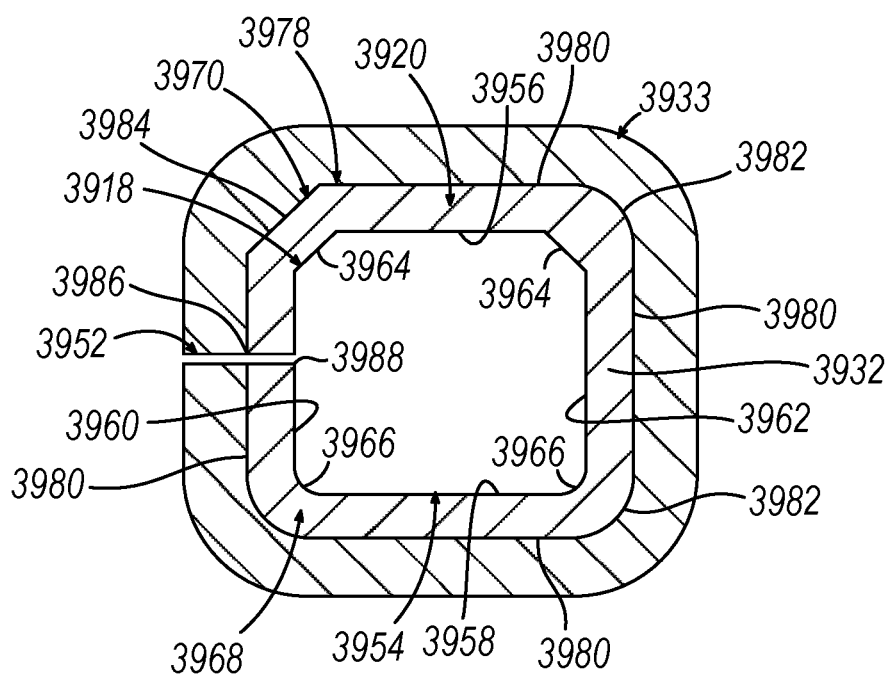
FIG. 75 depicts a front elevational view of the twenty-seventh shaped opening of FIG. 74.

B. Module Antenna Overlap Arrangements in Non-Corresponding and Corresponding Shapes In order to provide additional details regarding overlaps, such as proportional overlaps (3334, 3434, 3534, 3634, 3734, 3834), FIGS. 72 and 73 show a rear view of a transducer chip module (3910) having a seventh exemplary module antenna (3912) with a non-rectangular, polygonal shape received against a non-corresponding, lower chip hole (3914) of a twenty-sixth example of a shaped chip opening (3916) having a generally rectangular shape. In contrast, FIGS. 74 and 75 show a front view of this transducer chip module (3910) with the non-rectangular, polygonal module antenna (3912) received against a corresponding, lower chip hole (3918) of a twenty-seventh example of a shaped chip opening (3920) having a like, non-rectangular, polygonal shape. The following will first address aspects of overlaps between non-corresponding shapes followed by aspects of proportional overlaps, which provide improved EMV payment transactions.

With respect to FIGS. 72 and 73, transducer chip module (3910) has an upper portion including a module tape (3922) (see FIG. 74) having a plurality of contact pads (3922) (see FIG. 74) and a transversely opposing lower portion with an RFID chip portion (3926) with module antenna (3912) and a mold mass. Module antenna (3912) has a plurality of windings (3928) collectively defining an antenna track (3930). The upper portion of transducer chip module (3910) is larger than the lower portion of transducer chip module (3910) in one or more examples such that an upper chip hole (not shown) is configured to receive the lower portion of transducer chip module (3910), and lower chip hole (3914) is configured to receive the lower portion of transducer chip module (3910). More particularly, in one example, the upper portion may measure 13.0 mm×11.8 mm, with a thickness of 185 μm without an adhesive tape layer of 60 μm, but with a thickness of 245 μm with the adhesive tape layer of 60 μm thereon. In one example, the lower portion with the mold mass may measure 7.0 mm×7.0 mm, with a thickness of 350 μm.

By way of further example, a milling depth of the upper chip hole (not show) is 250±10 μm having lateral dimensions of 13.10 mm (width)×11.90 mm (height) with corner radii of 2.25 mm. A milling depth of lower chip hole (3914) is 600 μm±10 μm having for example lateral dimensions of 9.8 mm (width)×8.80 mm (height) with corner radii of 2.20 mm.

With respect to overlap, in the event that chip opening (3916) has parallel sides and is concentric with module antenna (3912) in conjunction with windings (3928) being routed equally and symmetrically around a central bond area, a metal shelf ledge (3932) of a metal layer (3933) surrounds lower chip hole (3914) with rectangular dimensions of 3.3 mm (width)×3.1 mm (height) surrounding lower chip hole (3914) from the upper chip hole (not shown).

To this end, antenna track (3930) of one example may measure approximately 100 μm in width. Spaces between adjacent turns of spiraling antenna track (3930) may measure approximately 100 μm and be formed via chemical etching. For module antenna (3912) with 15 turns as shown in the present example, the width of module antenna (3912) may be 2.90 mm measured from an outer winding to an inner winding. Thus, the width of module antenna (3912) within the dimensional space of transducer chip module (3910) is 2.90 mm on both left and right lateral sides, as well as 2.90 mm on top and bottom sides. An inner horizontal width of module antenna (3912) in one example is 6.8 mm, and an inner vertical height in one example is 5.8 mm, whereas an outer horizontal width of module antenna (3912) in one example is 12.6 mm, and an outer vertical height in one example is 11.4 mm. Also in one example, a gap between the outer winding and a punched edge of a module tape in a horizontal plane is 0.20 mm and 0.20 mm in a vertical plane.

Notably, module antenna (3912) is not rectangular due to vertical interconnections (3934) for a connection bridge and a plating line as well as corner clearance regions (3934) of antenna track (3930) to route around these interconnections. Module antenna (3912) is thus polygonal in shape and not rectangular. More particularly, module antenna (3912) has a polygonal outer antenna edge (3938) including top and bottom antenna edges (3940, 3942), left and right lateral antenna edges (3944, 3946) and a pair of top angled corner edges (3948) in corner clearance regions (3934) as well as a pair of bottom rounded corners (3950). Edges (3940, 3942, 3944, 3946, 3948) are generally linear, whereas bottom rounded corners (3950) are generally rounded.

In one example, a size of transponder chip module (3919) before punching from a 35 mm reel of tape is 12.6 mm×11.4 mm, which includes a dimensional perimeter layout of contact pads (3924) (see FIG. 74) and module antenna (3912), while the size of transponder chip module (3919) after punching from the reel of tape is 13.0 mm×11.8 mm. Therefore, metal shelf ledge (3932) overlaps module antenna (3912) by 1.60 mm on the vertical sides and 1.50 mm on the horizontal sides, taking into account the gap between the outermost portions of antenna track (3930) and an edge of the punched module tape. Still, given that module antenna (3912) has greater horizontal and vertical dimensions on outer winding portions of antenna track (3930) compared to inner winding portions of antenna track (3930), a preferred, and even optimized, overlap is calculated based on a projected surface area of module antenna (3912) on metal shelf ledge (3932). Therefore, in the present example, based on lower chip hole (3914) being 9.8 mm (width)×8.80 mm (height), approximately 55% of module antenna (3912) overlaps on metal shelf ledge (3932) such that one example of a predetermined percentage of overlap is approximately 55%. However, because the shape of lower chip hole (3914) is rectangular and does not follow the contour of non-rectangular polygonal outer antenna edge (3938) of module antenna (3912), the above arrangement of overlap fails to achieve an improved, or even optimized, RF performance for inductive coupling via a shaped slit (3952) in an EMV transaction. While one example of the above overlap and associated dimensions are provided above, these dimensions and associated calculations are merely exemplary and not intended to unnecessarily limit the invention described herein. It will be appreciated that alternative overlaps and/or alternative dimensions may be used for other EMV transactions.

In contrast with shaped chip opening (3916) discussed above, FIGS. 74 and 75 show shaped chip opening (3920) having the non-rectangular, polygonal shape about metal shelf ledge (3932) of metal layer (3933) that corresponds to the non-rectangular, polygonal shape of transducer chip module (3910). More particularly, like module antenna (3912), lower chip hole (3918) of shaped chip opening (3920) has a polygonal lower edge (3938) including top and bottom lower edges (3956, 3958), left and right lateral lower edges (3960, 3962) and a pair of top angled corner lower edges (3964) as well as a pair of bottom rounded corners (3950). Edges (3956, 3958, 3960, 3962, 3964) are generally linear, whereas bottom rounded corners (3966) are generally rounded. The angled corner lower edges (3964) extend at 45° relative to the horizontal edges (3956, 3958) and vertical edges (3960, 3962), which respectively correspond to outer antenna edge (3938) for a seventh exemplary proportional overlap (3968) in lower chip hole (3918).

With respect to the present example of an upper chip hole (3970) of shaped chip opening (3920), the upper portion of transducer chip module (3910) with contact pads (3924) has four linear pad edges (3972), three rounded pad corners (3974), and a top left angled linear pad edge (3976). These pad edges (3972, 3976) and pad corners (3974) complement upper edge (3978), which respectively includes fourth linear upper edges (3978), three rounded upper corners (3982), and angled linear upper edge (3984). The upper portion of transducer chip module (3910) this snugly fits into upper chip hole (3970) such that angled linear pad edge (3976) and angled linear upper edge (3980) encourage correct and effective alignment of transducer chip module (3910) into shaped chip opening (3920) as an alignment feature, which may also be referred to as a guide post or an alignment post. Shaped slit (3952) extends from an origin (not shown) through a terminus (3986) to an endpoint (3988) for effective inductive coupling with improved, or even optimized, performance RF performance in an EMV transaction.

IV. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A transaction card for dual interface communication of a transaction, comprising: a card body including a first metal layer having an outer peripheral edge, a first metal face, and a second metal face, wherein the first metal face is transversely opposed from the second metal face; a chip opening including a first chip hole transversely extending from the first metal face toward the second metal face thereby defining a first metal edge surrounding a predetermined hole shape transversely extending into the first metal layer; a discontinuity extending from the outer peripheral edge to the first metal edge; and a transponder chip module having a module antenna and configured to be received within the chip opening, wherein the module antenna defines an outer antenna edge surrounding a predetermined antenna shape such that the predetermined antenna shape is the same as the predetermined hole shape for improved inductive coupling via the discontinuity during use.

Example 2

The transaction card of Example 1, wherein the predetermined antenna shape has a plurality of antenna dimensions, wherein the predetermined hole shape has a plurality of hole dimensions, and wherein the plurality of antenna dimensions are respectively proportionally larger than the plurality of hole dimensions such that the predetermined antenna shape is larger than the predetermined hole shape.

Example 3

The transaction card of any one or more of Examples 1 through 2, wherein the first metal layer includes a metal surface surrounding the first chip hole, and wherein the module antenna is received against the first chip hole and the metal surface such that at least a portion of a transverse projection of the module antenna transversely overlaps the metal surface with a predetermined proportional overlap.

Example 4

The transaction card of Example 3, wherein the predetermined proportional overlap is between approximately 40% to approximately 70% of the module antenna transversely overlapping the metal surface.

Example 5

The transaction card of Example 4, wherein the predetermined proportional overlap is between approximately 50% to approximately 60% of the module antenna transversely overlapping the metal surface.

Example 6

The transaction card of Example 5, wherein the predetermined proportional overlap is approximately 55% of the module antenna transversely overlapping the metal surface.

Example 7

The transaction card of any one or more of Examples 1 through 6, wherein the predetermined hole shape and the predetermined antenna shape are each non-rectangular.

Example 8

The transaction card of any one or more of Examples 1 through 7, wherein the chip opening further includes a second chip hole transversely extending through at least a portion of the metal card body about the first chip hole, and wherein the transponder chip module further includes a plurality of contact pads configured to be received within the second chip hole.

Example 9

The transaction card of Example 8, wherein the second chip hole includes an alignment feature configured to orient the transponder chip module relative to the chip opening according to a predetermined orientation with the transponder chip module received within the chip opening.

Example 10

The transaction card of any one or more of Examples 1 through 9, wherein the outer peripheral edge includes a first long side edge, a second long side edge, a first short side edge, and a second short side edge, wherein the first long side edge is opposed from and parallel to the second long side edge, wherein the first short side edge is opposed from and parallel to the second short side edge, wherein the first long side edge defines an axis extending parallel to each of the first and second long side edges, and wherein one of the origin and the terminus is closer to the axis than the other of the origin and the terminus.

Example 11

The transaction card of Example 10, wherein the first metal edge is not parallel to the first and short side edges.

Example 12

The transaction card of Example 11, wherein the first metal edge is not parallel to the first and short side edges.

Example 13

The transaction card of Example 12, wherein the discontinuity includes a plurality of channels that successively intersect at a first intersection of a first pair of channels and a second intersection of a second pair of channels, wherein the first intersection defines a first directional change between the first pair of channels, wherein the second intersection defines a second directional change between the second pair of channels, and wherein each of the first and second directional changes are at least 45 degrees.

Example 14

The transaction card of Example 13, wherein each of the first and second directional changes are at least 135 degrees.

Example 15

The transaction card of any one or more of Examples 1 through 14, wherein the discontinuity includes at least one of: a non-linear channel; a first pair of channels intersecting at a first intersection defining a first directional change between the first pair of channels of at least 90 degrees and a second pair of channels intersecting at a second intersection defining a second directional change between the second pair of channels of at least 45 degrees; or an intermediate channel directly between a third pair of channels, wherein the third pair of channels defines a third directional change therebetween of approximately 45 degrees along the intermediate channel.

Example 16

A transaction card for dual interface communication of a transaction, comprising: a card body including a first metal layer having first face, a second face, and an outer peripheral edge, wherein the outer peripheral edge includes a first long side edge, a second long side edge, a first short side edge, and a second short side edge, wherein the first long side edge is opposed from and parallel to the second long side edge, wherein the first short side edge is opposed from and parallel to the second short side edge; a chip opening transversely extending from the first metal face toward the second metal face thereby defining a first metal edge surrounding a predetermined hole shape transversely extending into the first metal layer, wherein the first metal edge is not parallel to the first and second long side edges; and a discontinuity extending from an origin at the outer peripheral edge to a terminus at the first metal edge, wherein the first long side edge defines an axis extending parallel to each of the first and second long side edges, and wherein one of the origin and the terminus is closer to the axis than the other of the origin and the terminus.

Example 17

The transaction card of Example 16, wherein the first metal edge is not parallel to the first and short side edges.

Example 18

The transaction card of any one or more of Examples 16 through 17, wherein the discontinuity includes a plurality of channels that successively intersect at a first intersection of a first pair of channels and a second intersection of a second pair of channels, wherein the first intersection defines a first directional change between the first pair of channels, wherein the second intersection defines a second directional change between the second pair of channels, and wherein each of the first and second directional changes are at least 45 degrees.

Example 19

The transaction card of Example 18, wherein each of the first and second directional changes are at least 135 degrees.

Example 20

A transaction card for dual interface communication of a transaction, comprising: a card body including a first metal layer having first face, a second face, and an outer peripheral edge; a chip opening transversely extending from the first metal face toward the second metal face thereby defining a first metal edge surrounding a predetermined hole shape transversely extending into the first metal layer; a transponder chip module configured to be received within the chip opening; and a discontinuity extending from an origin at the outer peripheral edge to a terminus at the first metal edge, wherein the discontinuity includes at least one of: a non-linear channel; a first pair of channels intersecting at a first intersection defining a first directional change between the first pair of channels of at least 90 degrees and a second pair of channels intersecting at a second intersection defining a second directional change between the second pair of channels of at least 45 degrees; or an intermediate channel directly between a third pair of channels, wherein the third pair of channels defines a third directional change therebetween of approximately 45 degrees along the intermediate channel.

Example 21

An RFID enabled transaction card having a card periphery defined by first and second parallel short sides and first and second parallel long sides, the card comprising: a metal layer having a front surface and a back surface; and an opening in the metal layer sized to accommodate a transponder chip module, the opening having a certain, predetermined shape such as an oval, round or diamond shape which is not parallel to the perimeter edges of the card body, a discontinuity in the metal layer comprising a slit in the metal layer extending from the front surface to the back surface, the discontinuity defining a path from an origin at the peripheral edge of the card body (start position) and terminating at the shaped opening, wherein the termination end at the shaped opening or at the start position at the edge of the card body are located relatively closer to a line defined by the first long side of the card periphery than the other.

Example 22

The RFID enabled transaction card of Example 21, wherein the path comprises at least two changes in direction of 45 degrees or more.

Example 23

The RFID enabled transaction card of one or more of Example 21 through Example 22, wherein the path comprises at least two changes in direction of 135 degrees or more.

Example 24

An RFID enabled transaction card comprising: a transponder chip module comprising an RFID chip and an antenna; and a metal layer; wherein the metal layer comprises: a shaped opening for receiving a transponder chip module; and a discontinuity in the form of a slit which extends through the metal layer from the opening to the periphery of the metal layer; wherein the slit is characterized by at least one of: at least a portion of the slit extends in a substantially non-linear path; at least a portion of the slit has a non-linear shape; at least a portion of the slit is stepped, with at least one angle 90° and another 45°; the slit describes a path having 1×45°; and the slit describes a path having 2×45° bends.

Example 25

An RFID enabled metal face transaction card comprising: a first metal layer with a first module opening; a second metal layer with a second module opening; wherein: the second module opening has a shape and geometry which matches the shape and geometry of a module antenna of a transponder chip module which will be inserted into the card.

Example 26

The RFID enabled metal face transaction card of Example 25, wherein: the first module opening has an alignment feature for ensuring correct alignment of a transponder chip module inserted into the opening.

Example 27

The RFID enabled metal face transaction card of any one or more of Example 25 through Example 26, wherein at least one of the first and second module openings has a polygonal shape which matches the shape of the module antenna, with a size that allows for the module antenna to at least partially overlap the metal layer outside of the module opening.

V. MISCELLANEOUS

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A transaction card for dual interface communication of a transaction, comprising:
   a card body including a first metal layer having an outer peripheral edge, a first metal face, and a second metal face, wherein the first metal face is transversely opposed from the second metal face;
   a chip opening including a first chip hole transversely extending from the first metal face toward the second metal face thereby defining a first metal edge surrounding a predetermined hole shape transversely extending into the first metal layer;
   a discontinuity extending from the outer peripheral edge to the first metal edge; and
   a transponder chip module having a module antenna and configured to be received within the chip opening, wherein the module antenna defines an outer antenna edge surrounding a predetermined antenna shape such that the predetermined antenna shape is the same as the predetermined hole shape for improved inductive coupling via the discontinuity during use,
   wherein the predetermined antenna shape has a plurality of antenna dimensions, wherein the predetermined hole shape has a plurality of hole dimensions, and wherein the plurality of antenna dimensions are respectively proportionally larger than the plurality of hole dimensions such that the predetermined antenna shape is larger than the predetermined hole shape,
   wherein the first metal layer includes a metal surface surrounding the first chip hole, wherein the module antenna is received against the first chip hole and the metal surface such that at least a portion of a transverse projection of the module antenna transversely overlaps the metal surface with a predetermined proportional overlap, and
   wherein the predetermined proportional overlap is between approximately 40% to approximately 70% of the module antenna transversely overlapping the metal surface.

2. The transaction card of claim 1, wherein the predetermined proportional overlap is between approximately 50% to approximately 60% of the module antenna transversely overlapping the metal surface.

3. The transaction card of claim 2, wherein the predetermined proportional overlap is approximately 55% of the module antenna transversely overlapping the metal surface.

4. The transaction card of claim 1, wherein the predetermined hole shape and the predetermined antenna shape are each non-rectangular.

5. The transaction card of claim 1, wherein the chip opening further includes a second chip hole transversely extending through at least a portion of the metal card body about the first chip hole, and wherein the transponder chip module further includes a plurality of contact pads configured to be received within the second chip hole.

6. The transaction card of claim 5, wherein the second chip hole includes an alignment feature configured to orient the transponder chip module relative to the chip opening according to a predetermined orientation with the transponder chip module received within the chip opening.

7. The transaction card of claim 1, wherein the outer peripheral edge includes a first long side edge, a second long side edge, a first short side edge, and a second short side edge, wherein the first long side edge is opposed from and parallel to the second long side edge, wherein the first short side edge is opposed from and parallel to the second short side edge, wherein the first long side edge defines an axis extending parallel to each of the first and second long side edges, and wherein one of the origin and the terminus is closer to the axis than the other of the origin and the terminus.

8. The transaction card of claim 7, wherein the first metal edge is not parallel to the first and short side edges.

9. The transaction card of claim 8, wherein the first metal edge is not parallel to the first and short side edges.

10. The transaction card of claim 9, wherein the discontinuity includes a plurality of channels that successively intersect at a first intersection of a first pair of channels and a second intersection of a second pair of channels, wherein the first intersection defines a first directional change between the first pair of channels, wherein the second intersection defines a second directional change between the second pair of channels, and wherein each of the first and second directional changes are at least 45 degrees.

11. The transaction card of claim 10, wherein each of the first and second directional changes are at least 135 degrees.

12. The transaction card of claim 1, wherein the discontinuity includes at least one of:
   a non-linear channel;
   a first pair of channels intersecting at a first intersection defining a first directional change between the first pair of channels of at least 90 degrees and a second pair of channels intersecting at a second intersection defining a second directional change between the second pair of channels of at least 45 degrees; or
   an intermediate channel directly between a third pair of channels, wherein the third pair of channels defines a third directional change therebetween of approximately 45 degrees along the intermediate channel.

13. A transaction card for dual interface communication of a transaction, comprising:
   a card body including a first metal layer having first face, a second face, and an outer peripheral edge, wherein the outer peripheral edge includes a first long side edge, a second long side edge, a first short side edge, and a second short side edge, wherein the first long side edge is opposed from and parallel to the second long side edge, wherein the first short side edge is opposed from and parallel to the second short side edge;
   a chip opening transversely extending from the first metal face toward the second metal face thereby defining a first metal edge surrounding a predetermined hole shape transversely extending into the first metal layer, wherein the first metal edge is not parallel to the first and second long side edges; and
   a discontinuity extending from an origin at the outer peripheral edge to a terminus at the first metal edge, wherein the first long side edge defines an axis extending parallel to each of the first and second long side edges, wherein one of the origin and the terminus is closer to the axis than the other of the origin and the terminus, wherein the discontinuity includes a plurality of channels that successively intersect at a first intersection of a first pair of channels and a second intersection of a second pair of channels, wherein the first intersection defines a first directional change between the first pair of channels, wherein the second intersection defines a second directional change between the second pair of channels, and wherein each of the first and second directional changes are at least 45 degrees, and wherein each of the first and second directional changes are at least 135 degrees.

14. A transaction card for dual interface communication of a transaction, comprising:
- a card body including a first metal layer having an outer peripheral edge, a first metal face, and a second metal face, wherein the first metal face is transversely opposed from the second metal face;
- a chip opening including a first chip hole transversely extending from the first metal face toward the second metal face thereby defining a first metal edge surrounding a predetermined hole shape transversely extending into the first metal layer;
- a discontinuity extending from the outer peripheral edge to the first metal edge; and
- a transponder chip module having a module antenna and configured to be received within the chip opening, wherein the module antenna defines an outer antenna edge surrounding a predetermined antenna shape such that the predetermined antenna shape is the same as the predetermined hole shape for improved inductive coupling via the discontinuity during use,
- wherein the chip opening further includes a second chip hole transversely extending through at least a portion of the metal card body about the first chip hole, and wherein the transponder chip module further includes a plurality of contact pads configured to be received within the second chip hole.

15. The transaction card of claim 14, wherein the second chip hole includes an alignment feature configured to orient the transponder chip module relative to the chip opening according to a predetermined orientation with the transponder chip module received within the chip opening.

16. A transaction card for dual interface communication of a transaction, comprising:
- a card body including a first metal layer having an outer peripheral edge, a first metal face, and a second metal face, wherein the first metal face is transversely opposed from the second metal face;
- a chip opening including a first chip hole transversely extending from the first metal face toward the second metal face thereby defining a first metal edge surrounding a predetermined hole shape transversely extending into the first metal layer;
- a discontinuity extending from the outer peripheral edge to the first metal edge; and
- a transponder chip module having a module antenna and configured to be received within the chip opening, wherein the module antenna defines an outer antenna edge surrounding a predetermined antenna shape such that the predetermined antenna shape is the same as the predetermined hole shape for improved inductive coupling via the discontinuity during use,
- wherein the outer peripheral edge includes a first long side edge, a second long side edge, a first short side edge, and a second short side edge, wherein the first long side edge is opposed from and parallel to the second long side edge, wherein the first short side edge is opposed from and parallel to the second short side edge, wherein the first long side edge defines an axis extending parallel to each of the first and second long side edges, and wherein one of the origin and the terminus is closer to the axis than the other of the origin and the terminus,
- wherein the first metal edge is not parallel to the first and short side edges.

17. The transaction card of claim 16, wherein the first metal edge is not parallel to the first and short side edges.

18. The transaction card of claim 17, wherein the discontinuity includes a plurality of channels that successively intersect at a first intersection of a first pair of channels and a second intersection of a second pair of channels, wherein the first intersection defines a first directional change between the first pair of channels, wherein the second intersection defines a second directional change between the second pair of channels, and wherein each of the first and second directional changes are at least 45 degrees.

19. The transaction card of claim 18, wherein each of the first and second directional changes are at least 135 degrees.

20. A transaction card for dual interface communication of a transaction, comprising:
- a card body including a first metal layer having first face, a second face, and an outer peripheral edge, wherein the outer peripheral edge includes a first long side edge, a second long side edge, a first short side edge, and a second short side edge, wherein the first long side edge is opposed from and parallel to the second long side edge, wherein the first short side edge is opposed from and parallel to the second short side edge;
- a chip opening transversely extending from the first metal face toward the second metal face thereby defining a first metal edge surrounding a predetermined hole shape transversely extending into the first metal layer, wherein the first metal edge is not parallel to the first and second long side edges; and
- a discontinuity extending from an origin at the outer peripheral edge to a terminus at the first metal edge,
- wherein the first long side edge defines an axis extending parallel to each of the first and second long side edges,
- wherein one of the origin and the terminus is closer to the axis than the other of the origin and the terminus, and
- wherein the first metal edge is not parallel to the first and short side edges.

* * * * *